US012730473B2

(12) United States Patent
Narayanaswamy et al.

(10) Patent No.: US 12,730,473 B2
(45) Date of Patent: Sep. 8, 2026

(54) PROCESSOR CLOCK SCALING TECHNIQUE

(71) Applicant: NVIDIA Corporation, Santa Clara, CA (US)

(72) Inventors: Sreedhar Narayanaswamy, Sunnyvale, CA (US); Jun Xu, Foster City, CA (US); Manish Saini, Cupertino, CA (US); Krishna Sitaraman, Campbell, CA (US); Aleksandr Frid, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/597,271

(22) Filed: Mar. 6, 2024

(65) Prior Publication Data

US 2025/0284307 A1 Sep. 11, 2025

(51) Int. Cl.
*G06F 1/08* (2006.01)

(52) U.S. Cl.
CPC .................................... *G06F 1/08* (2013.01)

(58) Field of Classification Search
CPC ........................................................ G06F 1/08
See application file for complete search history.

(56) References Cited

U.S. PATENT DOCUMENTS 9,037,882 B2 * 5/2015 Vadakkanmaruveedu ................. G06F 1/206 713/300
9,256,276 B2 * 2/2016 Sasanka ................. G06F 1/324
9,342,135 B2 * 5/2016 Brackman ............. G06F 1/3243
9,582,052 B2 * 2/2017 Mittal ..................... G06F 1/324
10,372,495 B2 * 8/2019 Kumar .................. G06F 9/4893
2013/0166885 A1 * 6/2013 Ramani ................. G06F 9/4893 712/214
2014/0089700 A1 * 3/2014 Chang ................... G06F 1/3287 713/322
2017/0269652 A1 * 9/2017 Lee ....................... G06F 1/3287
2020/0326994 A1 * 10/2020 Ruiz ................... G06F 11/3058
2021/0208663 A1 * 7/2021 Cooper ...................... G06F 1/28
2022/0122215 A1 * 4/2022 Ray ..................... G06F 9/30036
2024/0094796 A1 * 3/2024 Narayanaswamy .... G06F 1/206
2024/0272698 A1 * 8/2024 Nandanwar ............. G06F 1/324
2024/0289182 A1 * 8/2024 Clay ................... G06F 11/3058
2024/0330048 A1 * 10/2024 Rotem .................. G06F 9/4893
2024/0419595 A1 * 12/2024 Patel ................... G06F 12/0831
2025/0004514 A1 * 1/2025 Mehra .................... G01K 13/00
2025/0044845 A1 * 2/2025 Francis ................... G06F 1/206

(Continued)

FOREIGN PATENT DOCUMENTS

WO WO-2025147454 A1 * 7/2025

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.

(Continued)

*Primary Examiner* — Aurel Prifti
(74) *Attorney, Agent, or Firm* — Davis Wright Tremaine LLP

(57) ABSTRACT

Apparatuses, systems, and techniques to scale processor clocks. In at least one embodiment, one or more circuits are to scale one or more clocks of one or more cores based, at least in part, on a proximity of the one or more cores to each other.

21 Claims, 56 Drawing Sheets

(56) References Cited

U.S. PATENT DOCUMENTS

| | | | | |
|---|---|---|---|---|
| 2025/0077280 | A1* | 3/2025 | Narayanaswamy | G06F 9/4893 |
| 2025/0117250 | A1* | 4/2025 | Adi | G06F 9/5094 |
| 2025/0167050 | A1* | 5/2025 | Venkataraman | G06F 1/206 |
| 2025/0237555 | A1* | 7/2025 | Rachala | G01K 7/00 |

OTHER PUBLICATIONS

IEEE, "IEEE Standard for 802.3," IEEE Standard for Ethernet, IEEE Computer Society, Dec. 28, 2012, 634 pages.

Wikipedia, "IEEE 802.5," Wikepedia The Free Encyclopedia, https://en.wikipedia.org/wiki/Token_Ring, Jan. 14, 2020, 12 pages.

* cited by examiner

100
Chip
120
CONFIGURATION FILE
104
CONTROLLER
105
Processor
Themal
Monitoring
PROCESSOR
CORE
110
THERMAL
SENSORS
115

1205
Processor

1210
CPU Temperature Monitor & Policy Update Module

1215
Worst Case Scenarios Identification and & Policy Update Module

1220
Hotspot Offset Management Module

FIG. 43B
GENERAL-PURPOSE GRAPHICS PROCESSING UNIT 4330
MEMORY CONTROLLER 4342B
MEMORY 4344B
HOST INTERFACE 4332
GLOBAL SCHEDULER 4334
COMPUTE CLUSTER 4336D
COMPUTE CLUSTER 4336C
COMPUTE CLUSTER 4336B
COMPUTE CLUSTER 4336A
CACHE MEMORY 4338
COMPUTE CLUSTER 4336H
COMPUTE CLUSTER 4336G
COMPUTE CLUSTER 4336F
COMPUTE CLUSTER 4336E
I/O HUB 4339
GPU LINK 4340
MEMORY CONTROLLER 4342A
MEMORY 4344A

PROCESSOR CLOCK SCALING TECHNIQUE

TECHNICAL FIELD

At least one embodiment pertains to scaling clocks of one or more processor cores. For example, at least one embodiment pertains to a processor comprising one or more circuits to scale one or more clocks of one or more cores based, at least in part, on a proximity of the one or more cores to each other.

BACKGROUND

Processors may manage heat through a software thermal policy that monitors temperature averaged over thermal sensors located in a collection of operating cores. Currently, a worst-case thermal hotspot offset estimate based on profiled applications is added as a safety margin.

BRIEF DESCRIPTION OF DRAWINGS

The following detailed description of exemplary non-limiting illustrative embodiments is to be read in conjunction with the drawings of which.

DETAILED DESCRIPTION

Figure 1:
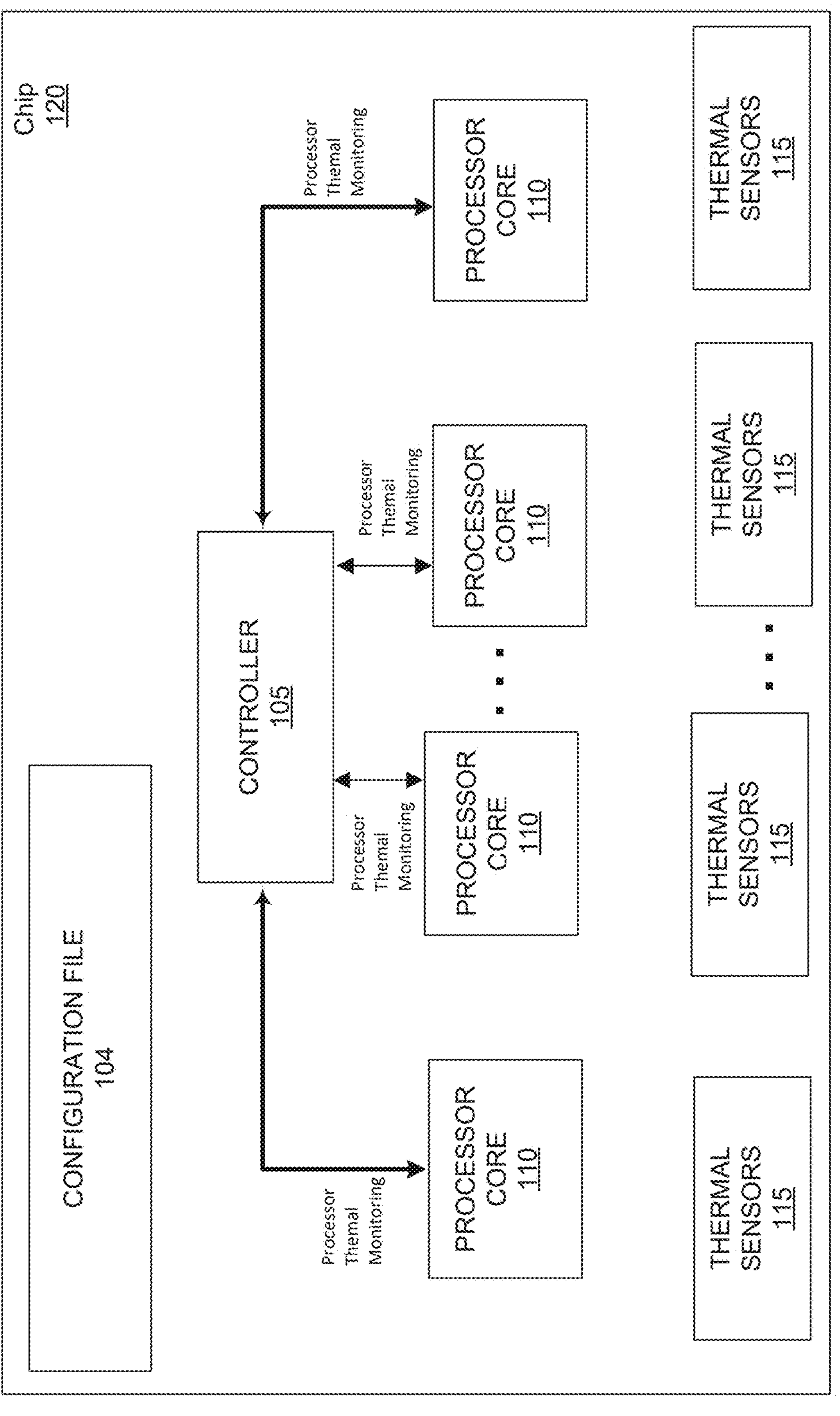
FIG. 1 illustrates a system comprising a controller and one or more processor cores, according to at least one embodiment.

FIG. 1 illustrates a system 100 comprising a controller and one or more processor cores, according to at least one embodiment. In at least one embodiment, a chip 120 comprise comprising multiple cores 110 can suffer from localized heat buildup called 'hotspots', a type of thermal overloading that can lead to hardware failure. In at least one embodiment, this condition arises because temperature sensors on chip 120 do not accurately measure temperature for each processor core or areas of a chip because temperature sensors, such as thermal sensors 115, are not uniformly or ideally distributed throughout said chip 120. In at least one embodiment, hotspots can result from core processor activity when certain combinations of processor cores 110 undergo sustained levels of operation, such as combinations in which proximity of said processor cores 110 causes heat buildup in a corresponding region of said chip 120. In at least one embodiment, said hotspots may be undetected or inaccurately measured by thermal sensors 115, which may occur in part due to proximity of thermal sensors 115 to said hotspot.

In at least one embodiment, processor activity may be scaled downward when a temperature exceeds a certain value, thus eliminating thermal-induced failure. In at least one embodiment, said value is based on an estimated temperature derived, in part, from thermal sensors 115. In at least one embodiment, since there is a lack of specific temperature data in every location, estimated temperature is adjusted by adding a thermal offset. In at least one embodiment, rather than using an offset value that is too high (which may help to prevent overheating but also leads to excessive throttling of processor activity) or too low (which risks thermal-induced failure), processor activity may be scaled according to patterns of utilization of processor cores 110. In at least one embodiment, said patterns comprise those indicative of localized heat buildup that may be inaccurately measured by thermal sensors 115.

In at least one embodiment, use of adjustable thermal offsets for different patterns of processor core utilization endows a thermal management policy with greater flexibility for managing thermal hotspots and processor performance. In at least one embodiment, records of processor core utilization and recorded or predicted temperatures may be used to identify patterns that would lead to thermal induced failure in view no thermal offset or a fixed thermal offset that is too low to provide an adequate margin of safety. In at least one embodiment, said patterns, which may be described as worst-case thermal combinations, worst-case combinations, worst-case thermal scenarios, and so forth, may be avoided or accounted for by said processor to improve processor performance. In at least one embodiment, this is done by scaling clocks of one or more processor cores.

In at least one embodiment, a configuration file, such as configuration file 104, can comprise information indicating processor core combinations that indicate worst-case scenarios or other patterns, noted above, that may influence what thermal offsets are viable. In at least one embodiment, said information can indicate patterns of processor core utilization that may be avoided to allow for a smaller thermal offset. In at least one embodiment, said information can indicate patterns that when identified can be used as a basis for dynamically setting a relatively high thermal offset.

In at least one embodiment, scaling clocks of one or more processor cores or combinations comprising increasing or decreasing speeds of said processor cores, thus causing a corresponding increase or decrease of an amount of heat energy generated by said processor cores. In at least one embodiment, operation of a first set of one or more processor cores is adjusted (for example, by temporarily removing said processor cores from operation) permits clocks of another set of processor cores to be increased, where the first set is one that includes processors whose proximity is associated with adverse thermal conditions.

In at least one embodiment, thermal output of one or more processor cores is correlated with proximity of said processor cores. In at least one embodiment, for example, thermal output of a group of processor cores is associated with how near each other said operating processor cores are with respect to each other. In at least one embodiment, there is a further correlation regarding proximity and activity of said processor cores. In at least one embodiment, processor cores operating in proximity to each other, such as processor cores that are relatively near to each other on chip 120, may generate thermal activity associated with an adverse thermal condition, and clocks of said processor cores may be scaled accordingly.

In at least one embodiment, a pattern of processor core utilization comprises designating processor cores combinations that may result in a particular thermal output, such as a thermal output that is associated with a hotspot or other worst-case scenario, such as hotspots that are not accurately measured by onboard thermal sensors 115. In at least one embodiment, a pattern of core utilization can indicate that a processor core or combinations of processor cores yields thermal activity that is within the limits of acceptable thermal output and which does not require intervention by a thermal management policy. In at least one embodiment, a pattern of processor core utilization can indicate that said processor core or combinations of processor cores yields thermal activity that exceeds a limit of acceptable thermal output, but can be managed by scaling activity of said processor cores according to a thermal management policy. In at least one embodiment, this comprises adjustments to thermal offsets as described herein. In at least one embodiment, a pattern of processor core utilization can indicate that said processor core or combinations of processor cores would yield thermal activity that would exceeds a limit of acceptable thermal output, but that can be managed by temporarily removing said processor core combinations from operation, according to a thermal management policy.

In at least one embodiment, a thermal condition corresponds with one or more of a temperature of a processor core, a combination of processor cores, a processor component other than a processor core, or a location on a chip.

In at least one embodiment, an adverse thermal condition is a condition that imperils ongoing operational performance of one or more combinations of processor cores. In at least one embodiment, avoiding one or more patterns of core utilization that would result in an adverse thermal condition comprises implementation of a thermal management policy that removes a processor core or combination of processor cores from operating, or adjusts operation of said processor core or combination of processor cores by scaling a clock of said processor core(s) so as to avoid said adverse thermal condition.

In at least one embodiment, information indicative of one or more patterns of processor core utilization comprises data that correlates processor cores or combinations of processor cores with thermal conditions.

In at least one embodiment, system 100 comprises a chip 120 that includes a controller 105 and a number of processor cores 110. In at least one embodiment, controller 105 manages overall performance of processor cores 110, including implementation of a thermal management policy as described herein. In at least one embodiment, one or more aspects of one or more embodiments described in conjunction with FIG. 1 are combined with one or more aspects of one or more embodiments described herein, including embodiments described at least in conjunction with FIGS. 2-13.

In at least one embodiment, chip 120 comprises multiple groups of processor cores. In at least one embodiment, for example, chip 120 comprise two or more groups of processor cores connected to chip 120 via two or more sockets or circuitry configured to operate as such, and in which each group of processors functions as an independent multicore processor. In at least one embodiment, said groups of processor cores communicate via a communications bus, such as PCIe, NVLink, or Infinity Fabric xGMI. In at least one embodiment, chip 120 corresponds to a GRACE chip, AMD Instinct MI300 Series chip, or other similar chip.

In at least one embodiment, measurements from thermal sensors 115 provide substantially real-time thermal measurements. In at least one embodiment, a configuration file 104 comprises stored information identifying combinations of processors that are associated with pathological patterns of processor usage. In at least one embodiment, an application's patterns of use of a group of processors, such as processors 110, is correlated with patterns indicated in configuration file 104. In at least one embodiment, said patterns are indicative of adverse thermal conditions. In at least one embodiment, configuration file 104 is specific to a chip, operating system, or computing device. In at least one embodiment, patterns of processor core utilization are indicated in configuration file 104 as data or text. For example, In at least one embodiment, configuration file 104 might contain text strings indicated groups of processor cores, such as "C33, C34, C43" that indicate a group of processor cores that, if utilized at a sufficiently high level, might cause ad adverse thermal condition. It will be appreciated that this example is not intended to limit potential embodiments to only those that conform to the specific example provided.

In at least one embodiment, different thermal hotspot offsets can be assigned to different processor configurations so as to dynamically configure the processor cores to balance between lowering processor core temperatures and maintaining high performance. In at least one embodiment, this is done by system 100 identifying patterns of processor core utilization that are associated with adverse thermal conditions, and scaling clocks of one or more processors based on said identification. In at least one embodiment, system 100 provides alternative thermal policies in response to identifying said patterns. In at least one embodiment, for example, system 100 correlates current utilization of processor cores 110 to patterns of processor core utilization indicated in configuration file 104.

Figure 2:
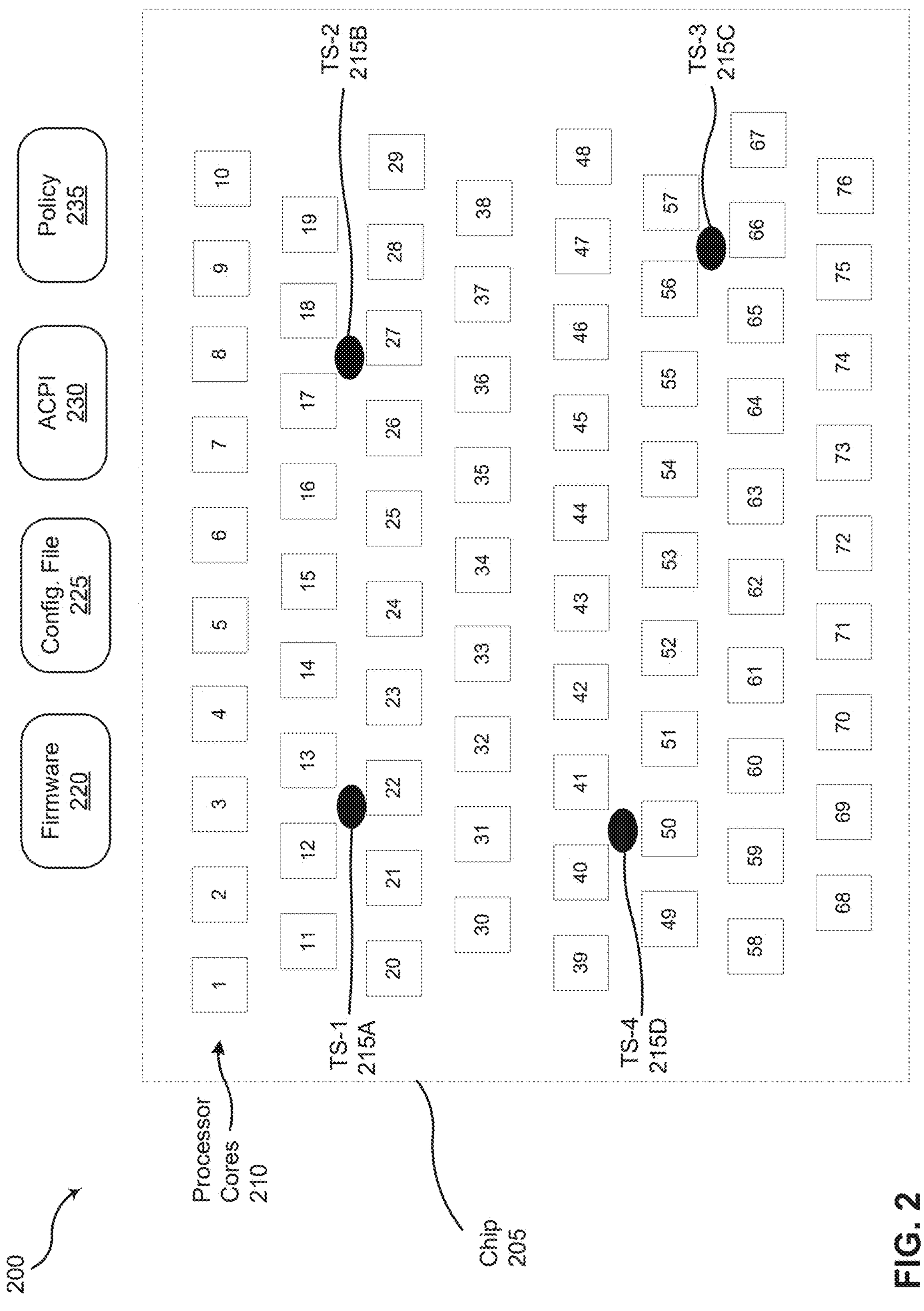
FIG. 2 illustrates a multiple core processor chip, in accordance with at least one embodiment.

In at least one embodiment, configuration file 104 corresponds to configuration file 225, as depicted in FIG. 2. In at least one embodiment, system 100 includes an advanced configuration power interface (ACPI), such as AFCPI 230 as depicted in FIG. 2. In at least one embodiment, system 100 comprises firmware, such as firmware 220, to implement a thermal management policy, such as policy 235. In at least one embodiment, said firmware monitors application usage of processor cores 110, compares processor cores that are in use, and compares said processor cores against patterns of processor core utilization that may be indicative of adverse thermal conditions. In at least one embodiment, said patterns are indicated in configuration file 105. In at least one embodiment, said firmware and software adjusts one or more of said processor core's clocks to increase or decrease its performance and corresponding thermal output according to said policy.

FIG. 2 illustrates a multiple core processor chip, in accordance with at least one embodiment. In at least one embodiment, chip 205 comprises a plurality of processor cores 210, further labeled in FIG. 2 as processors cores 1-76, but this number of processor cores is intended only to be illustrative and should not be construed as limiting any specific embodiment. In at least one embodiment, chip 205 includes thermal sensors, such as thermal sensors 215A-D. In at least one embodiment, chip 205 comprises an arrangement of processor cores similar to what is depicted in FIG. 2, however this arrangement is intended only to be illustrative and may vary in different embodiments.

In at least one embodiment thermal sensors 215A-D are situated in various locations on chip 205 to measure temperature of various areas of said chip, such as that of processor cores 210, other circuitry, or other materials. In at least one embodiment, various hardware and architectural constraints or design limitations do not afford temperature sensors to be ideally positioned with respect to processor cores 210 or other areas of said chip, and as such temperature sensors 215A-D may not accurately or uniformly detect hotspots on chip 205. In at least one embodiment, sustained processor core activity close to maximum clock speed (e.g., Fmax) can create thermal loading on that particular core, as well as potentially causing thermal loading on nearby cores, components, or materials. In at least one embodiment, a possibility of thermal overloading or a hotspot is increased when two or more processor cores are in close proximity to each other and operate in a state of sustained activity. In at least one embodiment, other proximity relationships, such as processor cores being near areas that have poor heat transfer, may also lead to hotspots.

In at least one embodiment, system 200 comprises firmware 220, configuration file 225, at ACPI 230, and policy 235. In at least one embodiment, one or more of firmware 220, configuration file 225, ACPI 230, and policy 235 are included in chip 205.

In at least one embodiment, firmware 220 comprises software instructions to be executed by a processor, such as any one or more of processor cores 210. In at least one embodiment, said instructions are stored in one or more read-only memories, such as one or more read-only memories of system 200 or chip 205.

In at least one embodiment, instructions in firmware 220 are performed, to cause system 200 to validate that a recent version of a most up-to-date worst-case thermal scenarios from a configuration file 225 has been read; to validate ACPI 230 tables have been updated; and to confirm that thermal sensors are being employed to monitor thermal conditions on chip 205. In at least one embodiment, said instructions are performed to update policy 235. In at least one embodiment, policy 235 comprises software and/or data to implement a thermal policy on chip 205. In at least one embodiment, said instructions update policy 235 with any newly identified patterns of processor core utilization, such as worst-case processor core combinations.

Figure 3:
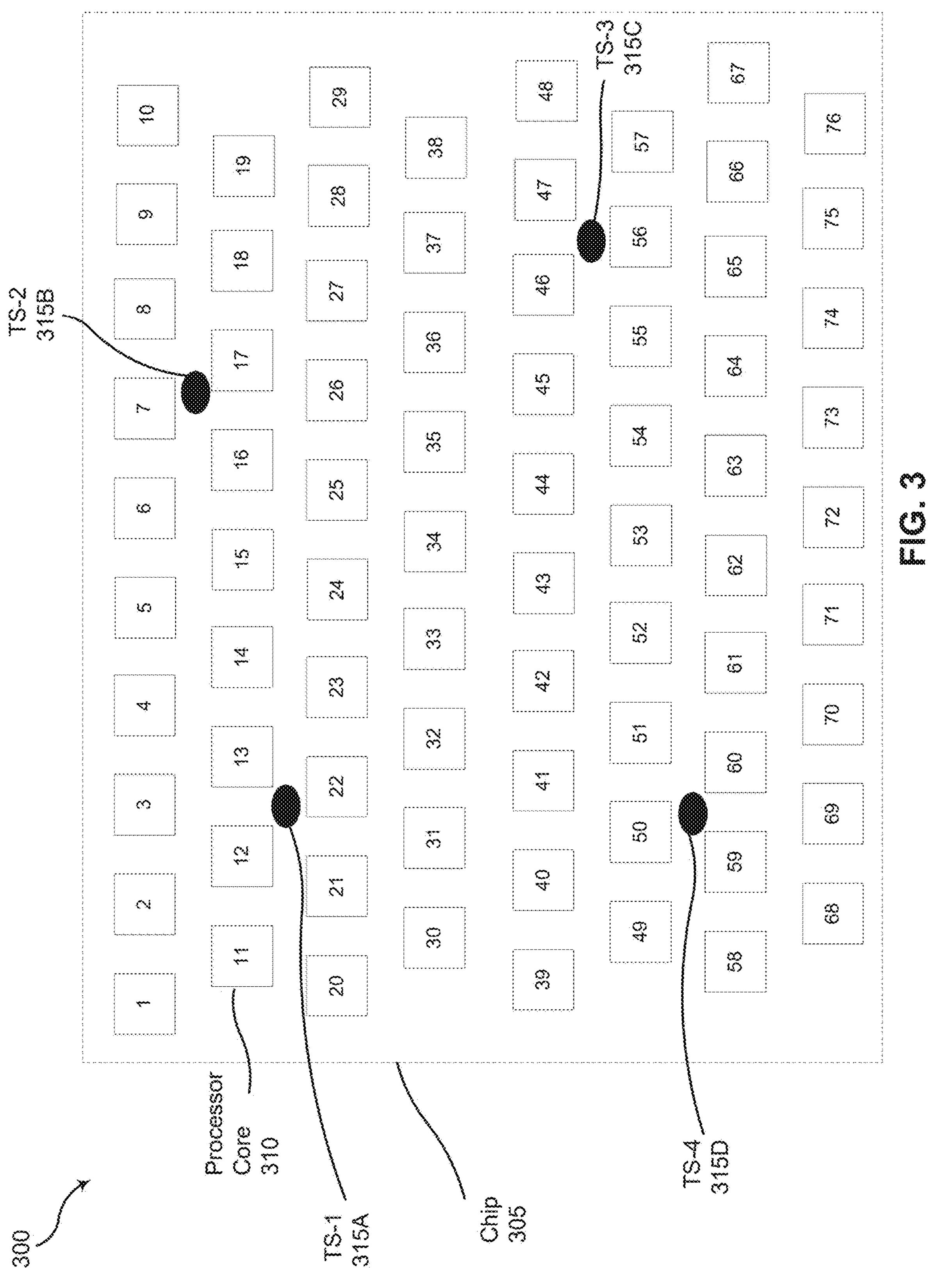
FIG. 3 illustrates a multiple core processor chip, in accordance with at least one embodiment.

FIG. 3 illustrates a multiple core processor chip, in accordance with at least one embodiment. In at least one embodiment, system 300 depicts a chip 305 that corresponds to chip 205 of FIG. 2. an arrangement of processor cores on a CPU. In at least one embodiment, processor cores 310 are used in various combinations according to a workload. In at least one embodiment, software and/or firmware, such as operating system software and/or firmware such as the firmware 220 depicted in FIG. 2, determine which processor cores 210 should be utilized to perform said workload. In at least one embodiment, this workload may be distributed across selected ones of processor cores 210.

In at least one embodiment, said workload could comprise an application comprising threads scheduled on a subset of cores of a total number of processors available. In at least one embodiment, for example, cores 12 and 22 might be selected to perform said threads, or in another case cores 15 and 16 might be selected.

In at least one embodiment, some of thermal sensors 315A-D will more accurately measure temperature from certain of processing cores 210 than it will of others. In at least one embodiment, thermal sensors 315A-D more accurately measure thermal output of processor cores 210 that are most proximate to said sensor. In at least one embodiment, for example, a thermal sensor TS-1 will more accurately reflect actual temperatures at processor cores 12, 13, 21 and 22 than other thermal sensors on chip 305. In at least one embodiment, a thermal condition of some processor cores, or other circuitry, areas, or components of chip 305, are not accurately measured by any thermal sensor. For example, in at least one embodiment, a processor core, such as processor core 34 as depicted in FIG. 3, is not near any of thermal sensors 315A-D, and its temperature may therefore not be accurately measured.

In at least one embodiment, system 300 measures temperature on chip 305 and adjusts one or more clock speeds of one or more processor cores. In at least one embodiment, by lowering a clock speed, it is possible to lower heat generated by a given processor core because thermal energy is a by-product of computational processing. In at least one embodiment, lowering a processing speed (clock speed) of one or more processor cores, however, reduces computational performance. In at least one embodiment, problems associated with some thermal management problems are avoided; these problems may include a thermal management policy that is too conservative by lowering the processor clock speed by more than is necessary to prevent failure from thermal overloading, or not conservative enough, in that it is results in thermally-induced failure.

In at least one embodiment, a thermal management policy is implemented by dynamically collecting sensor readings of temperature during use and correlating those sensor readings with processor activity. In at least one embodiment, firmware, such as firmware 220 of FIG. 2, monitors these temperature readings and when a temperature reaches a given threshold, throttle back processor activity for processor cores that may contributed to an adverse thermal condition. In at least one embodiment, to 'throttle back' processor activity includes lowering a clock speed of one or more processor cores. In at least one embodiment, temperature sensors are not ideally distributed on chip 305, which can mean that said sensors inaccurately measure temperatures in some regions of said chip. In at least one embodiment, a scalar temperature offset is added to temperature readings obtained at a sensor location. In at least one embodiment, this value is adjusted according to distance from a processor core to estimate an actual temperature at said core. In at least one embodiment, assigning an offset to a sensor reading is intended to more accurately reflect an actual temperature of a processor which, will in turn, avoid failure due to thermal overloading. In at least one embodiment, using offsets in this manner could degrade performance in some circumstances, because for example it might result in an over-aggressive or under-aggressive thermal policy, but this consequence is avoided by identifying and/or preventing certain patterns of processor core utilization.

Figure 4:
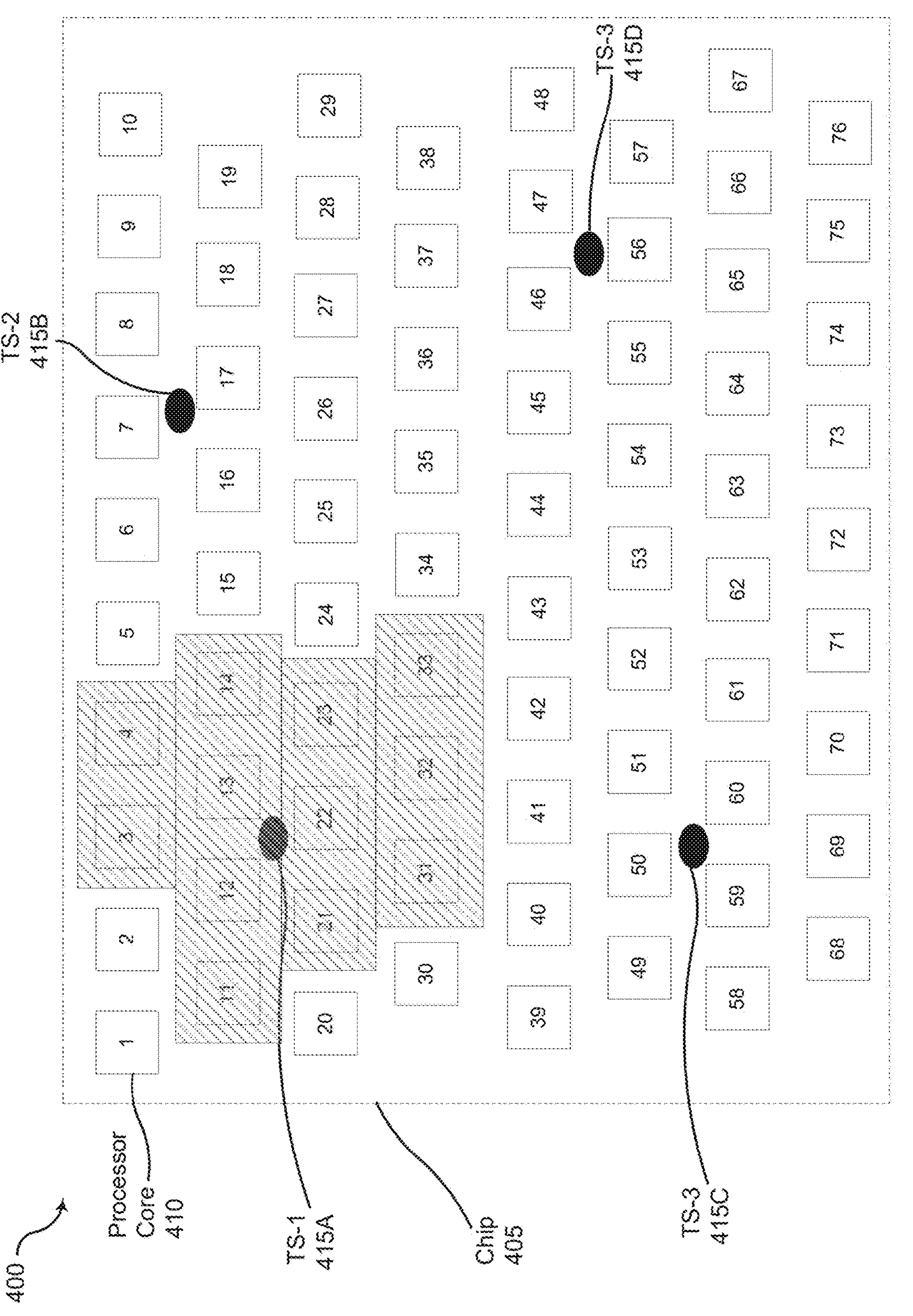
FIG. 4 illustrates a multiple core processor chip with a combination of processor cores in use, in accordance with at least one embodiment.

FIG. 4 illustrates a multiple core processor chip with a combination of processor cores in use, in accordance with at least one embodiment. In at least one embodiment, system 400 corresponds to system 200 or 300 as illustrated by FIGS. 2 and 3, respectively, and includes processor cores 410 and thermal sensors 415A-D corresponding to similarly named elements in those figures. In at least one embodiment, as illustrated in FIG. 4 using cross-hatching, certain processor cores are selected to perform threads associated with a computing workload. In at least one embodiment, a thermal sensor TS-1 415A records temperature readings associated with thermal conditions for processor cores in TS-1's local region on chip 405. In at least one embodiment, if these processors generate a hotspot, a thermal sensor TS-1 might accurately measure temperature. In at least one embodiment, however, this pattern of processor core utilization might cause hotspots in a portion of chip 405 that is not accurately measured by TS-1, such as in a region near processor core 33. In at least one embodiment, however, this problem might be avoided by identifying a pattern of processor core utilization that contributes to this condition. In at least one embodiment, said pattern might be identified based on a physical location of said cores on chip 405. In at least one embodiment, said pattern might be indicated in a configuration file, such as configuration file 225 depicted in FIG. 2. In at least one embodiment, one or more thermal management policies may be applied in response to identifying said pattern. In at least one embodiment, a response to said identification might comprise adjusting a thermal offset. In at least one embodiment, a response to said identification might comprise changing how said processor cores 410 are utilized, in order to avoid said pattern.

Figure 5:
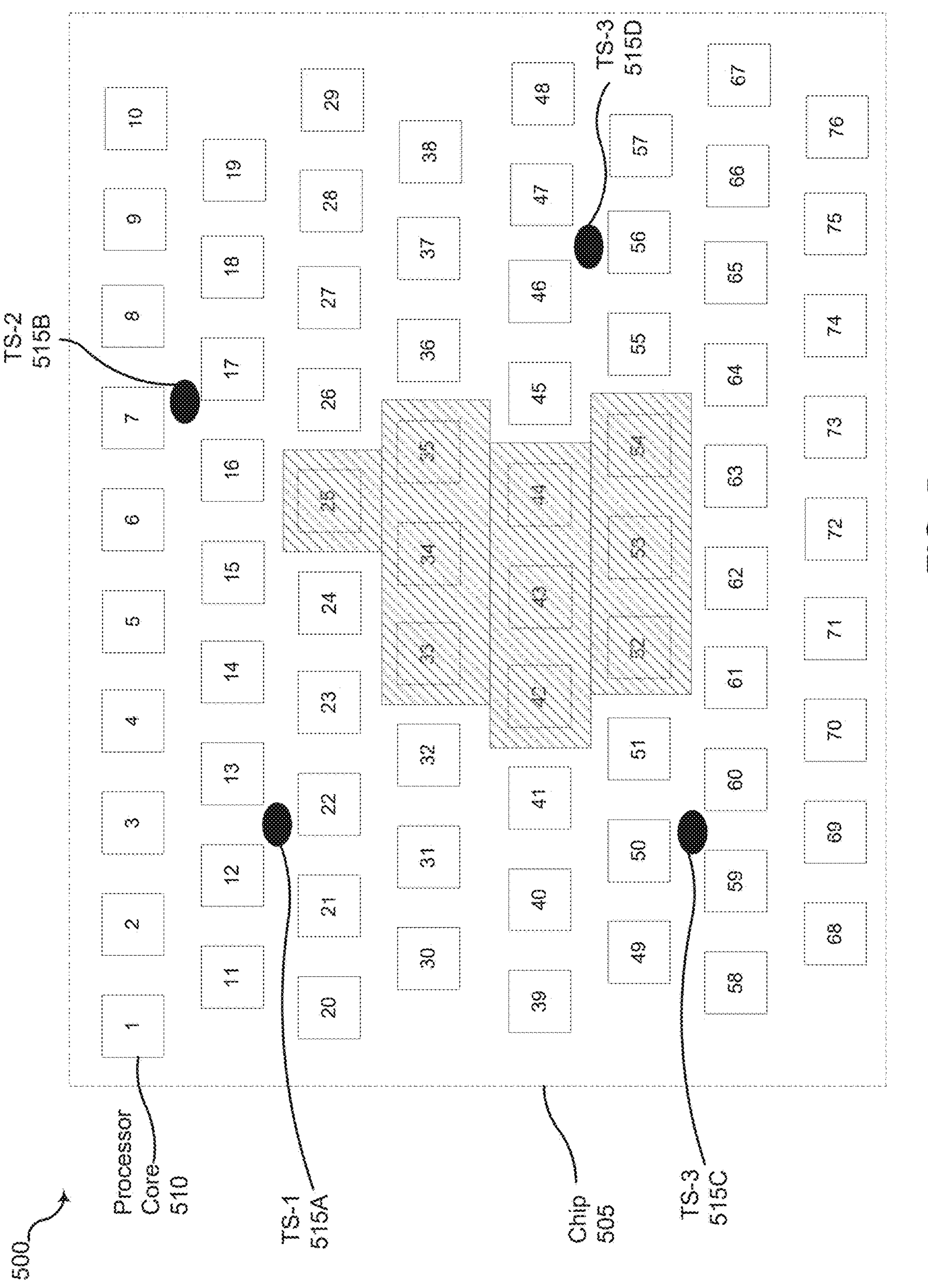
FIG. 5 illustrates a block diagram of a multiple core processor chip with Oa different combination of processor cores in use, in accordance with at least one embodiment.

FIG. 5 illustrates a block diagram of a multiple core processor chip with combination of processor cores in use, in accordance with at least one embodiment. In at least one embodiment, system 500 corresponds to systems 200, 300, and/or 400 depicted in FIGS. 2, 3, and 4, respectively. In at least one embodiment, system 500 comprises a chip 505 corresponding to chips 205, 305, and/or 405, as depicted in respective FIGS. 2-4, and likewise comprising processor cores 410 corresponding to processor cores depicted in those figures. In at least one embodiment, a set of processor cores 410 is selected to perform threads associated with a workload, such as processor cores 25, 33, 34, 35, 42, 43, 44, 52, 53, and 54 (depicted with cross-hatching in FIG. 5). In at least one embodiment, these processor cores generate thermal conditions not accurately detected by any of sensors TS-1, TS-2, TS-3, or TS-4, and continued operation at similar levels.

In at least one embodiment, to guard against such thermal failures, an offset adjustment technique is used. In at least one embodiment this offset compensates for potentially inaccurate temperature reading at one or more processors by adding an offset to a recorded temperature. In at least one embodiment, said firmware thus compensates for said sensors' temperature record and makes this offset determination based on a number and location of processor cores in use. In at least one embodiment, this determination is based on one or more indicated patterns of core utilization. In at least one embodiment, said patterns are indicated in a configuration file. In at least one embodiment, said patterns are determined dynamically. In at least one embodiment, said patterns indicate patterns of proximity of processor cores that may contribute to adverse thermal conditions, such as hotspots not measured accurately by an onboard thermal sensor. In at least one embodiment, said patterns of proximity comprise on-chip locations. In at least one embodiment, said patterns of proximity comprise on-chip distance. In at least one embodiment, said patterns of proximity comprise relative locations, which could for example include relationship between processor cores to other cores, circuitry, components, materials, and/or temperature sensors.

Figure 6:
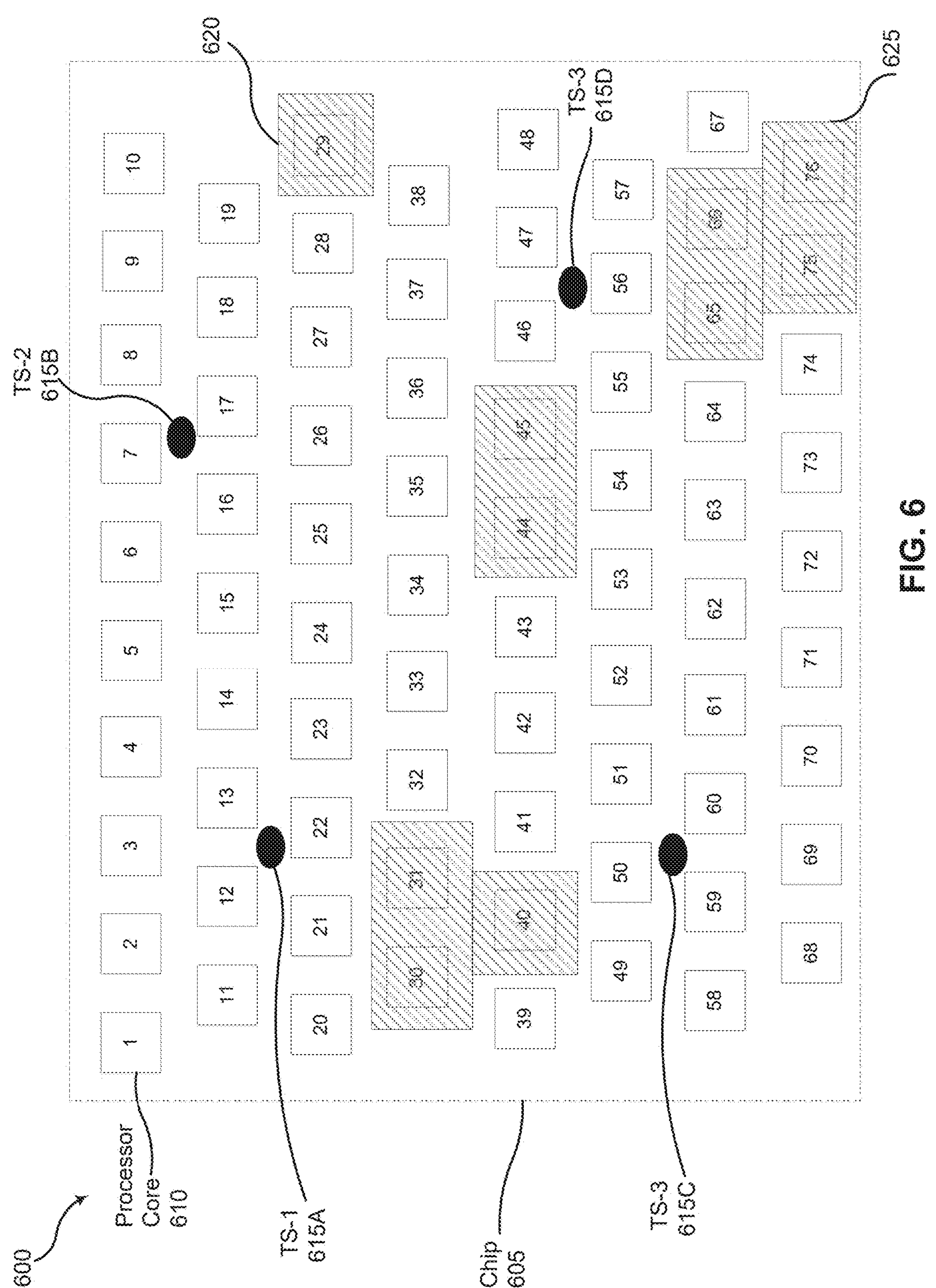
FIG. 6 illustrates a block diagram of a multiple core processor chip with different combinations of processor cores in use, in accordance with at least one embodiment.

FIG. 6 illustrates a block diagram of a multiple core processor chip with different combinations of processor cores in use, in accordance with at least one embodiment. In at least one embodiment, system 600 corresponds to one or more of systems 200, 300, 400, or 500 depicted in FIGS. 2-5, respectively. In at least one embodiment, potential patterns of utilization that might be detected include clusters of processor cores located at a distance from thermal centers. It will be appreciated, however, that these examples are intended to be illustrative rather than limiting.

Figure 7:
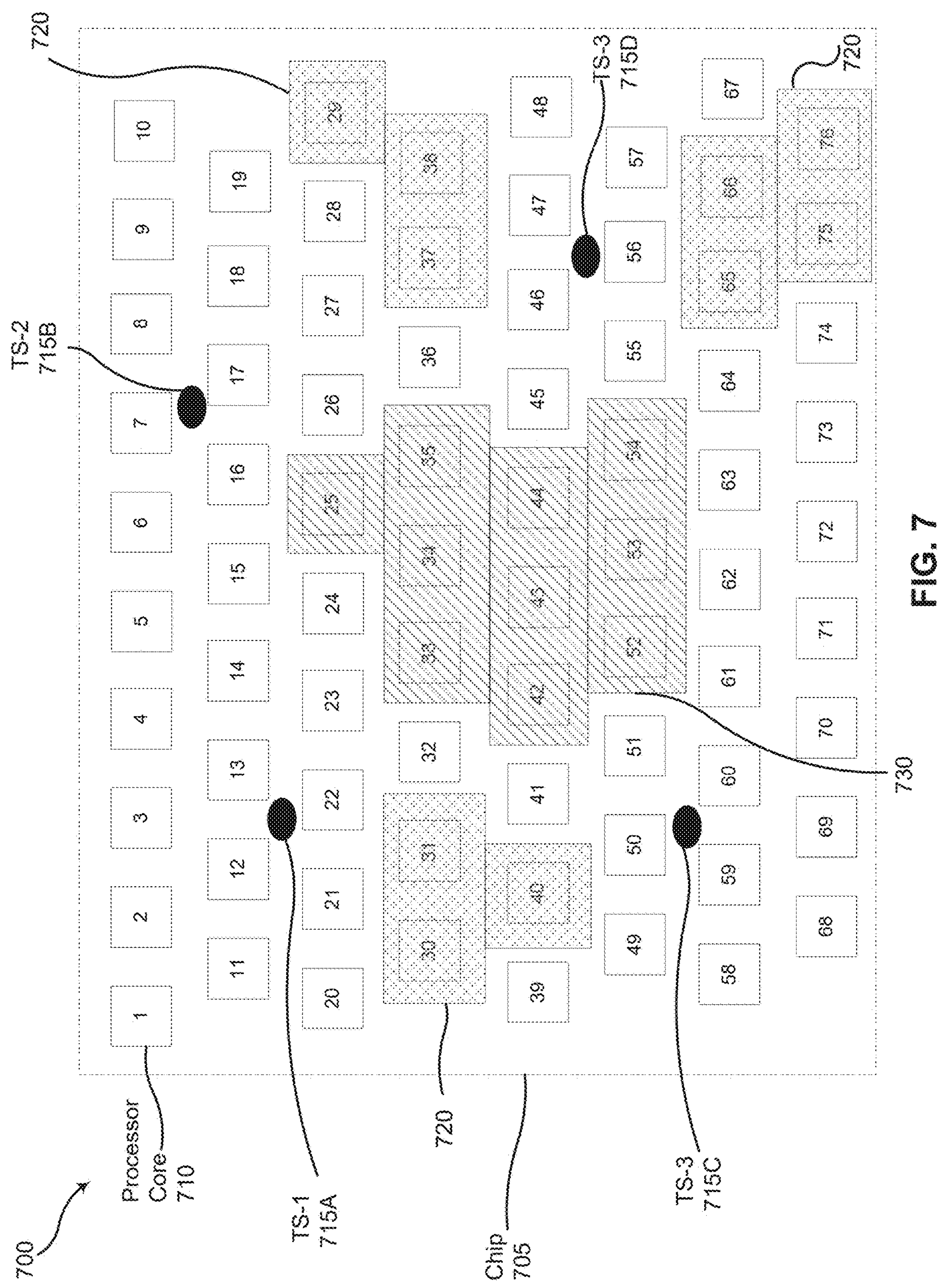
FIG. 7 illustrates a block diagram of a multiple core processor chip with different combinations of processor cores in use, in accordance with at least one embodiment.

FIG. 7 illustrates a block diagram of a multiple core processor chip with different combinations of processor cores in use, in accordance with at least one embodiment. In at least one embodiment, system 700 corresponds to one or more of system 200, 300, 400, 500, and 600 as depicted in FIGS. 2-6, respectively.

In at least one embodiment, as depicted by FIG. 7, an initial pattern of core utilization might comprise processor cores 730 whose proximity to each other and/or other components of chip 705 may generate an adverse thermal condition. In at least one embodiment, this pattern is recognized. In at least one embodiment, this is done by software and/or firmware of system 700 and/or chip 705, which compares current observed processor core utilization to patterns of processor core utilization that are indicated as potentially causing an adverse thermal condition. In at least one embodiment, said software and/or firmware, when performed by a processor, causes workload to be reassigned to other processors, so that usage according to said pattern is ended. In at least one embodiment, said software might, for example, cause workload to be assigned to other processor cores 720 at other locations on chip 705. Similarly, said software and/or firmware, when performed by a processor, may proactively schedule workload to processor cores so as to prevent adverse patterns of processor utilization from occurring.

In at least one embodiment, instead of reassigning workload, processor cores associated with said adverse pattern might be clock-adjusted so that at least some processors are operating at a temperature low enough to avoid an adverse thermal condition. For example, processors 34, 43, and 53 in region 730 might have there clocks scaled downwards, to below a threshold amount, in order to avoid an adverse pattern of processor core utilization consisting of all of processors in region 730 operating at or above said threshold.

Figures 8A, 8B:
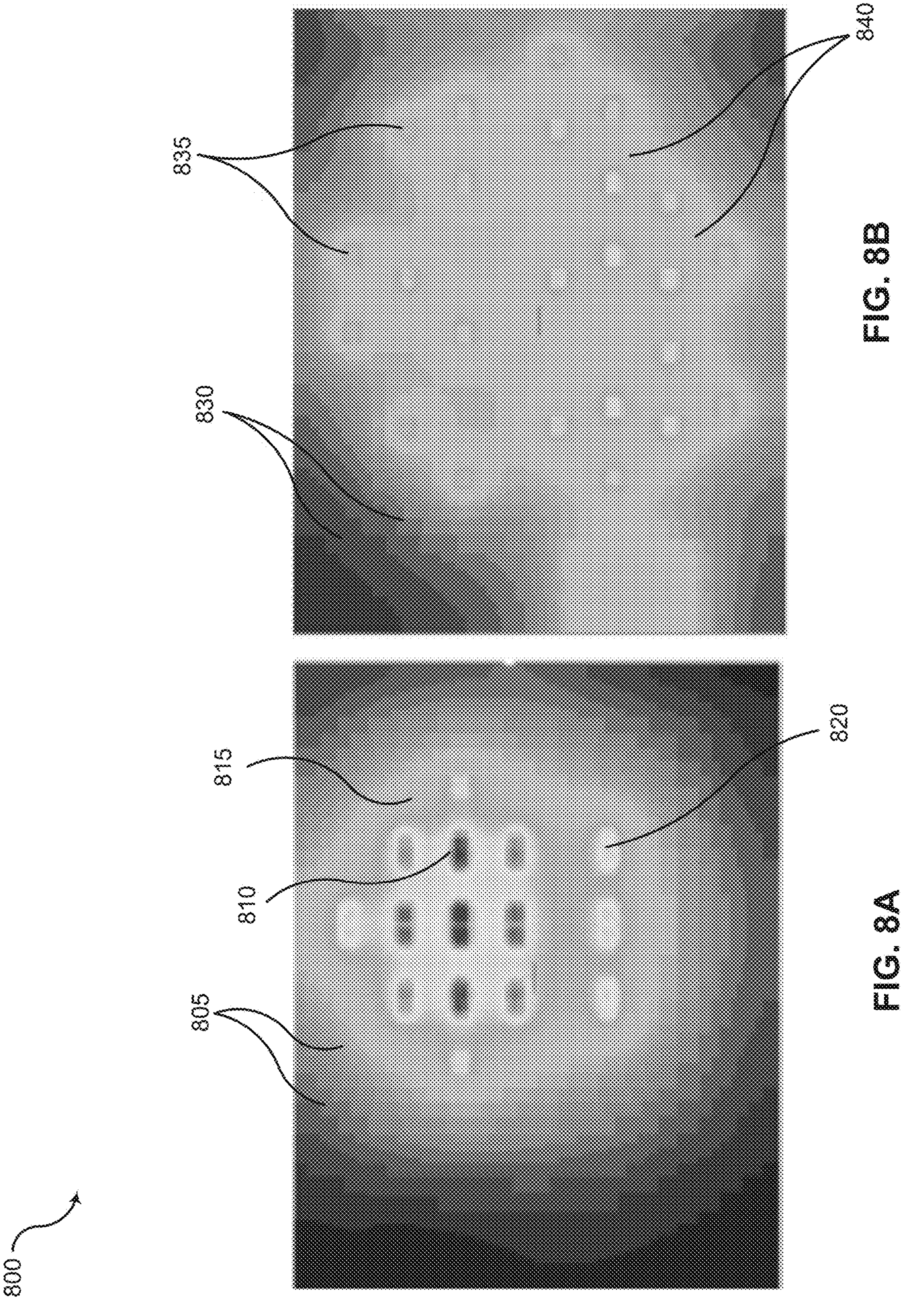
FIG. 8A shows a thermal map of a processor die illustrating one example of a worst-case thermal hotspot, in accordance with at least one embodiment.
FIG. 8B shows a thermal map of a processor die illustrating a uniformly loaded core configuration without a thermal hotspot, in accordance with at least one embodiment.

FIG. 8A shows a thermal map of a processor die illustrating one example of a worst-case thermal hotspot, in accordance with at least one embodiment. In at least one embodiment, a region 810 of a processor chip includes a number of active processors in proximity to each other, and that might generate a thermal hotspot that, if left unaddressed, could lead to thermal-induced failure. Other spots, such as at 820, have active processors that are not arranged in a pattern that would cause a thermal hotspot.

In at least one embodiment, as depicted by FIG. 8, said processor chip may be progressively less hot moving away from this region, as seen by points 805. In at least one embodiment, excessive heat buildup might be identified by a thermal sensor located at 815, but not at points 805. In at least one embodiment, software and/or firmware controlling operation of said chip might therefore reschedule workload, or prevent workload from being assigned, to processor cores in a configuration such as is seen in region 810. In at least one embodiment, this might be done as depicted by FIG. 8B, which shows a thermal map of a processor die illustrating a uniformly loaded core configuration without a thermal hotspot, in accordance with at least one embodiment. In at least one embodiment, this illustration shows regions shown like 835 background 840 and an absence of thermally perilous hotspots seen at 810 or 820. In a configuration shown in this embodiment, processors are not thermally overloaded and performance is not impeded.

In at least one embodiment, if an adverse pattern of core utilization is identified, a thermal management policy may be applied to adjust thermal offsets. In at least one embodiment, pseudo-code associated with a thermal management policy is expressed as follows:

```
TJmax = Tavg + TJ__HOTSPOT__OFFSET;
if (WORST CASE__CORE__CONFIG__THERMAL = 1)
  then (TJ__HOTSPOT__OFFSET = 15)
else (TJ__HOTSPOT__OFFSET = 7);
```

where 15 is a higher thermal offset value and 7 is a lower thermal offset value. It will be appreciated that this example is illustrative and should not be construed as limiting.

In at least one embodiment, a thermal management policy's logic distinguishes between processor cores whose temperatures are accurately measured by on-board thermal sensors and processor cores that are not measured by thermal sensors. In at least one embodiment, processors in certain processor core combinations may require less or no thermal offset because a nearby temperature sensor correctly measures their temperatures. In at least one embodiment, in a contrasting scenario, certain processor core combinations are identified as adverse patterns of processor core utilization. In at least one embodiment, a thermal management policy assigns a higher offset value to these processors and firmware then uses said offsets to trigger throttling. In at least one embodiment, performance for these processors is lowered, but said processor cores do not overheat or cause failure. In at least one embodiment, processor cores in such a processor core combination are assigned a lower thermal offset to compensate for the fact that their actual temperature is not accurately measured by a thermal sensor. In at least one embodiment, an adverse scenario may be identified as being less than a worst-case scenarios, and in such cases may be used with a thermal offset that is greater than what would might be used in non-adverse patterns but less than what might be used in a worst-case pattern.

Figure 9:
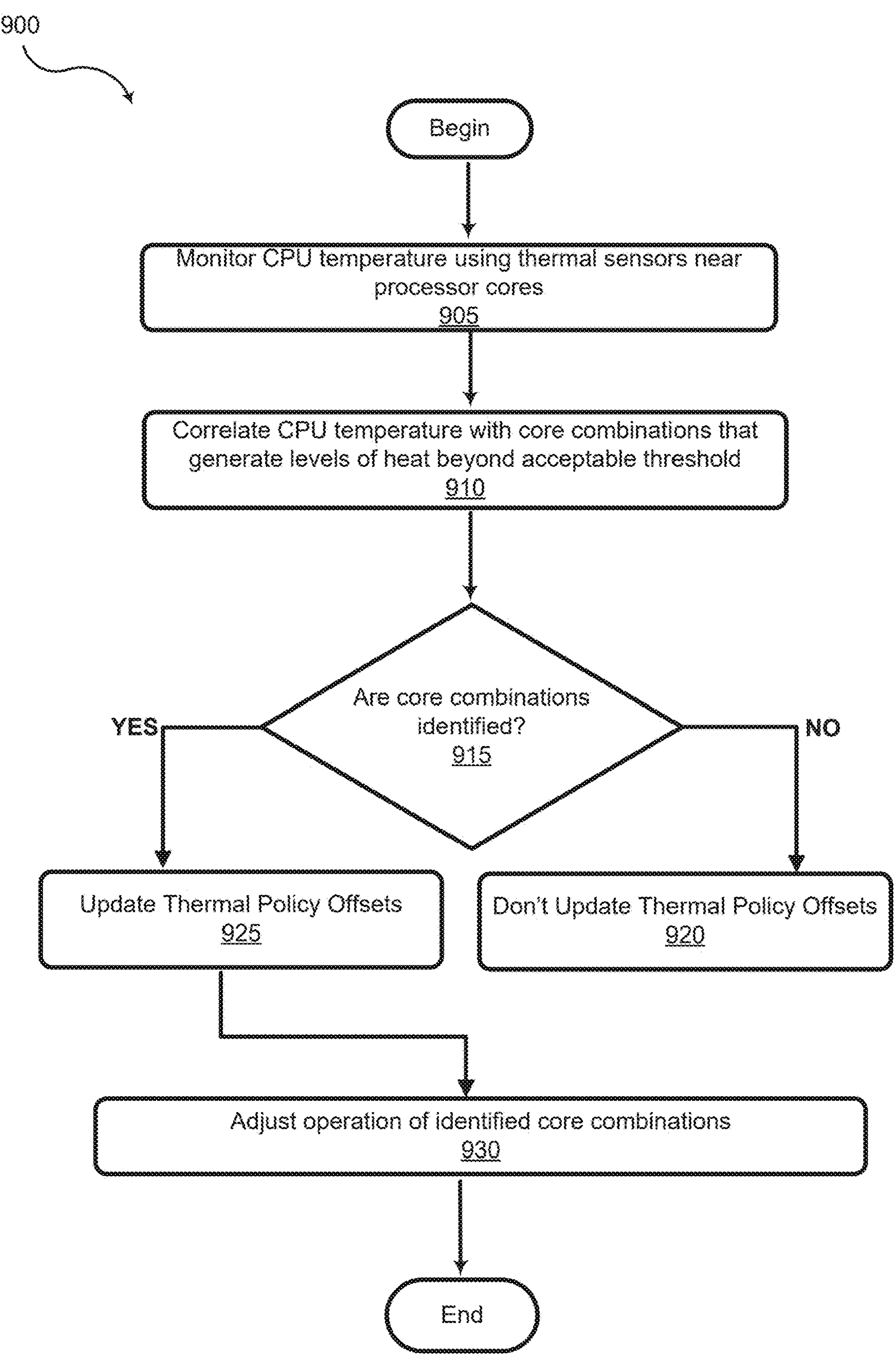
FIG. 9 shows a process flow for implementing a thermal policy management system, in accordance with at least one embodiment.

FIG. 9 shows a process flow for implementing a thermal policy management system, in accordance with at least one embodiment. In at least one embodiment, process 900 comprises steps or operations for updating a thermal management policy. In at least one embodiment, process 900 is performed by firmware, such as firmware 220 depicted in FIG. 2 or referenced herein regarding any of FIGS. 1-8. In at least one embodiment, said firmware monitors, at 905, temperature using thermal sensors near processor cores.

In at least one embodiment, CPU temperatures are, at 910, monitored and correlated with processor core combinations that are associated with adverse thermal conditions.

In at least one embodiment, at 915, process 900 comprises determining if a core combination associated with an adverse thermal condition is identified. In at least one embodiment, this comprises determining if processor cores operating at or near peak processing capacity correspond, in view of their proximity to each other and/or other chip components, to a pattern of processor core utilization that is associated with an adverse thermal condition.

In at least one embodiment, such a combination is identified at 915, then that thermal policy offsets are updated, at 925. In at least one embodiment, no such combinations are identified, then thermal policy offsets are not be updated, at 920.

In at least one embodiment, if a processor core combinations has been identified at 915, then operation of processor cores in said combination may be adjusted. For example, in at least one embodiment, an ACPI table may be adjusted to cause one or more processors in said combination to be used at a lower capacity, or to be temporarily disabled, at 930.

Figure 10:
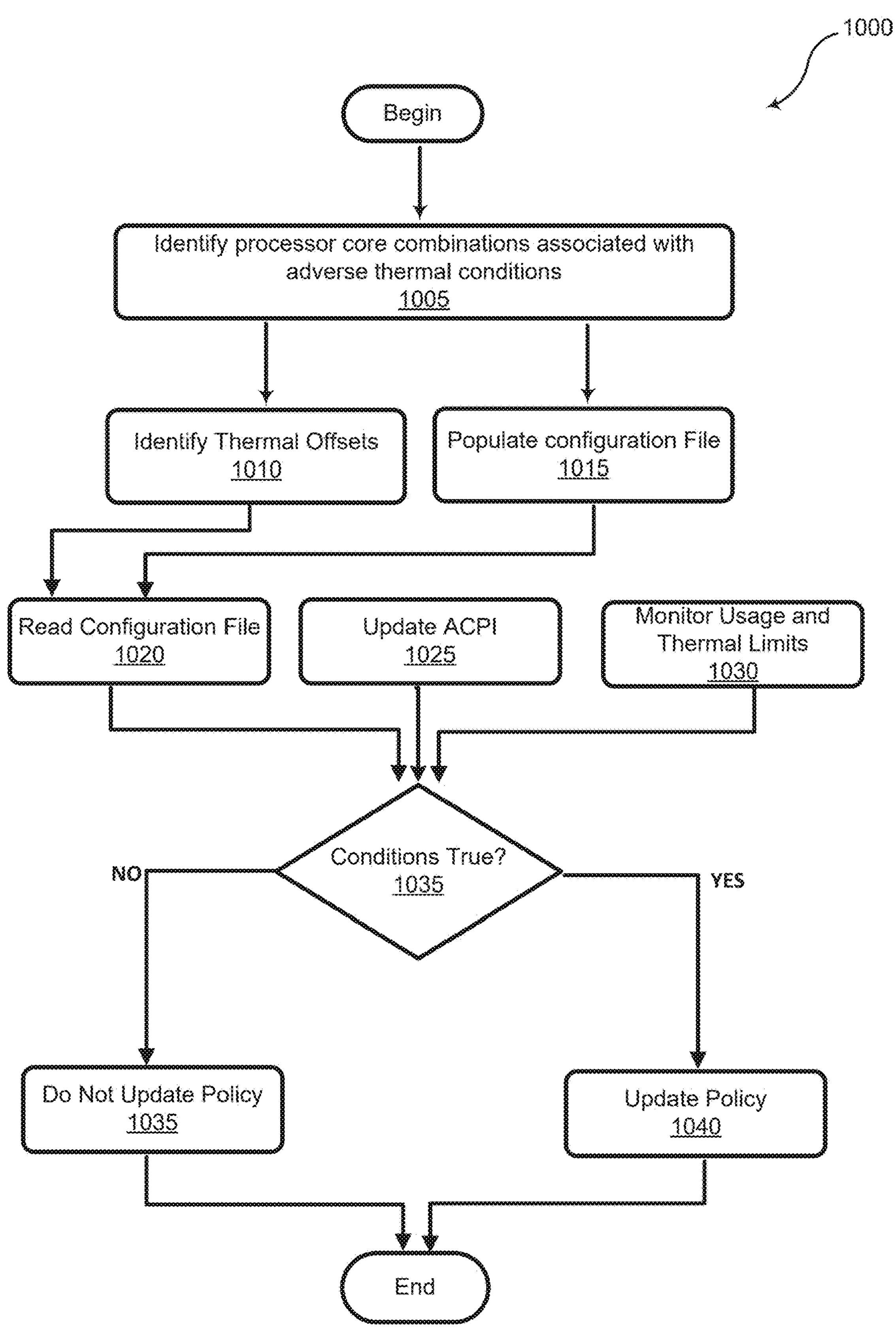
FIG. 10 shows a process for updating thermal policy offsets, in accordance with at least one embodiment.

FIG. 10 shows a process for updating thermal policy offsets, in accordance with at least one embodiment. In at least one embodiment, process 900 comprises steps or operations for updating a thermal management policy. In at least one embodiment, process 900 is performed by firmware, such as firmware 220 depicted in FIG. 2 or referenced herein regarding any of FIGS. 1-8. In at least one embodiment, said firmware monitors, at 905, temperature using thermal sensors near processor cores.

In at least one embodiment, processor core combinations that are associated with adverse thermal conditions are identified, at 1005. In at least one embodiment, one or more thermal offsets are identified based on said combinations, at 1010. In at least one embodiment, at 1015, said combinations are used to populate a configuration file, such as configuration file 225, to indicate said combinations.

In at least one embodiment, operations described in relation to elements 1005-1015 are performed using one or more test systems or simulations, whereas subsequent operations described in relation to elements 1020-1040 are performed by a system, such as any systems described in relation to FIGS. 2-7.

In at least one embodiment, process 1000 comprises reading said combinations. at 1020. In at least one embodiment, this is done by software and/or firmware, such as firmware 220 of system 200, or similarly named components illustrated in FIGS. 3-7.

In at least one embodiment, process 1000 comprises updating an ACPI table to indicate thermal policies, at 1025. In at least one embodiment, this is done by software and/or firmware, such as firmware 220 of system 200, or similarly named components illustrated in FIGS. 3-7.

In at least one embodiment, process 1000 comprising monitoring operation of processor cores, and output of thermal sensors, determines if any of said combinations are occurring, and determines if any thermal limits have been exceeded, at 1030. In at least one embodiment, this is done by software and/or firmware, such as firmware 220 of system 200, or similarly named components illustrated in FIGS. 3-7.

In at least one embodiment, process 1000 comprises performing an evaluation to determine if conditions are true relative to operations described in relation to elements 1020, 1025 and 1030. In at least one embodiment, if all of these conditions are evaluated as true, then a thermal management policy is updated 1040. In at least one embodiment, said update comprises adjusting a thermal offset to account for an identified pattern of core utilization. In at least one embodiment, said update comprises disabling or throttling processor cores to avoid an adverse pattern of processor core utilization. In at least one embodiment, this is done by software and/or firmware, such as firmware 220 of system 200, or similarly named components illustrated in FIGS. 3-7.

In at least one embodiment if conditions evaluated at decision block 1035 are not evaluated to be true, then said policy is not updated, at 1035.

Figure 11:
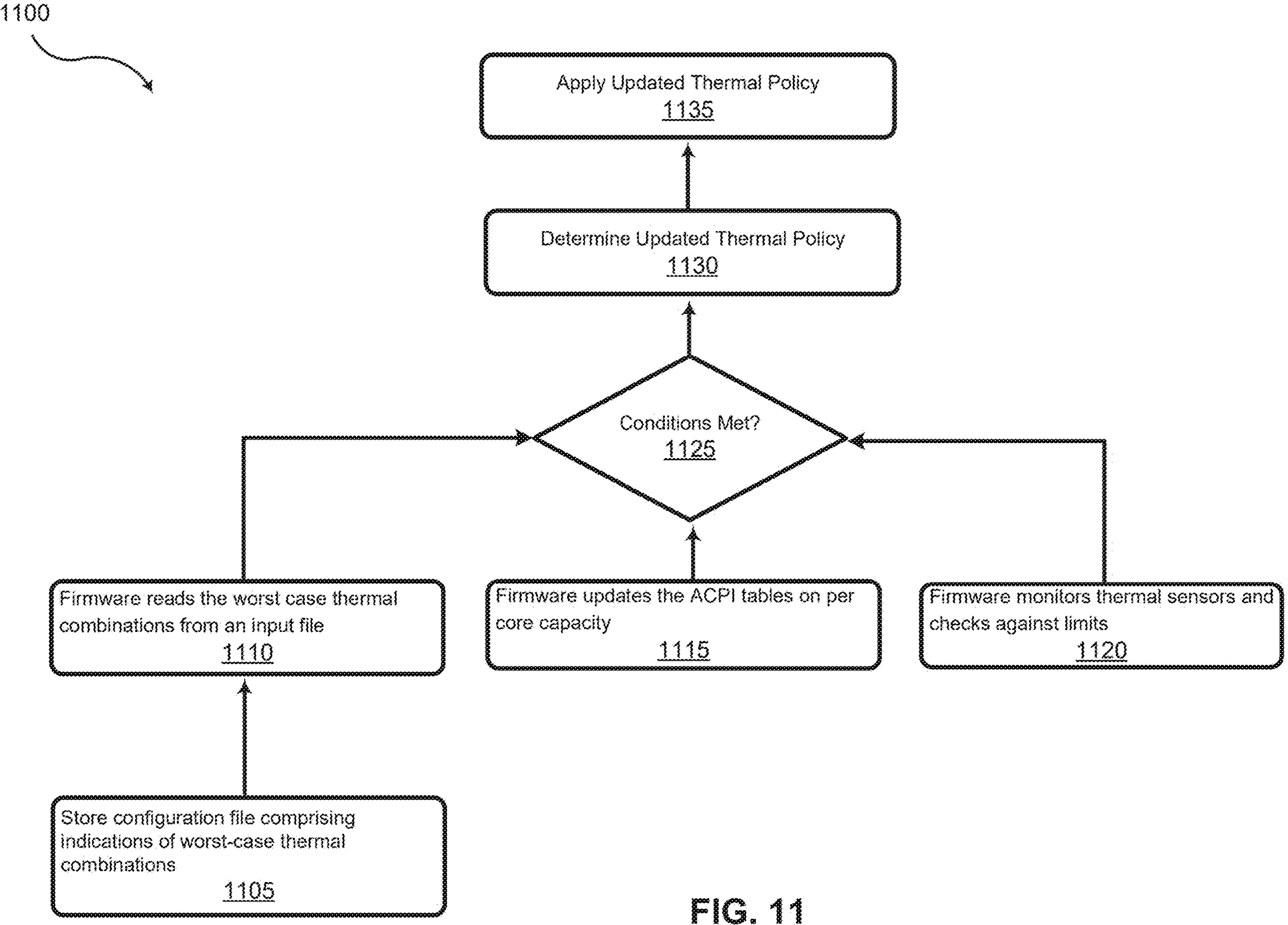
FIG. 11 illustrates a process of a system implementing thermal policy management, in accordance with at least one embodiment.

FIG. 11 illustrates a process of a system implementing thermal policy management, in accordance with at least one embodiment. In at least one embodiment, process 1100 is performed by a system, such as any of the systems described in relation to FIGS. 2-7.

In at least one embodiment, at 1105, worst-case thermal combinations are identified and a configuration file, such as configuration file 225, is populated with this information. In at least one embodiment, this is performed prior to operation of a system implementing a reminder of process 1100. In at least one embodiment, said combinations, or other combinations of processor core utilization, are identified dynamically. In at least one embodiment, these operations are done by software and/or firmware, such as firmware 220 of system 200, or similarly named components illustrated in FIGS. 3-7.

In at least one embodiment, at 1110, said configuration file is read, loaded into memory or otherwise processed. In at least one embodiment, this is done by software and/or firmware, such as firmware 220 of system 200, or similarly named components illustrated in FIGS. 3-7.

In at least one embodiment, at 1115, ACPI tables are updated to indicate how one or more processor cores should be used. In at least one embodiment, this is done by software and/or firmware, such as firmware 220 of system 200, or similarly named components illustrated in FIGS. 3-7.

In at least one embodiment, at 1120, thermal sensors are monitored and checked against limits. In at least one embodiment, this is done by software and/or firmware, such as firmware 220 of system 200, or similarly named components illustrated in FIGS. 3-7.

In at least one embodiment, at 1125, it is determined if conditions indicated by operations 1110, 1115, and 1120 are met. In at least one embodiment, if so, at 1130 an updated thermal management policy determined, and set at 1135. In at least one embodiment, these operations are done by software and/or firmware, such as firmware 220 of system 200, or similarly named components illustrated in FIGS. 3-7. In at least one embodiment, updating said thermal policy comprises setting a worst-case thermal offset for applications exhibiting a worst-case thermal scenario, such as a worst-case pattern of core utilization. In at least one embodiment, updating said thermal policy comprises setting an adjusted thermal offset for applications or workloads exhibiting a pattern of core utilization that is associated with an adverse thermal condition. In at least one embodiment, updating said thermal policy comprises setting a lowered thermal offset for applications or workloads exhibiting a pattern of core utilization that is not associated with an adverse thermal condition. In at least one embodiment, policies for applications or workloads not associated with worst-case or otherwise adverse thermal conditions are not updated. In at least one embodiment, application of said thermal policy or policies comprises adjusting thermal offsets associated with processors used by said applications or workloads.

Figure 12:
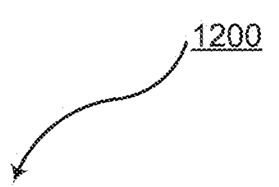
FIG. 12 illustrates a processor-module, in accordance with at least one embodiment.

FIG. 12 illustrates a processor-module, in accordance with at least one embodiment. In at least one embodiment, 1200 depicts processor 1205 and modules, in accordance with at least one embodiment. In at least one embodiment, a processor 1205 performs one or more processes such as those described herein for scaling one or more clocks of one or more cores, based at least in part on a proximity of the one or more cores to each other as shown in FIG. 1, and/or implementation variations described in the associated narrative. In at least one embodiment, processor 1205 performs said active learning process as described in connection with FIG. 1. In at least one embodiment, processor 1205 performs one or more processes such as those described in connection with FIG. 1 through FIG. 11.

In at least one embodiment, processor 1205 comprises one or more processors such as those described in connection with FIGS. 14 through 50B. In at least one embodiment, processor 1205 is any suitable processing unit and/or combination of processing units, such as one or more CPUs, GPUs, GPGPUs, PPUs, and/or variations thereof. In at least one embodiment, processor 1205 comprises a CPU Temperature Monitor & Policy Update Module 1210 for monitoring CPU temperature and for updating thermal management policy offsets, a Worst Case Scenarios Identification and & Policy Update Module 1215, and Hotspot Offset Management module 1220 for generating one or more new hotspot offset(s) and/or otherwise managing hotspot offsets in a thermal management policy. In at least one embodiment, CPU Temperature Monitor & Policy Update Module 1210 is for monitoring CPU temperature and for updating thermal management policy offsets, Worst Case Scenarios Identification and & Policy Update Module 1215 for identifying worst case scenarios and for updating thermal management policy, and Hotspot Offset Management Module 1220 for generating and/or managing one or more new hotspot offset(s) are part of processor 1205 and/or one or more other processors. In at least one embodiment, CPU Temperature Monitor & Policy Update Module 1210 for monitoring CPU temperature and for updating thermal management policy offsets, Worst Case Scenarios Identification and & Policy Update Module 1215 for identifying worst case scenarios and for updating thermal management policy, and Hotspot Offset Management Module 1220 for generating and/or managing one or more new hotspot offset(s) are distributed among multiple processors that communicate over a bus, network, by writing to shared memory, and/or any suitable communication process such as those described herein.

In at least one embodiment a portion or all of the functions, methods and functionality in one or more of these modules may be refactored from one of these modules into another module.

In at least one embodiment, as used in any implementation described herein, unless otherwise clear from context or stated explicitly to contrary, a module refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth. In at least one embodiment, a module performs one or more processes in connection with any suitable processing unit and/or combination of processing units, such as one or more CPUs, GPUs, GPGPUs, PPUs, and/or variations thereof.

In at least one embodiment, a CPU Temperature Monitor & Policy Update Module 1210 is a module that performs processing activities related to scaling one or more clocks of one or more cores, based at least in part on a proximity of the one or more cores to each other such as those described in connection with one or more of FIG. 1 through FIG. 11. In at least one embodiment, CPU Temperature Monitor & Policy Update Module 1210 performs one or more processes such as those described herein by at least including or otherwise monitoring temperature data of a CPU or processor cores of said CPU and updating thermal policy management elements with respect to said temperature data (e.g., by processor 1205). In at least one embodiment, CPU Temperature Monitor & Policy Update Module 1210 obtains or is otherwise provided with one or more neural networks (e.g., by one or more systems such as those described in connection with one or more of FIG. 1 through FIG. 11). In at least one embodiment, CPU Temperature Monitor & Policy Update Module 1210 performs processing activities related to protecting the confidentiality of data by encrypting the data as it is being processed. In at least one embodiment, a CPU Temperature Monitor & Policy Update Module 1210 performs processing activities related to protecting the confidentiality of data by encrypting the data as it is being processed.

In at least one embodiment a Worst Case Scenarios Identification and & Policy Update Module 1215 is a module that performs processing activities related to managing one or more tenant virtual machines created or under control of a hypervisor. In at least one embodiment, this module may also perform related activities such as performing variable assignments using the inputs, serializing and/or storing values in a database or other memory location or retrieving these values from storage or deserializing said data through one or more processes such as those described in connection with one or more of FIG. 1 through FIG. 11. In at least one embodiment, a Worst Case Scenarios Identification and & Policy Update Module 1215 performs one or more processes such as those described herein by at least including or otherwise encoding instructions that cause performance of or otherwise can be utilized to perform said one or more processes (e.g., by processor 1205). In at least one embodiment, a Worst Case Scenarios Identification and & Policy Update Module 1215 obtains or is otherwise provided with one or more neural networks (e.g., by one or more systems such as those described in connection with one or more of FIG. 1 through FIG. 11). In at least one embodiment, a Worst Case Scenarios Identification and & Policy Update Module 1215 performs processing activities related to identifying processor core worst case scenarios and updating thermal policy management elements with respect to said processor core worst case scenario through one or more processes such as those described in connection with FIG. 1 through FIG. 11. In at least one embodiment, a Worst Case Scenarios Identification and & Policy Update Module 1215 performs processing activities related to those described in connection with one or more of FIG. 1 through FIG. 11.

In at least one embodiment, a Hotspot Offset Management Module 1220 is a module that performs management and processing activities related to identifying processor cores that are deemed eligible to remain in operation but whose clocks are to be throttled by assigning an offset to said processor core(s). In at least one embodiment, this module may also perform related activities such as performing variable assignments using the inputs, serializing and/or storing values in a database or other memory location or retrieving these values from storage or deserializing said data through one or more processes such as those described in connection with one or more of FIG. 1 through FIG. 11. In at least one embodiment, a Hotspot Offset Management Module 1220 performs one or more processes such as those described herein by at least managing and processing activities related to identifying processor cores that are deemed eligible to remain in operation but whose clocks are to be throttled by assigning an offset to said processor core(s) (e.g., by processor 1205). In at least one embodiment, a Hotspot Offset Management Module 1220 obtains or is otherwise provided with one or more neural networks (e.g., by one or more systems such as those described in connection with one or more of FIG. 1 through FIG. 11). In at least one embodiment, Hotspot Offset Management Module 1220 performs processing activities related to encrypting and/or decrypting data that is communicated over an interconnect to or from a parallel processor through one or more processes such as those described in connection with one or more of FIG. 1 through FIG. 11. In at least one embodiment, a Hotspot Offset Management Module 1220 performs processing activities related to by at least managing and processing activities related to identifying processor cores that are deemed eligible to remain in operation but whose clocks are to be throttled by assigning an offset to said processor core(s) such as those described in connection with one or more of FIG. 1 through FIG. 11. In at least one embodiment, said Hotspot Offset Management Module 1220 can delete a hotspot offset from said thermal management policy.

API

Figure 13:
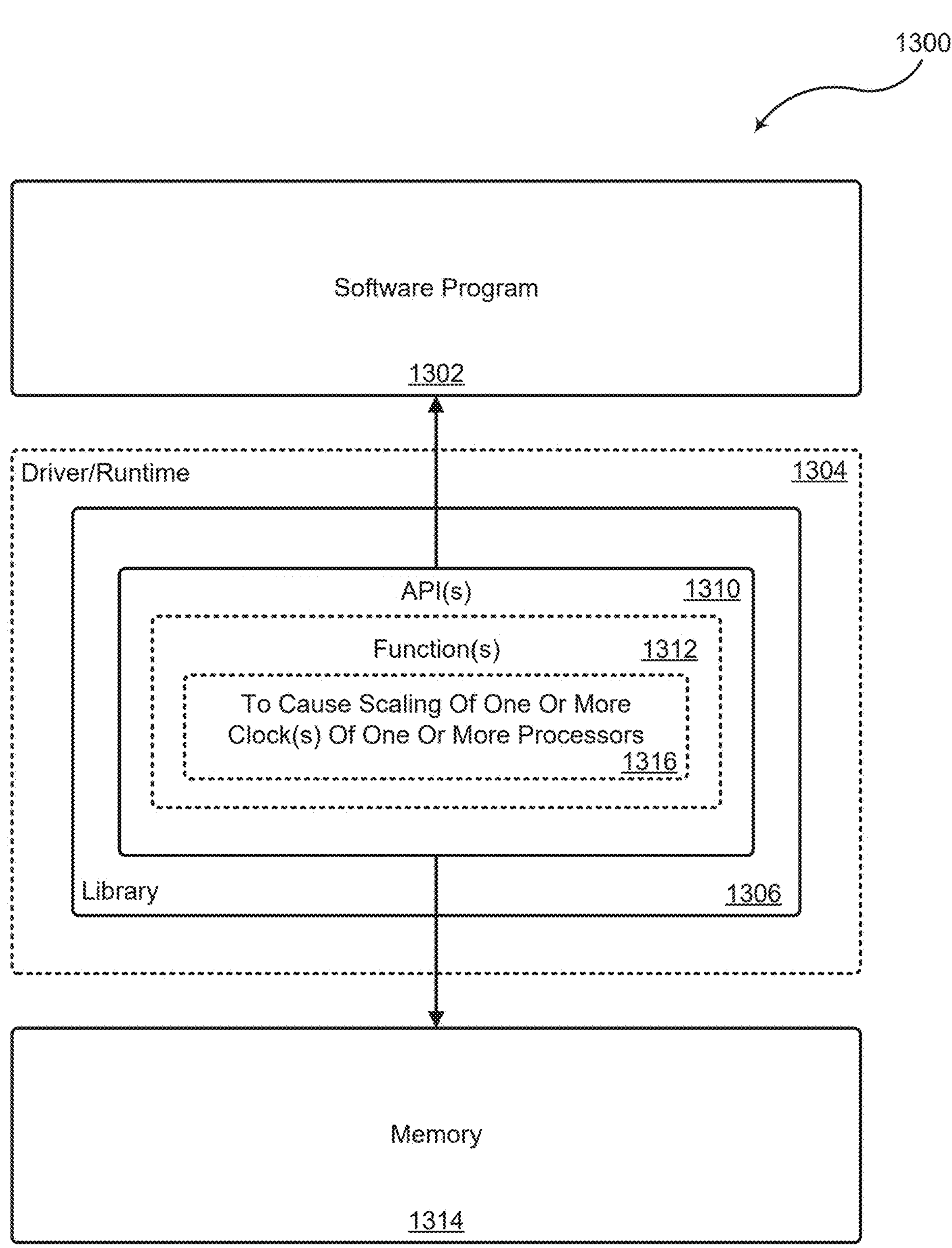
FIG. 13 depicts an API for scaling one or more clocks of one or more cores based, at least in part, on a proximity of the one or more cores to each other, in accordance with at least one embodiment.

FIG. 13 depicts an API for scaling one or more clocks of one or more cores based, at least in part, on a proximity of the one or more cores to each other, in accordance with at least one embodiment. In at least one embodiment, 1300 shows a block diagram illustrating a driver and/or runtime comprising one or more libraries to provide one or more application programming interfaces (APIs). In at least one embodiment, a software program 1302 is a software module. In at least one embodiment, a software program 1302 comprises one or more software modules. In at least one embodiment, one or more software modules are as further described non-exclusively in FIGS. 1-12. In at least one embodiment, one or more APIs 1310 are sets of software instructions that, if executed, cause one or more processors to perform one or more computational operations. In at least one embodiment, one or more APIs 1310 are distributed or otherwise provided as a part of one or more libraries 1306, runtimes 1304, drivers 1304, and/or any other grouping of software and/or executable code further described herein. In at least one embodiment, one or more APIs 1310 perform one or more computational operations in response to invocation by software programs 1302. In at least one embodiment, a software program 1302 is a collection of software code, commands, instructions, or other sequences of text to instruct a computing device to perform one or more computational operations and/or invoke one or more other sets of instructions, such as APIs 1310 or API functions 1312, to be executed. In at least one embodiment, functionality provided by one or more APIs 1310 include software functions 1312, such as those usable to accelerate one or more portions of software programs 1302 using one or more parallel processing units (PPUs), such as graphics processing units (GPUs). In at least one embodiment, a software program is a compiler.

In at least one embodiment, APIs 1310 are hardware interfaces to one or more circuits to perform one or more computational operations. In at least one embodiment, one or more software APIs 1310 described herein are implemented as one or more circuits to perform one or more techniques described in conjunction with FIGS. 1-12. In at least one embodiment, one or more software programs 1302 comprise instructions that, if executed, cause one or more hardware devices and/or circuits to perform one or more techniques further described in conjunction with FIGS. 1-12.

In at least one embodiment, software programs 1302, such as user-implemented software programs, utilize one or more application programming interfaces (APIs) 1310 to perform various computing operations, such as memory reservation, matrix multiplication, arithmetic operations, or any computing operation performed by parallel processing units (PPUs), such as graphics processing units (GPUs), as further described herein. In at least one embodiment, one or more APIs 1310 provide a set of callable functions 1312, referred to herein as APIs, API functions, and/or functions, that individually perform one or more computing operations, such as computing operations related to parallel computing. In at least one embodiment, one or more APIs 1310 provide functions 1312 to cause 1316 for scaling one or more clocks of one or more cores, based at least in part on a proximity of the one or more cores to each other and/or otherwise perform operations described herein. In at least one embodiment, one or more APIs 1310 provide functions 1312 to cause 1316 a neural network to perform one or more operations, such as by returning a called function to a processor where said processor invokes said neural network.

In at least one embodiment, one or more software programs 1302 interact or otherwise communicate with one or more APIs 1310 to perform one or more computing operations using one or more PPUs, such as GPUs. In at least one embodiment, one or more computing operations using one or more PPUs comprise at least one or more groups of computing operations to be accelerated by execution at least in part by said one or more PPUs. In at least one embodiment, one or more software programs 1302 interact with one or more APIs 1310 to facilitate parallel computing using a remote or local interface.

In at least one embodiment, an interface is software instructions that, if executed, provide access to one or more functions 1312 provided by one or more APIs 1310. In at least one embodiment, a software program 1302 uses a local interface when a software developer compiles one or more software programs 1302 in conjunction with one or more libraries 1306 comprising or otherwise providing access to one or more APIs 1310. In at least one embodiment, one or more software programs 1302 are compiled statically in conjunction with pre-compiled libraries 1306 or uncompiled source code comprising instructions to perform one or more APIs 1310. In at least one embodiment, one or more software programs 1302 are compiled dynamically and said one or more software programs utilize a linker to link to one or more pre-compiled libraries 1306 comprising one or more APIs 1310.

In at least one embodiment, a software program 1302 uses a remote interface when a software developer executes a software program that utilizes or otherwise communicates with a library 1306 comprising one or more APIs 1310 over a network or other remote communication medium. In at least one embodiment, one or more libraries 1306 comprising one or more APIs 1310 are to be performed by a remote computing service, such as a computing resource services provider. In another embodiment, one or more libraries 1306 comprising one or more APIs 1310 are to be performed by any other computing host providing said one or more APIs 1310 to one or more software programs 1302.

In at least one embodiment, a processor performing or using one or more software programs 1302 calls, uses, performs, or otherwise implements one or more APIs 1310 to allocate and otherwise manage memory to be used by said software programs 1302. In at least one embodiment, one or more software programs 1302 utilize one or more APIs 1310 to allocate and otherwise manage memory to be used by one or more portions of said software programs 1302 to be accelerated using one or more PPUs, such as GPUs or any other accelerator or processor further described herein. Those software programs 1302 for scaling one or more clocks of one or more cores, based at least in part on a proximity of the one or more cores to each other.

In at least one embodiment, an API 1310 is an API to facilitate parallel computing. In at least one embodiment, an API 1310 is any other API further described herein. In at least one embodiment, an API 1310 is provided by a driver and/or runtime 1304. In at least one embodiment, an API 1310 is provided by a CUDA user-mode driver. In at least one embodiment, an API 1310 is provided by a CUDA runtime. In at least one embodiment, a driver 1304 is data values and software instructions that, if executed, perform or otherwise facilitate operation of one or more functions 1312 of an API 1310 during load and execution of one or more portions of a software program 1302. In at least one embodiment, a runtime 1304 is data values and software instructions that, if executed, perform or otherwise facilitate operation of one or more functions 1312 of an API 1310 during execution of a software program 1302. In at least one embodiment, one or more software programs 1302 utilize one or more APIs 1310 implemented or otherwise provided by a driver and/or runtime 1304 to perform combined arithmetic operations by said one or more software programs 1302 during execution by one or more PPUs, such as GPUs.

In at least one embodiment, one or more software programs 1302 utilize one or more APIs 1310 provided by a driver and/or runtime 1304 to perform combined arithmetic operations of one or more PPUs, such as GPUs. In at least one embodiment, one or more APIs 1310 provide combined arithmetic operations through a driver and/or runtime 1304, as described above. In at least one embodiment, one or more software programs 1302 utilize one or more APIs 1310 provided by a driver and/or runtime 1304 to allocate or otherwise reserve one or more blocks of memory 1314 of one or more PPUs, such as GPUs. In at least one embodiment, one or more software programs 1302 utilize one or more APIs 1310 provided by a driver and/or runtime 1304 to allocate or otherwise reserve blocks of memory. In at least one embodiment, one or more APIs 1310 are to perform combined arithmetic operations, as described below in conjunction with any FIGS. 1-12.

To improve software programs 1302 usability and/or optimization of one or more portions of said software programs 1302 to be accelerated by one or more PPUs, such as GPUs, in an embodiment, one or more APIs 1310 provide one or more API functions 1312 to perform a scheduling system usable or used by one or more computing devices as described above and further described in conjunction with one or more of FIGS. 1-12. In at least one embodiment, a block diagram 1300 depicts a processor, comprising one or more circuits to perform one or more software programs to combine two or more application programming interfaces (APIs) into a single API. In at least one embodiment, a block diagram 1300 depicts a system, comprising one or more processors to perform one or more software programs to combine two or more application programming interfaces (APIs) into a single API. In at least one embodiment, an API is used to cause 1316 for scaling one or more clocks of one or more cores, based at least in part on a proximity of the one or more cores to each other.

In at least one embodiment, a system for scaling one or more clocks of one or more cores, based at least in part on a proximity of the one or more cores to each other, is used in servers and data centers as shown in FIGS. 14A-FIG. 18B.

Figure 19:
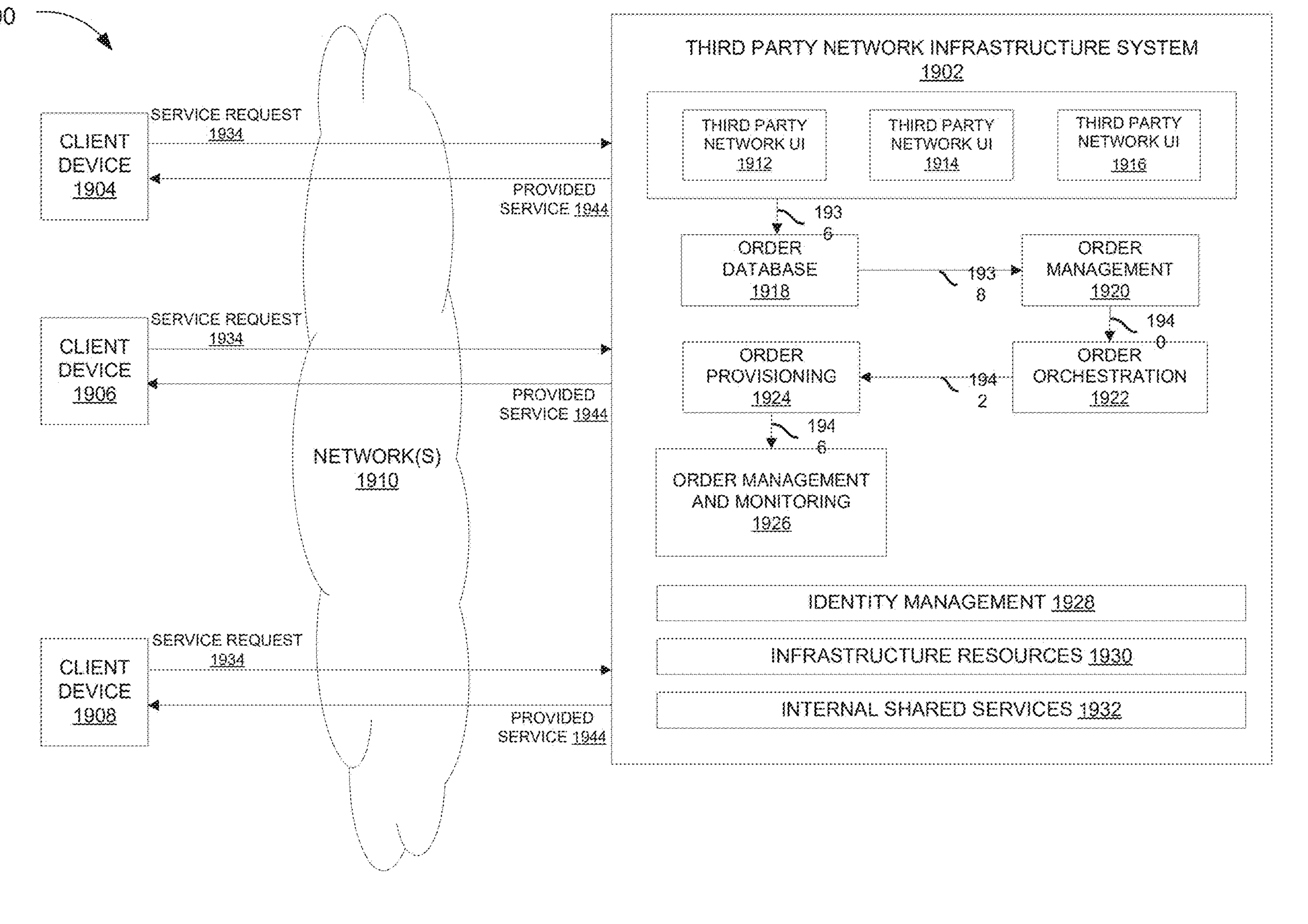
FIG. 19 illustrates one or more components of a system environment in which services may be offered as third party network services, in accordance with at least one embodiment.
Figure 20:
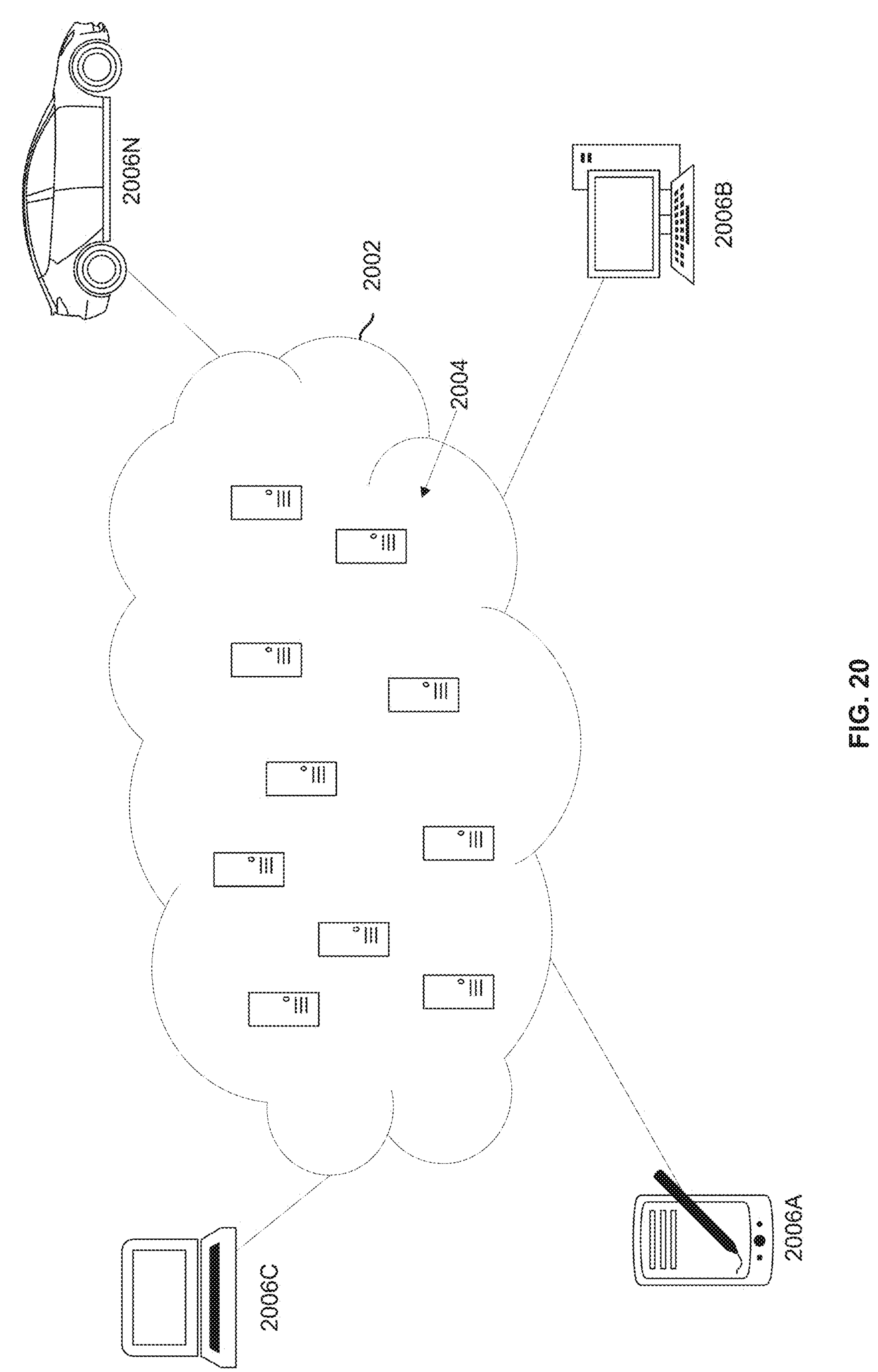
FIG. 20 illustrates a cloud computing environment, in accordance with at least one embodiment.
Figure 21:
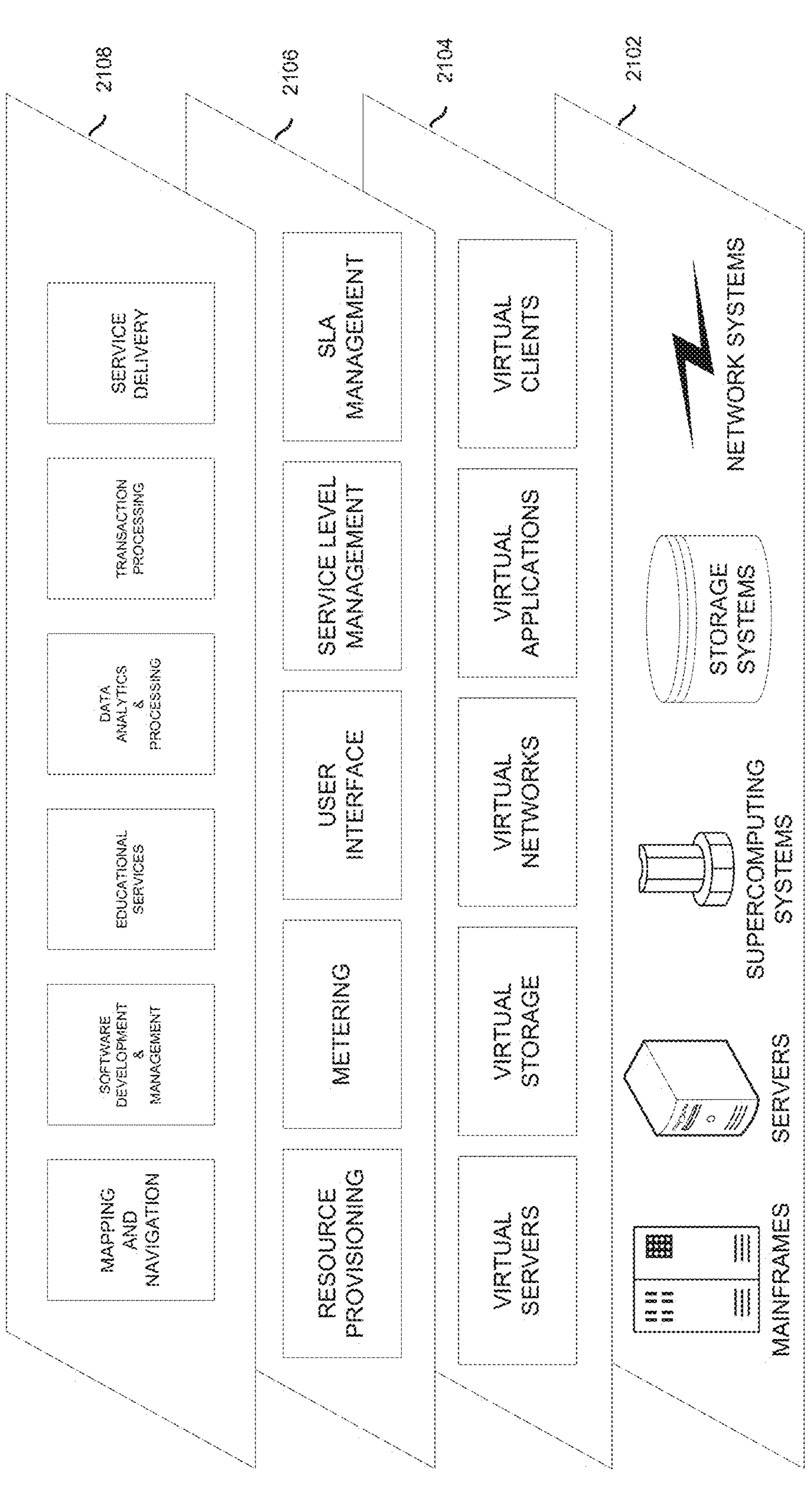
FIG. 21 illustrates a set of functional abstraction layers provided by a cloud computing environment, in accordance with at least one embodiment.

In at least one embodiment, a system for scaling one or more clocks of one or more cores, based at least in part on a proximity of the one or more cores to each other, is used in and by other cloud computing and servers as is depicted in FIGS. 19-FIG. 21.

In at least one embodiment, a system for scaling one or more clocks of one or more cores, based at least in part on a proximity of the one or more cores to each other, is used as part of a supercomputing as illustrated in FIGS. 22-FIG. 25.

Figure 26A:
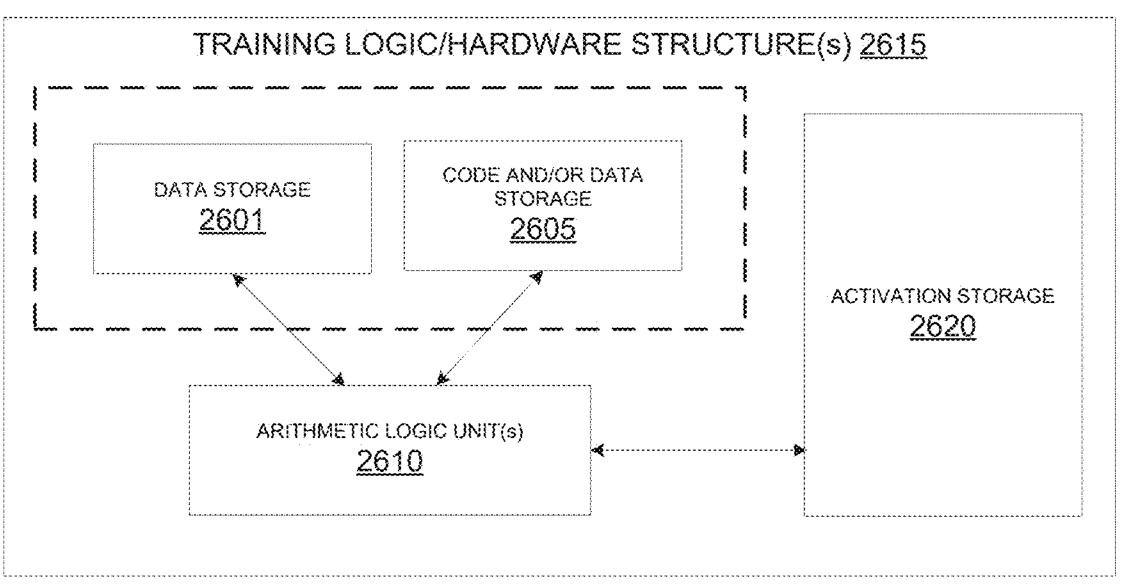
FIG. 26A illustrates inference and/or training logic, in accordance with at least one embodiment.
Figure 27:
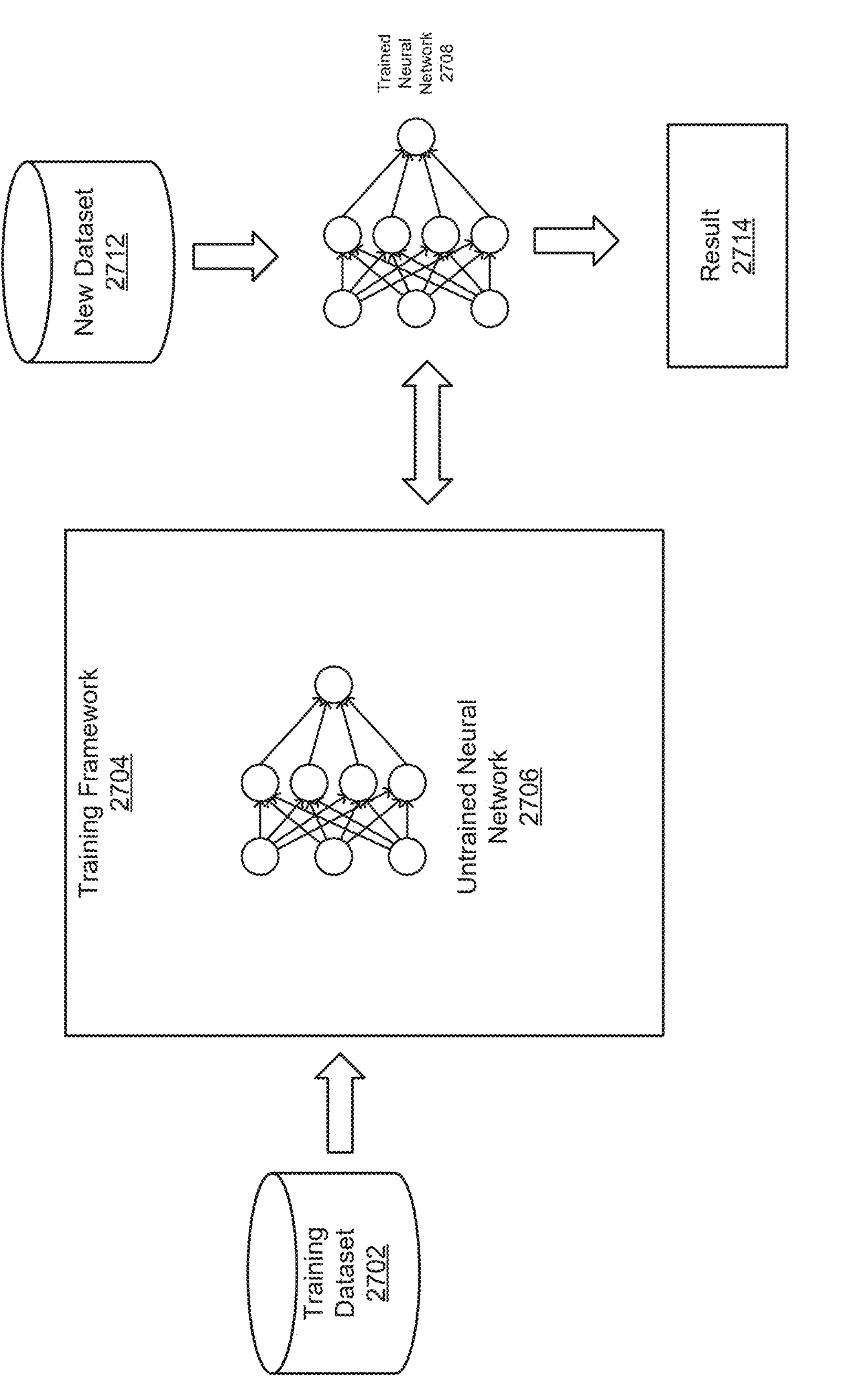
FIG. 27 illustrates training and deployment of a neural network, in accordance with at least one embodiment.

In at least one embodiment, a system for scaling one or more clocks of one or more cores, based at least in part on a proximity of the one or more cores to each other, is incorporated into other artificial intelligence as portrayed in FIG. 26A and/or FIG. 27.

In at least one embodiment, a system for scaling one or more clocks of one or more cores, based at least in part on a proximity of the one or more cores to each other, is used by 5G networks as those depicted in FIGS. 28-FIG. 33.

In at least one embodiment, a system for scaling one or more clocks of one or more cores, based at least in part on a proximity of the one or more cores to each other, is used by computer-based systems as those depicted in FIGS. 34-FIG. 38.

In at least one embodiment, a system for scaling one or more clocks of one or more cores, based at least in part on a proximity of the one or more cores to each other, is used by processing systems as those depicted in FIGS. 39-FIG. 44.

In at least one embodiment, a system for scaling one or more clocks of one or more cores, based at least in part on a proximity of the one or more cores to each other, is used in general computing as depicted in FIGS. 45-FIG. 50.

Technical Solution to Technical Problem

In at least one embodiment, a technical solution to a technical problem is presented. In at least one embodiment a technical problem being solved is a problem of thermal overheating in computer processors with multiple cores. In at least one embodiment, thermal overheating in computer processors constitutes a problem because it can lead to thermal-induced failure. Computer designers overcompensated for this problem by assigning all of the processor cores whose temperature couldn't be directly measured with the same offset value which had the effect of lowering the temperature of the processors in use. This practice also has the side-effect of excessive 'over-throttling' and unnecessarily reducing computer performance.

In at least one embodiment, a multiple offset technique constitutes one way to avoid unnecessarily lowering all of the processor activity and over-throttling. In at least one embodiment, excessive over-throttling is overcome by keeping track of which processor core combinations are 'worst case' thermal generators and assigning those worst-case combinations a higher offset value while assigning other processors that are not worst-case a lower offset or no offset value.

In at least one embodiment, this improvement in technology is that temperature control within the processor and at the processor cores can be regulated at a more precise, core specific level, resulting in performance boost while eliminating thermal-induced failure.

In the following description, numerous specific details are set forth to provide a more thorough understanding of at least one embodiment. However, it will be apparent to one skilled in the art that the inventive concepts may be practiced without one or more of these specific details.

Servers and Data Centers

The following figures set forth, without limitation, exemplary network server and data center based systems that can be used to implement at least one embodiment.

Figure 14:
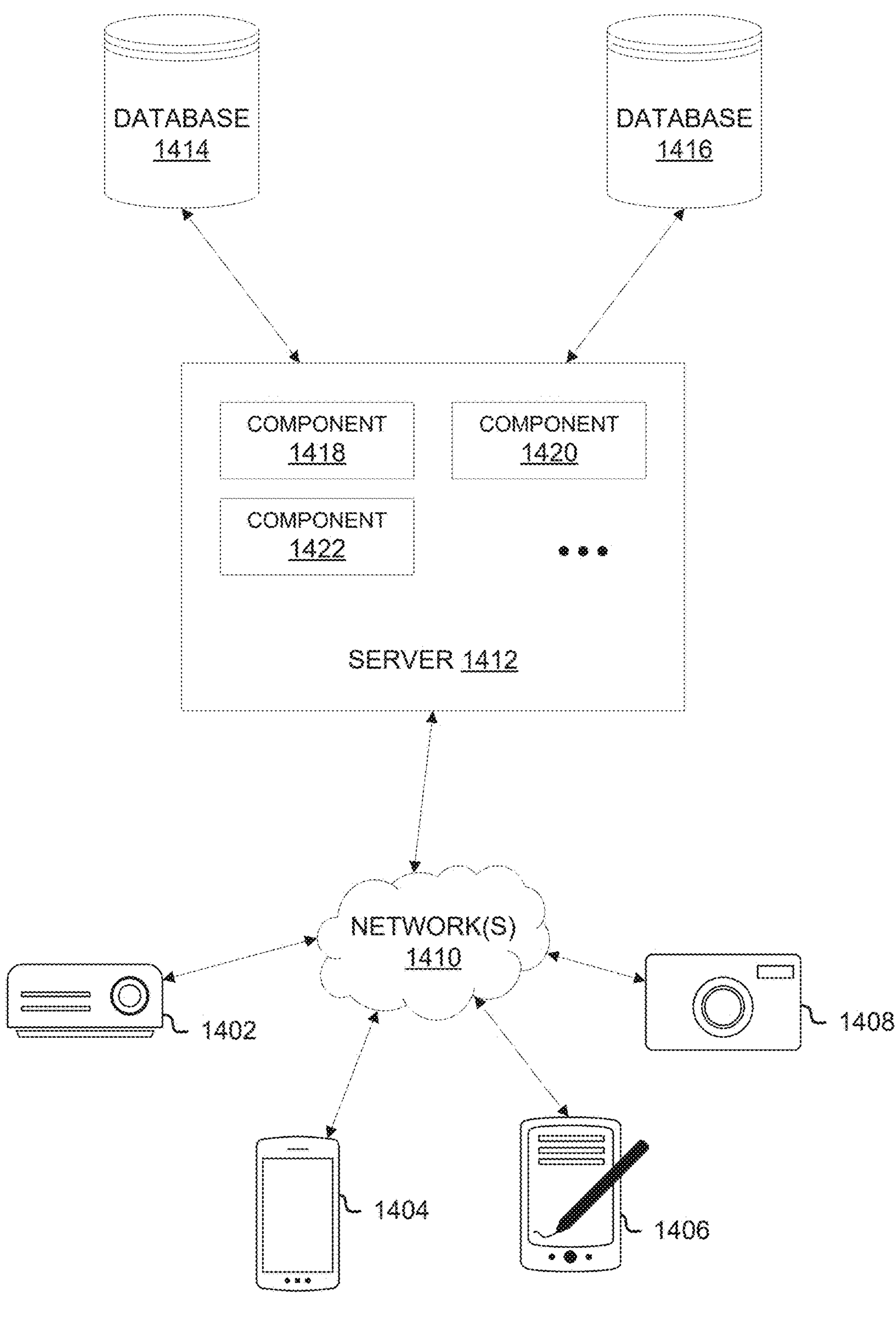
FIG. 14 illustrates a distributed system, in accordance with at least one embodiment.

FIG. 14 illustrates a distributed system 1400, in accordance with at least one embodiment. In at least one embodiment, distributed system 1400 includes one or more client computing devices 1402, 1404, 1406, and 1408, which are configured to execute and operate a client application such as a web browser, proprietary client, and/or variations thereof over one or more network(s) 1410. In at least one embodiment, server 1412 may be communicatively coupled with remote client computing devices 1402, 1404, 1406, and 1408 via network 1410.

In at least one embodiment, server 1412 may be adapted to run one or more services or software applications such as services and applications that may manage session activity of single sign-on (SSO) access across multiple data centers. In at least one embodiment, server 1412 may also provide other services or software applications can include non-virtual and virtual environments. In at least one embodiment, these services may be offered as web-based or cloud services or under a Software as a Service (SaaS) model to users of client computing devices 1402, 1404, 1406, and/or 1408. In at least one embodiment, users operating client computing devices 1402, 1404, 1406, and/or 1408 may in turn utilize one or more client applications to interact with server 1412 to utilize services provided by these components.

In at least one embodiment, software components 1418, 1420 and 1422 of system 1400 are implemented on server 1412. In at least one embodiment, one or more components of system 1400 and/or services provided by these components may also be implemented by one or more of client computing devices 1402, 1404, 1406, and/or 1408. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 1400. The embodiment shown in FIG. 14 is thus one example of a distributed system for implementing an embodiment system and is not intended to be limiting.

In at least one embodiment, client computing devices 1402, 1404, 1406, and/or 1408 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1410. Although distributed system 1400 in FIG. 14 is shown with four client computing devices, any number of client computing devices may be supported. Other devices, such as devices with sensors, etc., may interact with server 1412.

In at least one embodiment, network(s) 1410 in distributed system 1400 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 1410 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 1412 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 1412 using software defined networking. In at least one embodiment, server 1412 may be adapted to run one or more services or software applications.

In at least one embodiment, server 1412 may run any operating system, as well as any commercially available server operating system. In at least one embodiment, server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 1412 may include one or more applications to analyze and consolidate data feeds and/or event updates received from users of client computing devices 1402, 1404, 1406, and 1408. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 1412 may also include one or more applications to display data feeds and/or real-time events via one or more display devices of client computing devices 1402, 1404, 1406, and 1408.

In at least one embodiment, distributed system 1400 may also include one or more databases 1414 and 1416. In at least one embodiment, databases may provide a mechanism for storing information such as user interactions information, usage patterns information, adaptation rules information, and other information. In at least one embodiment, databases 1414 and 1416 may reside in a variety of locations. In at least one embodiment, one or more of databases 1414 and 1416 may reside on a non-transitory storage medium local to (and/or resident in) server 1412. In at least one embodiment, databases 1414 and 1416 may be remote from server 1412 and in communication with server 1412 via a network-based or dedicated connection. In at least one embodiment, databases 1414 and 1416 may reside in a storage-area network (SAN). In at least one embodiment, any necessary files for performing functions attributed to server 1412 may be stored locally on server 1412 and/or remotely, as appropriate. In at least one embodiment, databases 1414 and 1416 may include relational databases, such as databases that are adapted to store, update, and retrieve data in response to SQL-formatted commands.

In at least one embodiment, at least one component shown or described with respect to FIG. 14 is utilized to implement techniques and/or functions described in connection with FIGS. 1-13. In at least one embodiment, at least one component of FIG. 14 is used to cause scaling of one or more clocks of one or more cores, based at least in part, on a proximity of the one or more cores to each other. In at least one embodiment, at least one component of FIG. 14 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 15:
FIG. 15 illustrates an exemplary data center, in accordance with at least one embodiment.
Figure 15:
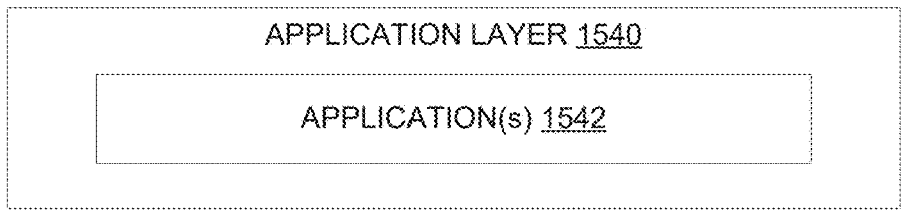
Figure 15:
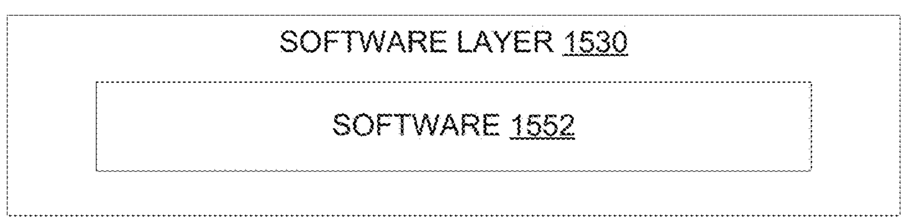
Figure 15:
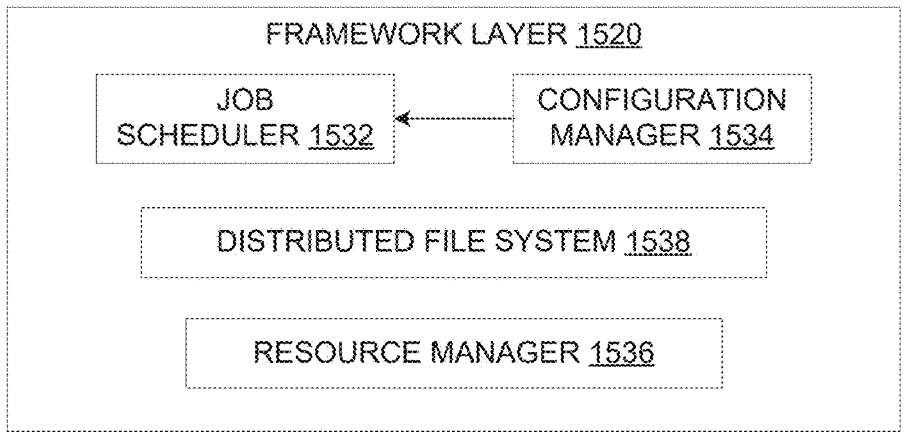
Figure 15:
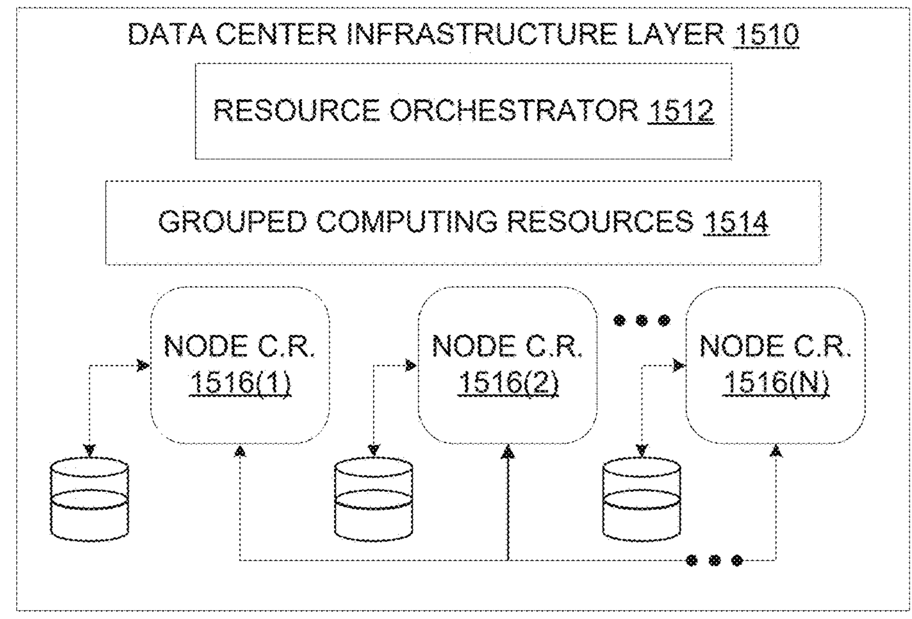

FIG. 15 illustrates an exemplary data center 1500, in accordance with at least one embodiment. In at least one embodiment, data center 1500 includes, without limitation, a data center infrastructure layer 1510, a framework layer 1520, a software layer 1530 and an application layer 1540.

In at least one embodiment, as shown in FIG. 15, data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1516(1)-1516(N) may be a server having one or more of above-mentioned computing resources.

In at least one embodiment, grouped computing resources 1514 may include separate groupings of node C.R.s housed within one or more racks (not shown), or many racks housed in data centers at various geographical locations (also not shown). Separate groupings of node C.R.s within grouped computing resources 1514 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1512 may configure or otherwise control one or more node C.R.s 1516(1)-1516(N) and/or grouped computing resources 1514. In at least one embodiment, resource orchestrator 1512 may include a software design infrastructure ("SDI") management entity for data center 1500. In at least one embodiment, resource orchestrator 1512 may include hardware, software or some combination thereof.

In at least one embodiment, as shown in FIG. 15, framework layer 1520 includes, without limitation, a job scheduler 1532, a configuration manager 1534, a resource manager 1536 and a distributed file system 1538. In at least one embodiment, framework layer 1520 may include a framework to support software 1552 of software layer 1530 and/or one or more application(s) 1542 of application layer 1540. In at least one embodiment, software 1552 or application(s) 1542 may respectively include web-based service software or applications, such as those provided by Amazon Web Services, Google Cloud and Microsoft Azure. In at least one embodiment, framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1532 may include a Spark driver to facilitate scheduling of workloads supported by various layers of data center 1500. In at least one embodiment, configuration manager 1534 may be capable of configuring different layers such as software layer 1530 and framework layer 1520, including Spark and distributed file system 1538 for supporting large-scale data processing. In at least one embodiment, resource manager 1536 may be capable of managing clustered or grouped computing resources mapped to or allocated for support of distributed file system 1538 and job scheduler 1532. In at least one embodiment, clustered or grouped computing resources may include grouped computing resource 1514 at data center infrastructure layer 1510. In at least one embodiment, resource manager 1536 may coordinate with resource orchestrator 1512 to manage these mapped or allocated computing resources.

In at least one embodiment, software 1552 included in software layer 1530 may include software used by at least portions of node C.R.s 1516(1)-1516(N), grouped computing resources 1514, and/or distributed file system 1538 of framework layer 1520. One or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516 (1)-1516(N), grouped computing resources 1514, and/or distributed file system 1538 of framework layer 1520. In at least one or more types of applications may include, without limitation, CUDA applications, 5G network applications, artificial intelligence application, data center applications, and/or variations thereof.

In at least one embodiment, any of configuration manager 1534, resource manager 1536, and resource orchestrator 1512 may implement any number and type of self-modifying actions based on any amount and type of data acquired in any technically feasible fashion. In at least one embodiment, self-modifying actions may relieve a data center operator of data center 1500 from making possibly bad configuration decisions and possibly avoiding underutilized and/or poor performing portions of a data center.

In at least one embodiment, at least one component shown or described with respect to FIG. 15 is utilized to implement techniques and/or functions described in connection with FIGS. 1-13. In at least one embodiment, at least one component of FIG. 15 is used to cause scaling of one or more clocks of one or more cores, based at least in part, on a proximity of the one or more cores to each other. In at least one embodiment, at least one component of FIG. 15 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 16:
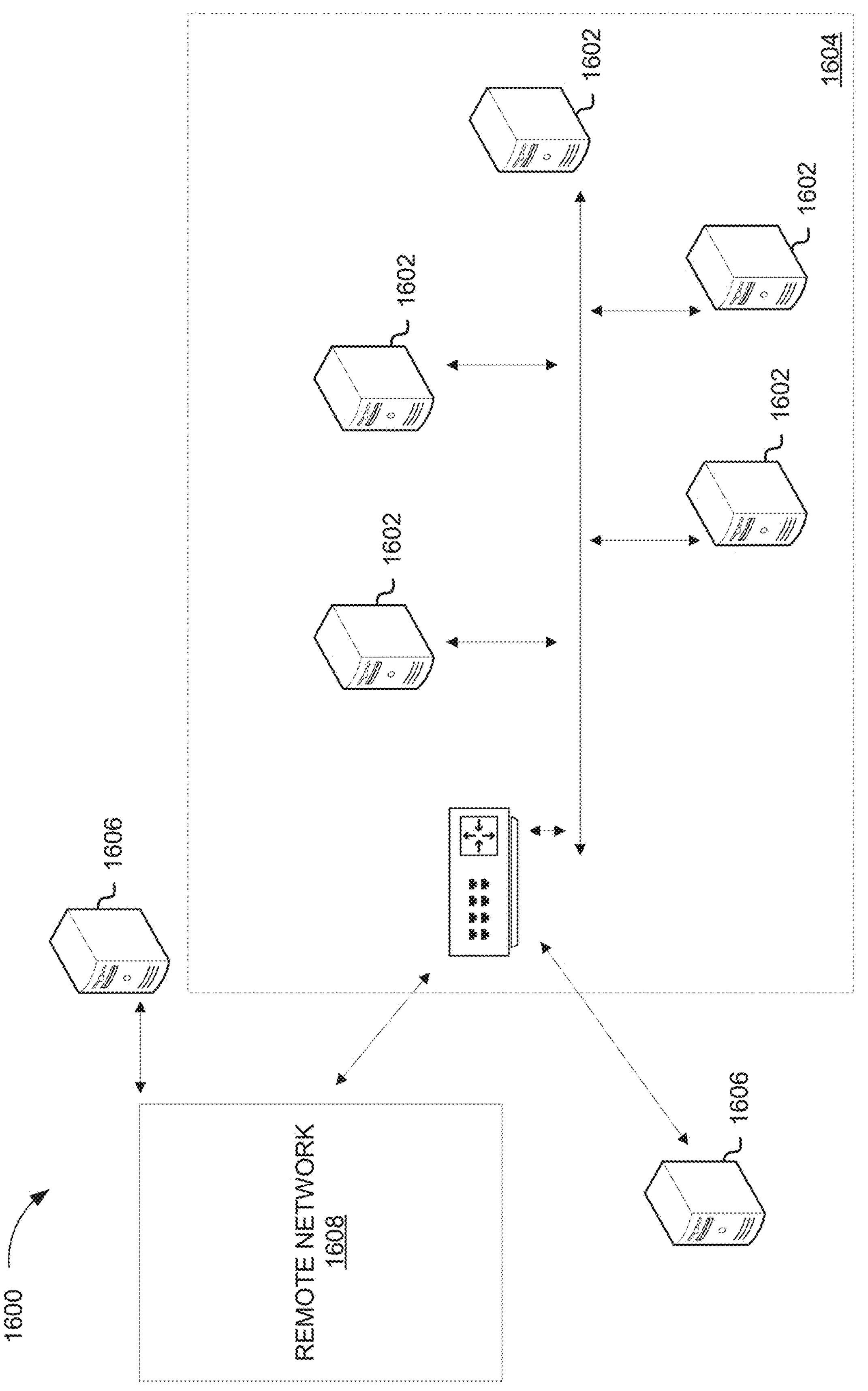
FIG. 16 illustrates a client-server network, in accordance with at least one embodiment.

FIG. 16 illustrates a client-server network 1604 formed by a plurality of network server computers 1602 which are interlinked, in accordance with at least one embodiment. In at least one embodiment, in a system 1600, each network server computer 1602 stores data accessible to other network server computers 1602 and to client computers 1606 and networks 1608 which link into a wide area network 1604. In at least one embodiment, configuration of a client-server network 1604 may change over time as client computers 1606 and one or more networks 1608 connect and disconnect from a network 1604, and as one or more trunk line server computers 1602 are added or removed from a network 1604. In at least one embodiment, when a client computer 1606 and a network 1608 are connected with network server computers 1602, client-server network includes such client computer 1606 and network 1608. In at least one embodiment, the term computer includes any device or machine capable of accepting data, applying prescribed processes to data, and supplying results of processes.

In at least one embodiment, client-server network 1604 stores information which is accessible to network server computers 1602, remote networks 1608 and client computers 1606. In at least one embodiment, network server computers 1602 are formed by main frame computers minicomputers, and/or microcomputers having one or more processors each. In at least one embodiment, server computers 1602 are linked together by wired and/or wireless transfer media, such as conductive wire, fiber optic cable, and/or microwave transmission media, satellite transmission media or other conductive, optic or electromagnetic wave transmission media. In at least one embodiment, client computers 1606 access a network server computer 1602 by a similar wired or a wireless transfer medium. In at least one embodiment, a client computer 1606 may link into a client-server network 1604 using a modem and a standard telephone communication network. In at least one embodiment, alternative carrier systems such as cable and satellite communication systems also may be used to link into client-server network 1604. In at least one embodiment, other private or time-shared carrier systems may be used. In at least one embodiment, network 1604 is a global information network, such as the Internet. In at least one embodiment, network is a private intranet using similar protocols as the Internet, but with added security measures and restricted access controls. In at least one embodiment, network 1604 is a private, or semi-private network using proprietary communication protocols.

In at least one embodiment, client computer 1606 is any end user computer, and may also be a mainframe computer, mini-computer or microcomputer having one or more microprocessors. In at least one embodiment, server computer 1602 may at times function as a client computer accessing another server computer 1602. In at least one embodiment, remote network 1608 may be a local area network, a network added into a wide area network through an independent service provider (ISP) for the Internet, or another group of computers interconnected by wired or wireless transfer media having a configuration which is either fixed or changing over time. In at least one embodiment, client computers 1606 may link into and access a network 1604 independently or through a remote network 1608.

In at least one embodiment, at least one component shown or described with respect to FIG. 16 is utilized to implement techniques and/or functions described in connection with FIGS. 1-13. In at least one embodiment, at least one component of FIG. 16 is used to cause scaling of one or more clocks of one or more cores, based at least in part, on a proximity of the one or more cores to each other. In at least one embodiment, at least one component of FIG. 16 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 17:
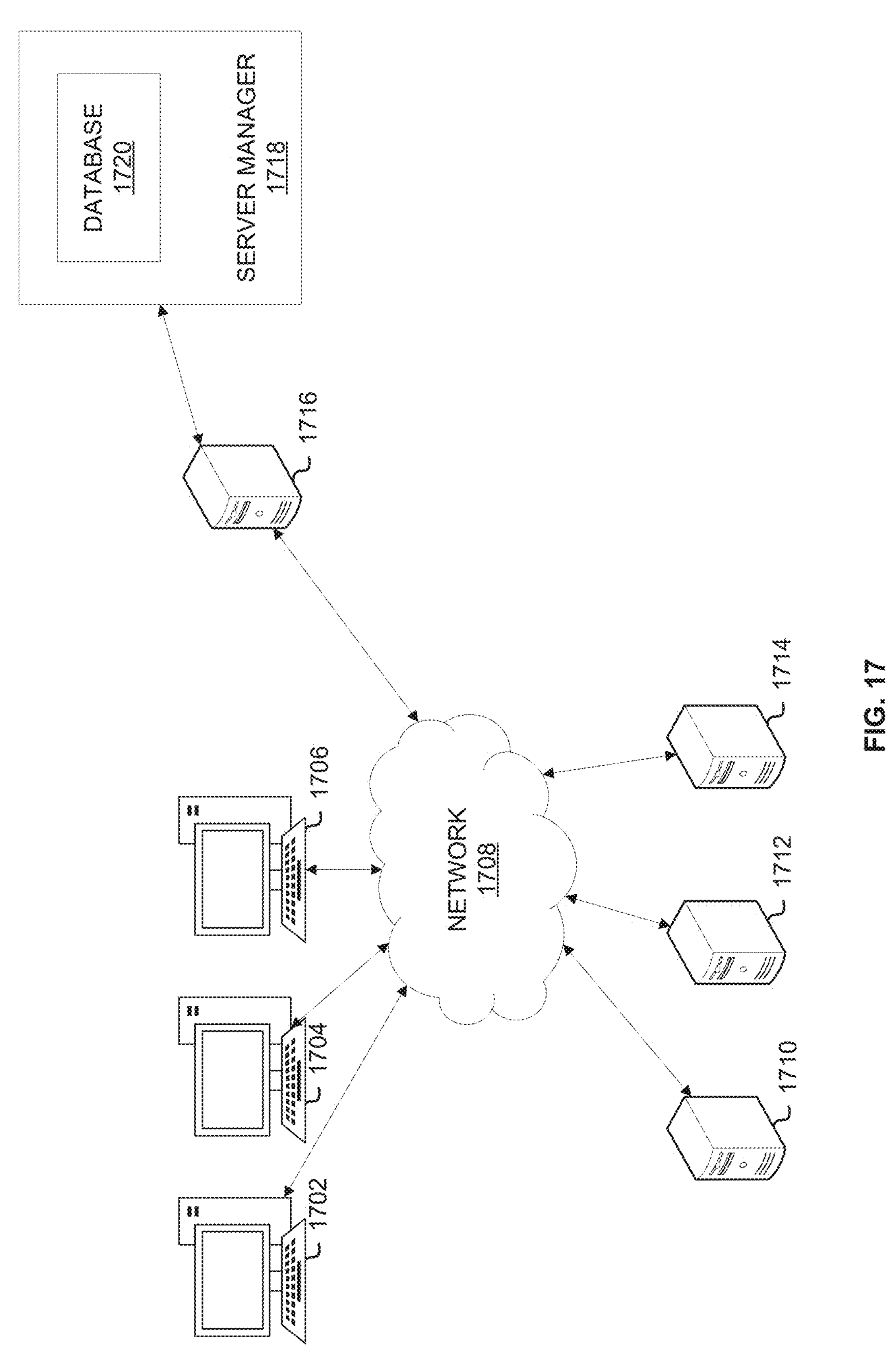
FIG. 17 illustrates an example of a computer network, in accordance with at least one embodiment.

FIG. 17 illustrates an example 1700 of a computer network 1708 connecting one or more computing machines, in accordance with at least one embodiment. In at least one embodiment, network 1708 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 1708 may be a remote modem, Ethernet (IEEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1708 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1708 comprises the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g. www.site.com) which maps to an IP address of a network server.

In at least one embodiment, a plurality of clients 1702, 1704, and 1706 are connected to a network 1708 via respective communication links. In at least one embodiment, each of these clients may access a network 1708 via any desired form of communication, such as via a dial-up modem connection, cable link, a digital subscriber line (DSL), wireless or satellite link, or any other form of communication. In at least one embodiment, each client may communicate using any machine that is compatible with a network 1708, such as a personal computer (PC), work station, dedicated terminal, personal data assistant (PDA), or other similar equipment. In at least one embodiment, clients 1702, 1704, and 1706 may or may not be located in a same geographical area.

In at least one embodiment, a plurality of servers 1710, 1712, and 1714 are connected to a network 1708 to serve clients that are in communication with a network 1708. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1710, 1712, 1714 run application programs that respond to client commands. In at least one embodiment, server 1710 may run a web server application for responding to client requests for HTML pages and may also run a mail server application for receiving and routing electronic mail. In at least one embodiment, other application programs, such as an FTP server or a media server for streaming audio/video data to clients may also be running on a server 1710. In at least one embodiment, different servers may be dedicated to performing different tasks. In at least one embodiment, server 1710 may be a dedicated web server that manages resources relating to web sites for various users, whereas a server 1712 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1710, 1712, 1714 are under control of a web hosting provider in a business of maintaining and delivering third party content over a network 1708.

In at least one embodiment, web hosting providers deliver services to two different types of clients. In at least one embodiment, one type, which may be referred to as a browser, requests content from servers 1710, 1712, 1714 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1716 is in communication with a network 1708 via a communication link. In at least one embodiment, intranet server 1716 is in communication with a server manager 1718. In at least one embodiment, server manager 1718 comprises a database of an application program configuration parameters which are being utilized in servers 1710, 1712, 1714. In at least one embodiment, users modify a database 1720 via an intranet 1716, and a server manager 1718 interacts with servers 1710, 1712, 1714 to modify application program parameters so that they match a content of a database. In at least one embodiment, a user logs onto an intranet server 1716 by connecting to an intranet 1716 via computer 1702 and entering authentication information, such as a username and password.

In at least one embodiment, when a user wishes to sign up for new service or modify an existing service, an intranet server 1716 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1716 updates a database 1720. In at least one embodiment, server manager 1718 forwards this information to an appropriate server, and a new parameter is used during application program operation. In at least one embodiment, an intranet server 1716 is configured to provide users with access to configuration parameters of hosted network resources (e.g., web pages, email, FTP sites, media sites, etc.), for which a user has contracted with a web hosting service provider.

In at least one embodiment, at least one component shown or described with respect to FIG. 17 is utilized to implement techniques and/or functions described in connection with FIGS. 1-13. In at least one embodiment, at least one component of FIG. 17 is used to cause scaling of one or more clocks of one or more cores, based at least in part, on a proximity of the one or more cores to each other. In at least one embodiment, at least one component of FIG. 17 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 18A:
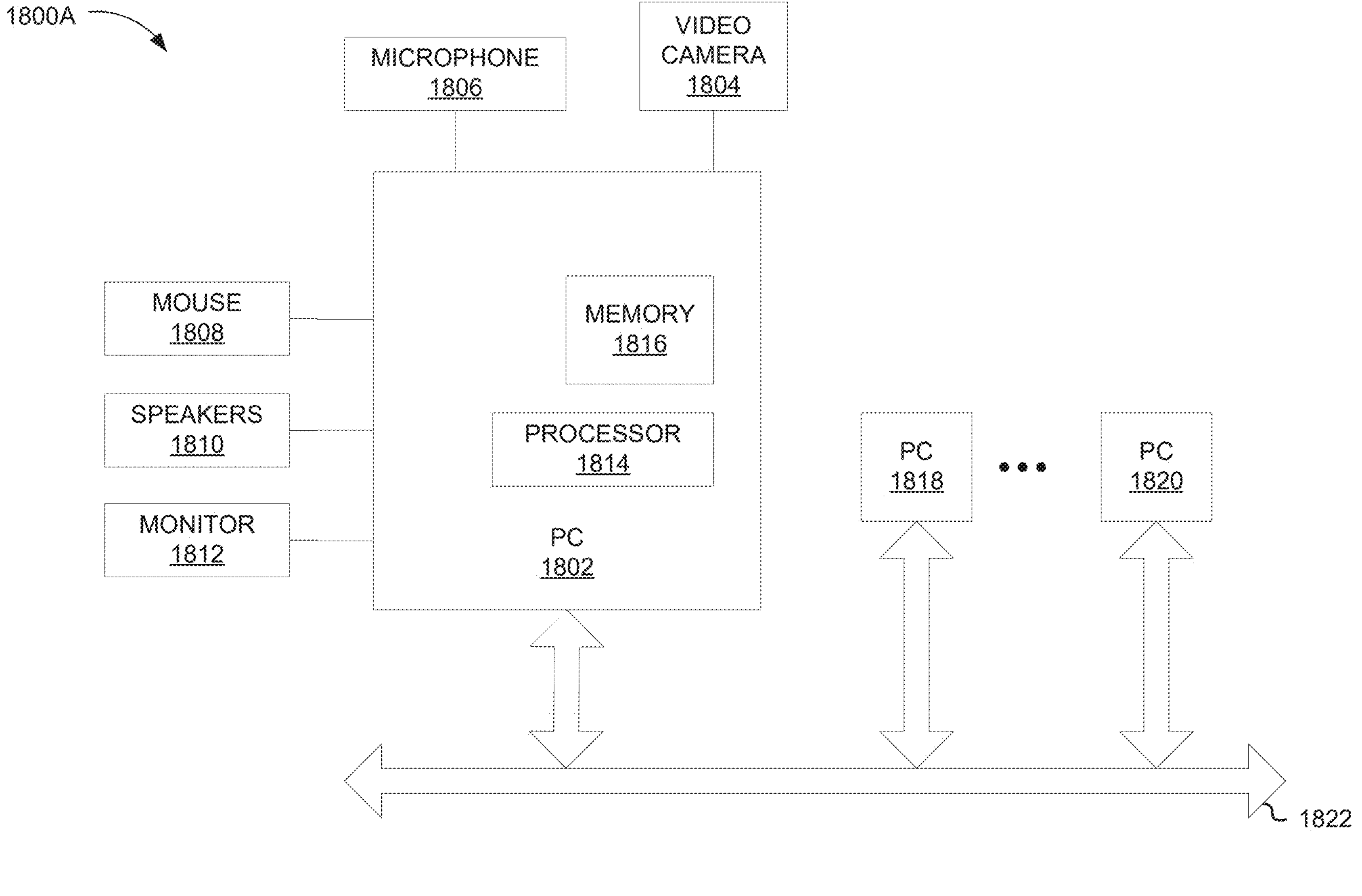
FIG. 18A illustrates a networked computer system, in accordance with at least one embodiment.

FIG. 18A illustrates a networked computer system 1800A, in accordance with at least one embodiment. In at least one embodiment, net worked computer system 1800A comprises a plurality of nodes or personal computers ("PCs") 1802, 1818, 1820. In at least one embodiment, personal computer or node 1802 comprises a processor 1814, memory 1816, video camera 1804, microphone 1806, mouse 1808, speakers 1810, and monitor 1812. In at least one embodiment, PCs 1802, 1818, 1820 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, nodes 1802, 1818, 1820 and other nodes of a network are interconnected via medium 1822. In at least one embodiment, medium 1822 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may comprise other nodes or elements such as routers, servers, and/or variations thereof.

In at least one embodiment, processor 1814 is a general-purpose programmable processor. In at least one embodiment, processors of nodes of networked computer system 1800A may also be special-purpose video processors. In at least one embodiment, various peripherals and components of a node such as those of node 1802 may vary from those of other nodes. In at least one embodiment, node 1818 and node 1820 may be configured identically to or differently than node 1802. In at least one embodiment, a node may be implemented on any suitable computer system in addition to PC systems.

Figure 18B:
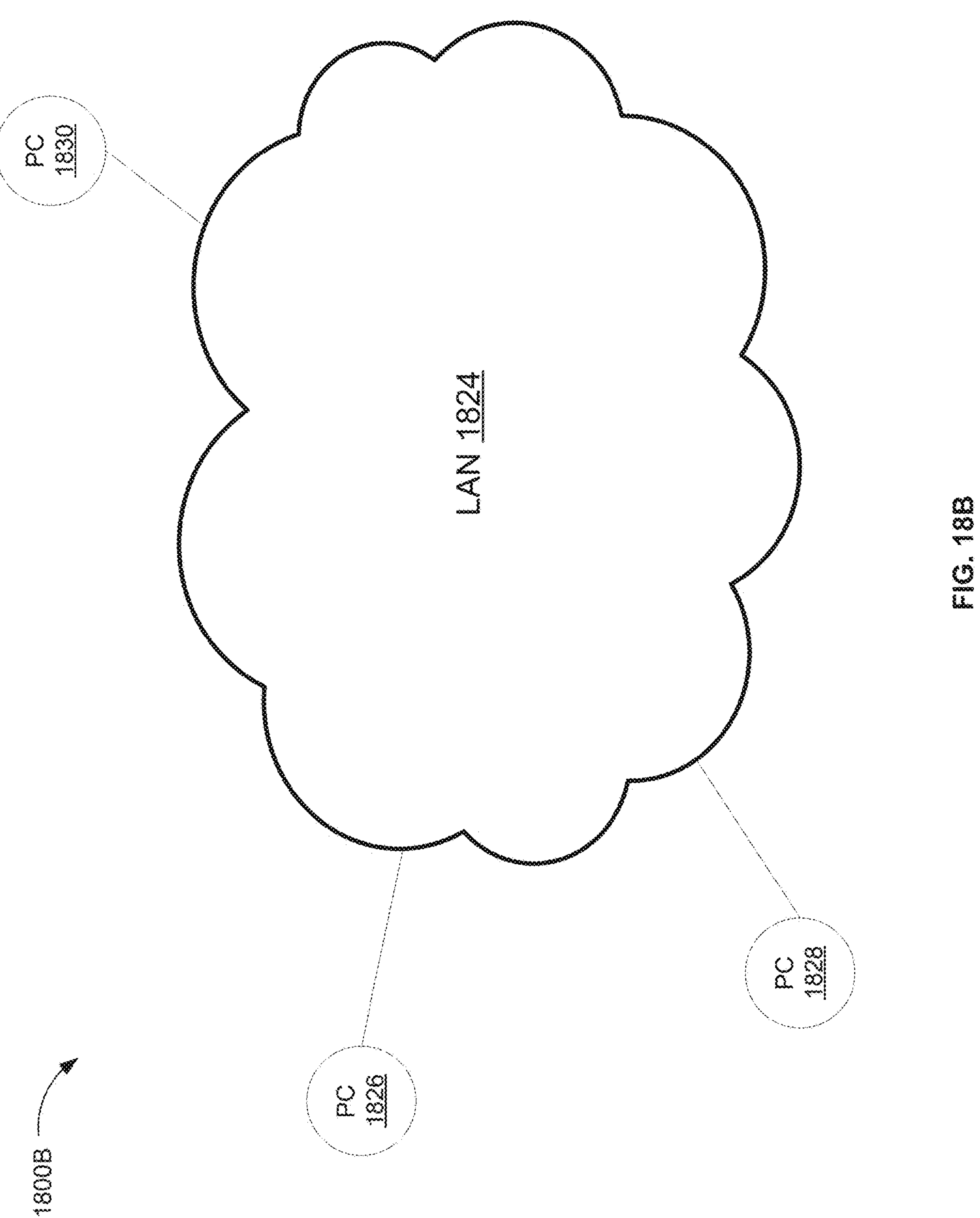
FIG. 18B illustrates a networked computer system, in accordance with at least one embodiment.

FIG. 18B illustrates a networked computer system 1800B, in accordance with at least one embodiment. In at least one embodiment, system 1800B illustrates a network such as LAN 1824, which may be used to interconnect a variety of nodes that may communicate with each other. In at least one embodiment, attached to LAN 1824 are a plurality of nodes such as PC nodes 1826, 1828, 1830. In at least one embodiment, a node may also be connected to the LAN via a network server or other means. In at least one embodiment, system 1800B comprises other types of nodes or elements, for example including routers, servers, and nodes.

Figure 18C:
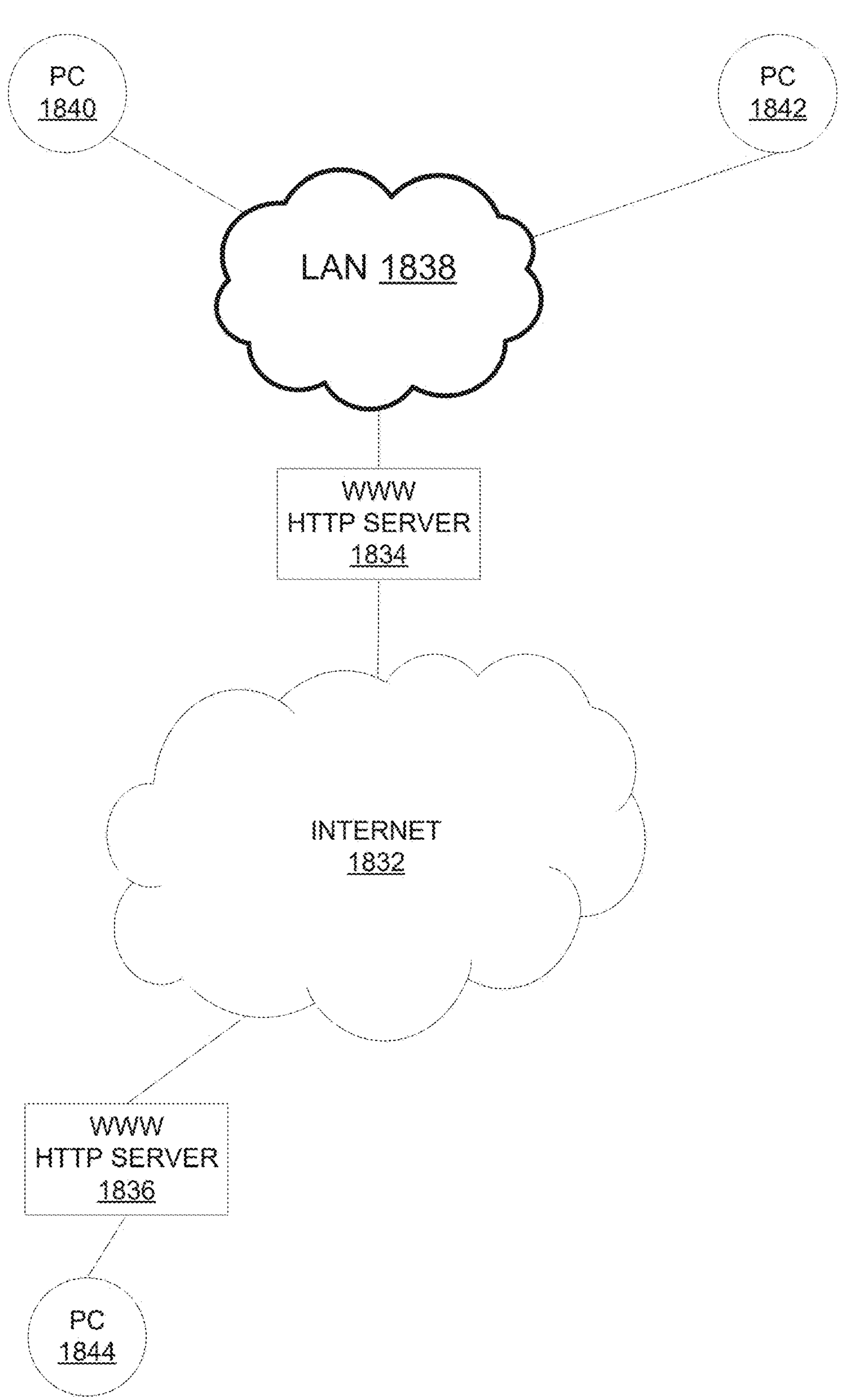
FIG. 18C illustrates a networked computer system, in accordance with at least one embodiment.

FIG. 18C illustrates a networked computer system 1800C, in accordance with at least one embodiment. In at least one embodiment, system 1800C illustrates a WWW system having communications across a backbone communications network such as Internet 1832, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 1832 in WWW are a plurality of nodes such as PCs 1840, 1842, 1844. In at least one embodiment, a node is interfaced to other nodes of WWW through a WWW HTTP server such as servers 1834, 1836. In at least one embodiment, PC 1844 may be a PC forming a node of network 1832 and itself running its server 1836, although PC 1844 and server 1836 are illustrated separately in FIG. 18C for illustrative purposes.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 1838 as illustrated with respect to WWW HTTP server 1834. In at least one embodiment, system 1800C may also comprise other types of nodes or elements. In at least one embodiment, a WWW HTTP server is an application running on a machine, such as a PC. In at least one embodiment, each user may be considered to have a unique "server," as illustrated with respect to PC 1844. In at least one embodiment, a server may be considered to be a server such as WWW HTTP server 1834, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

Cloud Computing and Services

The following figures set forth, without limitation, exemplary cloud-based systems that can be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which can be referred to as "in the cloud," that supports them. In at least one embodiment, cloud computing incorporates infrastructure as a service, platform as a service, software as a service, and other variations that have a common theme of reliance on the Internet for satisfying computing needs of users. In at least one embodiment, a typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCOE) ports, switching and storage infrastructure, etc. In at least one embodiment, cloud can also consist of network services infrastructure like IPsec VPN hubs, firewalls, load balancers, wide area network (WAN) optimizers etc. In at least one embodiment, remote subscribers can access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that can be rapidly provisioned and released with minimal management effort or service provider interaction.

In at least one embodiment, cloud computing is characterized by on-demand self-service, in which a consumer can unilaterally provision computing capabilities, such as server time and network storage, as needed automatically without requiring human inter-action with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and PDAs). In at least one embodiment, cloud computing is characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage can be monitored, controlled, and reported providing transparency for both a provider and consumer of a utilized service.

In at least one embodiment, cloud computing may be associated with various services. In at least one embodiment, cloud Software as a Service (SaaS) may refer to as service in which a capability provided to a consumer is to use a provider's applications running on a cloud infrastructure. In at least one embodiment, applications are accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which a capability provided to a consumer is to deploy onto cloud infrastructure consumer-created or acquired applications created using programming languages and tools supported by a provider. In at least one embodiment, consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security requirements, policy, and compliance considerations). In at least one embodiment, a community cloud may be managed by organizations or a third party and may exist on-premises or off-premises. In at least one embodiment, a public cloud may refer to a cloud infrastructure that is made available to a general public or a large industry group and is owned by an organization providing cloud services. In at least one embodiment, a hybrid cloud may refer to a cloud infrastructure is a composition of two or more clouds (private, community, or public) that remain unique entities, but are bound together by standardized or proprietary technology that enables data and application portability (e.g., cloud bursting for load-balancing between clouds). In at least one embodiment, a cloud computing environment is service oriented with a focus on statelessness, low coupling, modularity, and semantic interoperability.

In at least one embodiment, at least one component shown or described with respect to FIG. 18 is utilized to implement techniques and/or functions described in connection with FIGS. 1-13. In at least one embodiment, at least one component of FIG. 18 is used to cause scaling of one or more clocks of one or more cores, based at least in part, on a proximity of the one or more cores to each other. In at least one embodiment, at least one component of FIG. 18 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

FIG. 19 illustrates one or more components of a system environment 1900 in which services may be offered as third party network services, in accordance with at least one embodiment. In at least one embodiment, a third party network may be referred to as a cloud, cloud network, cloud computing network, and/or variations thereof. In at least one embodiment, system environment 1900 includes one or more client computing devices 1904, 1906, and 1908 that may be used by users to interact with a third party network infrastructure system 1902 that provides third party network services, which may be referred to as cloud computing services. In at least one embodiment, third party network infrastructure system 1902 may comprise one or more computers and/or servers.

It should be appreciated that third party network infrastructure system 1902 depicted in FIG. 19 may have other components than those depicted. Further, FIG. 19 depicts an embodiment of a third party network infrastructure system. In at least one embodiment, third party network infrastructure system 1902 may have more or fewer components than depicted in FIG. 19, may combine two or more components, or may have a different configuration or arrangement of components.

In at least one embodiment, client computing devices 1904, 1906, and 1908 may be configured to operate a client application such as a web browser, a proprietary client application, or some other application, which may be used by a user of a client computing device to interact with third party network infrastructure system 1902 to use services provided by third party network infrastructure system 1902. Although exemplary system environment 1900 is shown with three client computing devices, any number of client computing devices may be supported. In at least one embodiment, other devices such as devices with sensors, etc. may interact with third party network infrastructure system 1902. In at least one embodiment, network(s) 1910 may facilitate communications and exchange of data between client computing devices 1904, 1906, and 1908 and third party network infrastructure system 1902.

In at least one embodiment, services provided by third party network infrastructure system 1902 may include a host of services that are made available to users of a third party network infrastructure system on demand. In at least one embodiment, various services may also be offered including without limitation online data storage and backup solutions, Web-based e-mail services, hosted office suites and document collaboration services, database management and processing, managed technical support services, and/or variations thereof. In at least one embodiment, services provided by a third party network infrastructure system can dynamically scale to meet needs of its users.

In at least one embodiment, a specific instantiation of a service provided by third party network infrastructure system 1902 may be referred to as a "service instance." In at least one embodiment, in general, any service made available to a user via a communication network, such as the Internet, from a third party network service provider's system is referred to as a "third party network service." In at least one embodiment, in a public third party network environment, servers and systems that make up a third party network service provider's system are different from a customer's own on-premises servers and systems. In at least one embodiment, a third party network service provider's system may host an application, and a user may, via a communication network such as the Internet, on demand, order and use an application.

In at least one embodiment, a service in a computer network third party network infrastructure may include protected computer network access to storage, a hosted database, a hosted web server, a software application, or other service provided by a third party network vendor to a user. In at least one embodiment, a service can include password-protected access to remote storage on a third party network through the Internet. In at least one embodiment, a service can include a web service-based hosted relational database and a script-language middleware engine for private use by a networked developer. In at least one embodiment, a service can include access to an email software application hosted on a third party network vendor's web site.

In at least one embodiment, third party network infrastructure system 1902 may include a suite of applications, middleware, and database service offerings that are delivered to a customer in a self-service, subscription-based, elastically scalable, reliable, highly available, and secure manner. In at least one embodiment, third party network infrastructure system 1902 may also provide "big data" related computation and analysis services. In at least one embodiment, term "big data" is generally used to refer to extremely large data sets that can be stored and manipulated by analysts and researchers to visualize large amounts of data, detect trends, and/or otherwise interact with data. In at least one embodiment, big data and related applications can be hosted and/or manipulated by an infrastructure system on many levels and at different scales. In at least one embodiment, tens, hundreds, or thousands of processors linked in parallel can act upon such data in order to present it or simulate external forces on data or what it represents. In at least one embodiment, these data sets can involve structured data, such as that organized in a database or otherwise according to a structured model, and/or unstructured data (e.g., emails, images, data blobs (binary large objects), web pages, complex event processing). In at least one embodiment, by leveraging an ability of an embodiment to relatively quickly focus more (or fewer) computing resources upon an objective, a third party network infrastructure system may be better available to carry out tasks on large data sets based on demand from a business, government agency, research organization, private individual, group of like-minded individuals or organizations, or other entity.

In at least one embodiment, third party network infrastructure system 1902 may be adapted to automatically provision, manage and track a customer's subscription to services offered by third party network infrastructure system 1902. In at least one embodiment, third party network infrastructure system 1902 may provide third party network services via different deployment models. In at least one embodiment, services may be provided under a public third party network model in which third party network infrastructure system 1902 is owned by an organization selling third party network services and services are made available to a general public or different industry enterprises. In at least one embodiment, services may be provided under a private third party network model in which third party network infrastructure system 1902 is operated solely for a single organization and may provide services for one or more entities within an organization. In at least one embodiment, third party network services may also be provided under a community third party network model in which third party network infrastructure system 1902 and services provided by third party network infrastructure system 1902 are shared by several organizations in a related community. In at least one embodiment, third party network services may also be provided under a hybrid third party network model, which is a combination of two or more different models.

In at least one embodiment, services provided by third party network infrastructure system 1902 may include one or more services provided under Software as a Service (SaaS) category, Platform as a Service (PaaS) category, Infrastructure as a Service (IaaS) category, or other categories of services including hybrid services. In at least one embodiment, a customer, via a subscription order, may order one or more services provided by third party network infrastructure system 1902. In at least one embodiment, third party network infrastructure system 1902 then performs processing to provide services in a customer's subscription order.

In at least one embodiment, services provided by third party network infrastructure system 1902 may include, without limitation, application services, platform services and infrastructure services. In at least one embodiment, application services may be provided by a third party network infrastructure system via a SaaS platform. In at least one embodiment, SaaS platform may be configured to provide third party network services that fall under a SaaS category. In at least one embodiment, SaaS platform may provide capabilities to build and deliver a suite of on-demand applications on an integrated development and deployment platform. In at least one embodiment, SaaS platform may manage and control underlying software and infrastructure for providing SaaS services. In at least one embodiment, by utilizing services provided by a SaaS platform, customers can utilize applications executing on a third party network infrastructure system. In at least one embodiment, customers can acquire an application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third party network infrastructure system 1902 via a PaaS platform. In at least one embodiment, PaaS platform may be configured to provide third party network services that fall under a PaaS category. In at least one embodiment, examples of platform services may include without limitation services that enable organizations to consolidate existing applications on a shared, common architecture, as well as an ability to build new applications that leverage shared services provided by a platform. In at least one embodiment, PaaS platform may manage and control underlying software and infrastructure for providing PaaS services. In at least one embodiment, customers can acquire PaaS services provided by third party network infrastructure system 1902 without a need for customers to purchase separate licenses and support.

In at least one embodiment, by utilizing services provided by a PaaS platform, customers can employ programming languages and tools supported by a third party network infrastructure system and also control deployed services. In at least one embodiment, platform services provided by a third party network infrastructure system may include database third party network services, middleware third party network services and third party network services. In at least one embodiment, database third party network services may support shared service deployment models that enable organizations to pool database resources and offer customers a Database as a Service in a form of a database third party network. In at least one embodiment, middleware third party network services may provide a platform for customers to develop and deploy various business applications, and third party network services may provide a platform for customers to deploy applications, in a third party network infrastructure system.

In at least one embodiment, various different infrastructure services may be provided by an IaaS platform in a third party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third party network infrastructure system 1902 may also include infrastructure resources 1930 for providing resources used to provide various services to customers of a third party network infrastructure system. In at least one embodiment, infrastructure resources 1930 may include pre-integrated and optimized combinations of hardware, such as servers, storage, and networking resources to execute services provided by a Paas platform and a Saas platform, and other resources.

In at least one embodiment, resources in third party network infrastructure system 1902 may be shared by multiple users and dynamically re-allocated per demand. In at least one embodiment, resources may be allocated to users in different time zones. In at least one embodiment, third party network infrastructure system 1902 may enable a first set of users in a first time zone to utilize resources of a third party network infrastructure system for a specified number of hours and then enable a re-allocation of same resources to another set of users located in a different time zone, thereby maximizing utilization of resources.

In at least one embodiment, a number of internal shared services 1932 may be provided that are shared by different components or modules of third party network infrastructure system 1902 to enable provision of services by third party network infrastructure system 1902. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third party network infrastructure system 1902 may provide comprehensive management of third party network services (e.g., SaaS, PaaS, and IaaS services) in a third party network infrastructure system. In at least one embodiment, third party network management functionality may include capabilities for provisioning, managing and tracking a customer's subscription received by third party network infrastructure system 1902, and/or variations thereof.

In at least one embodiment, as depicted in FIG. 19, third party network management functionality may be provided by one or more modules, such as an order management module 1920, an order orchestration module 1922, an order provisioning module 1924, an order management and monitoring module 1926, and an identity management module 1928. In at least one embodiment, these modules may include or be provided using one or more computers and/or servers, which may be general purpose computers, specialized server computers, server farms, server clusters, or any other appropriate arrangement and/or combination.

In at least one embodiment, at step 1934, a customer using a client device, such as client computing devices 1904, 1906 or 1908, may interact with third party network infrastructure system 1902 by requesting one or more services provided by third party network infrastructure system 1902 and placing an order for a subscription for one or more services offered by third party network infrastructure system 1902. In at least one embodiment, a customer may access a third party network User Interface (UI) such as third party network UI 1912, third party network UI 1914 and/or third party network UI 1916 and place a subscription order via these UIs. In at least one embodiment, order information received by third party network infrastructure system 1902 in response to a customer placing an order may include information identifying a customer and one or more services offered by a third party network infrastructure system 1902 that a customer intends to subscribe to.

In at least one embodiment, at step 1936, an order information received from a customer may be stored in an order database 1918. In at least one embodiment, if this is a new order, a new record may be created for an order. In at least one embodiment, order database 1918 can be one of several databases operated by third party network infrastructure system 1918 and operated in conjunction with other system elements.

In at least one embodiment, at step 1938, an order information may be forwarded to an order management module 1920 that may be configured to perform billing and accounting functions related to an order, such as verifying an order, and upon verification, booking an order.

In at least one embodiment, at step 1940, information regarding an order may be communicated to an order orchestration module 1922 that is configured to orchestrate provisioning of services and resources for an order placed by a customer. In at least one embodiment, order orchestration module 1922 may use services of order provisioning module 1924 for provisioning. In at least one embodiment, order orchestration module 1922 enables management of business processes associated with each order and applies business logic to determine whether an order should proceed to provisioning.

In at least one embodiment, at step 1942, upon receiving an order for a new subscription, order orchestration module 1922 sends a request to order provisioning module 1924 to allocate resources and configure resources needed to fulfill a subscription order. In at least one embodiment, order provisioning module 1924 enables an allocation of resources for services ordered by a customer. In at least one embodiment, order provisioning module 1924 provides a level of abstraction between third party network services provided by third party network infrastructure system 1900 and a physical implementation layer that is used to provision resources for providing requested services. In at least one embodiment, this enables order orchestration module 1922 to be isolated from implementation details, such as whether or not services and resources are actually provisioned in real-time or pre-provisioned and only allocated/assigned upon request.

In at least one embodiment, at step 1944, once services and resources are provisioned, a notification may be sent to subscribing customers indicating that a requested service is now ready for use. In at least one embodiment, information (e.g. a link) may be sent to a customer that enables a customer to start using requested services.

In at least one embodiment, at step 1946, a customer's subscription order may be managed and tracked by an order management and monitoring module 1926. In at least one embodiment, order management and monitoring module 1926 may be configured to collect usage statistics regarding a customer use of subscribed services. In at least one embodiment, statistics may be collected for an amount of storage used, an amount data transferred, a number of users, and an amount of system up time and system down time, and/or variations thereof.

In at least one embodiment, third party network infrastructure system 1900 may include an identity management module 1928 that is configured to provide identity services, such as access management and authorization services in third party network infrastructure system 1900. In at least one embodiment, identity management module 1928 may control information about customers who wish to utilize services provided by third party network infrastructure system 1902. In at least one embodiment, such information can include information that authenticates identities of such customers and information that describes which actions those customers are authorized to perform relative to various system resources (e.g., files, directories, applications, communication ports, memory segments, etc.). In at least one embodiment, identity management module 1928 may also include management of descriptive information about each customer and about how and by whom that descriptive information can be accessed and modified.

In at least one embodiment, at least one component shown or described with respect to FIG. 19 is utilized to implement techniques and/or functions described in connection with FIGS. 1-13. In at least one embodiment, at least one component of FIG. 19 is used to cause scaling of one or more clocks of one or more cores, based at least in part, on a proximity of the one or more cores to each other. In at least one embodiment, at least one component of FIG. 19 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

FIG. 20 illustrates a cloud computing environment 2002, in accordance with at least one embodiment. In at least one embodiment, cloud computing environment 2002 comprises one or more computer system/servers 2004 with which computing devices such as, personal digital assistant (PDA) or cellular telephone 2006A, desktop computer 2006B, laptop computer 2006C, and/or automobile computer system 2006N communicate. In at least one embodiment, this allows for infrastructure, platforms and/or software to be offered as services from cloud computing environment 2002, so as to not require each client to separately maintain such resources. It is understood that types of computing devices 2006A-N shown in FIG. 20 are intended to be illustrative only and that cloud computing environment 2002 can communicate with any type of computerized device over any type of network and/or network/addressable connection (e.g., using a web browser).

In at least one embodiment, a computer system/server 2004, which can be denoted as a cloud computing node, is operational with numerous other general purpose or special purpose computing system environments or configurations. In at least one embodiment, examples of computing systems, environments, and/or configurations that may be suitable for use with computer system/server 2004 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or variations thereof.

In at least one embodiment, computer system/server 2004 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, exemplary computer system/server 2004 may be practiced in distributed loud computing environments where tasks are performed by remote processing devices that are linked through a communications network. In at least one embodiment, in a distributed cloud computing environment, program modules may be located in both local and remote computer system storage media including memory storage devices.

In at least one embodiment, at least one component shown or described with respect to FIG. 20 is utilized to implement techniques and/or functions described in connection with FIGS. 1-13. In at least one embodiment, at least one component of FIG. 20 is used to cause scaling of one or more clocks of one or more cores, based at least in part, on a proximity of the one or more cores to each other. In at least one embodiment, at least one component of FIG. 20 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

FIG. 21 illustrates a set of functional abstraction layers provided by cloud computing environment 2002 (FIG. 20), in accordance with at least one embodiment. It should be understood in advance that components, layers, and functions shown in FIG. 21 are intended to be illustrative only, and components, layers, and functions may vary.

In at least one embodiment, hardware and software layer 2102 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 2104 provides an abstraction layer from which following exemplary virtual entities may be provided: virtual servers, virtual storage, virtual networks, including virtual private networks, virtual applications, virtual clients, and/or variations thereof.

In at least one embodiment, management layer 2106 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may comprise application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 2108 provides functionality for which a cloud computing environment is utilized. In at least one embodiment, examples of workloads and functions which may be provided from this layer include: mapping and navigation, software development and management, educational services, data analytics and processing, transaction processing, and service delivery.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

In at least one embodiment, at least one component shown or described with respect to FIG. 21 is utilized to implement techniques and/or functions described in connection with FIGS. 1-13. In at least one embodiment, at least one component of FIG. 21 is used to cause scaling of one or more clocks of one or more cores, based at least in part, on a proximity of the one or more cores to each other. In at least one embodiment, at least one component of FIG. 21 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 22:
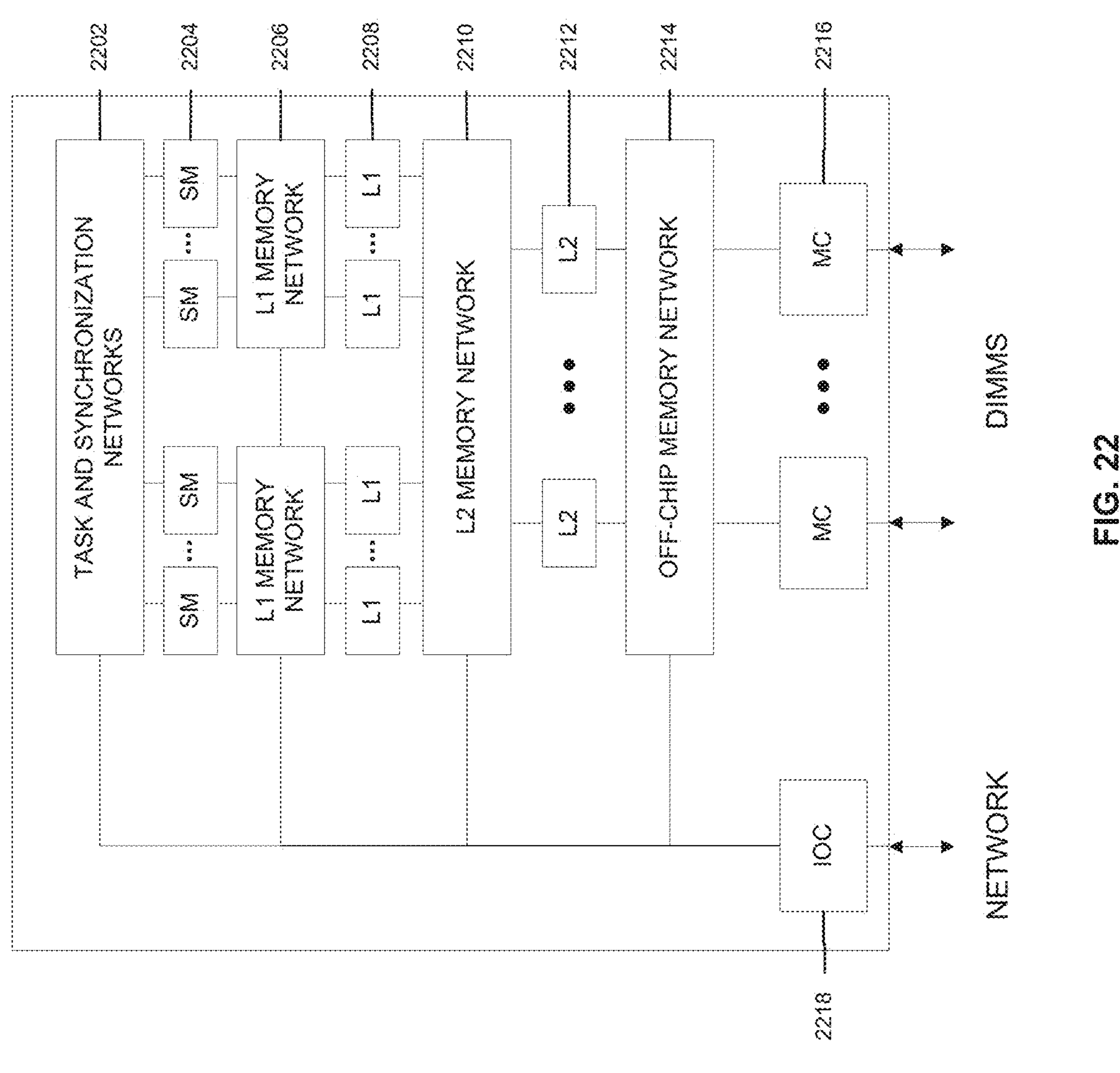
FIG. 22 illustrates a supercomputer at a chip level, in accordance with at least one embodiment.

FIG. 22 illustrates a supercomputer at a chip level, in accordance with at least one embodiment. In at least one embodiment, inside an FPGA or ASIC chip, main computation is performed within finite state machines (2204) called thread units. In at least one embodiment, task and synchronization networks (2202) connect finite state machines and are used to dispatch threads and execute operations in correct order. In at least one embodiment, a multi-level partitioned on-chip cache hierarchy (2208, 2212) is accessed using memory networks (2206, 2210). In at least one embodiment, off-chip memory is accessed using memory controllers (2216) and an off-chip memory network (2214). In at least one embodiment, I/O controller (2218) is used for cross-chip communication when a design does not fit in a single logic chip.

In at least one embodiment, at least one component shown or described with respect to FIG. 22 is utilized to implement techniques and/or functions described in connection with FIGS. 1-13. In at least one embodiment, at least one component of FIG. 22 is used to cause scaling of one or more clocks of one or more cores, based at least in part, on a proximity of the one or more cores to each other. In at least one embodiment, at least one component of FIG. 22 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 23:
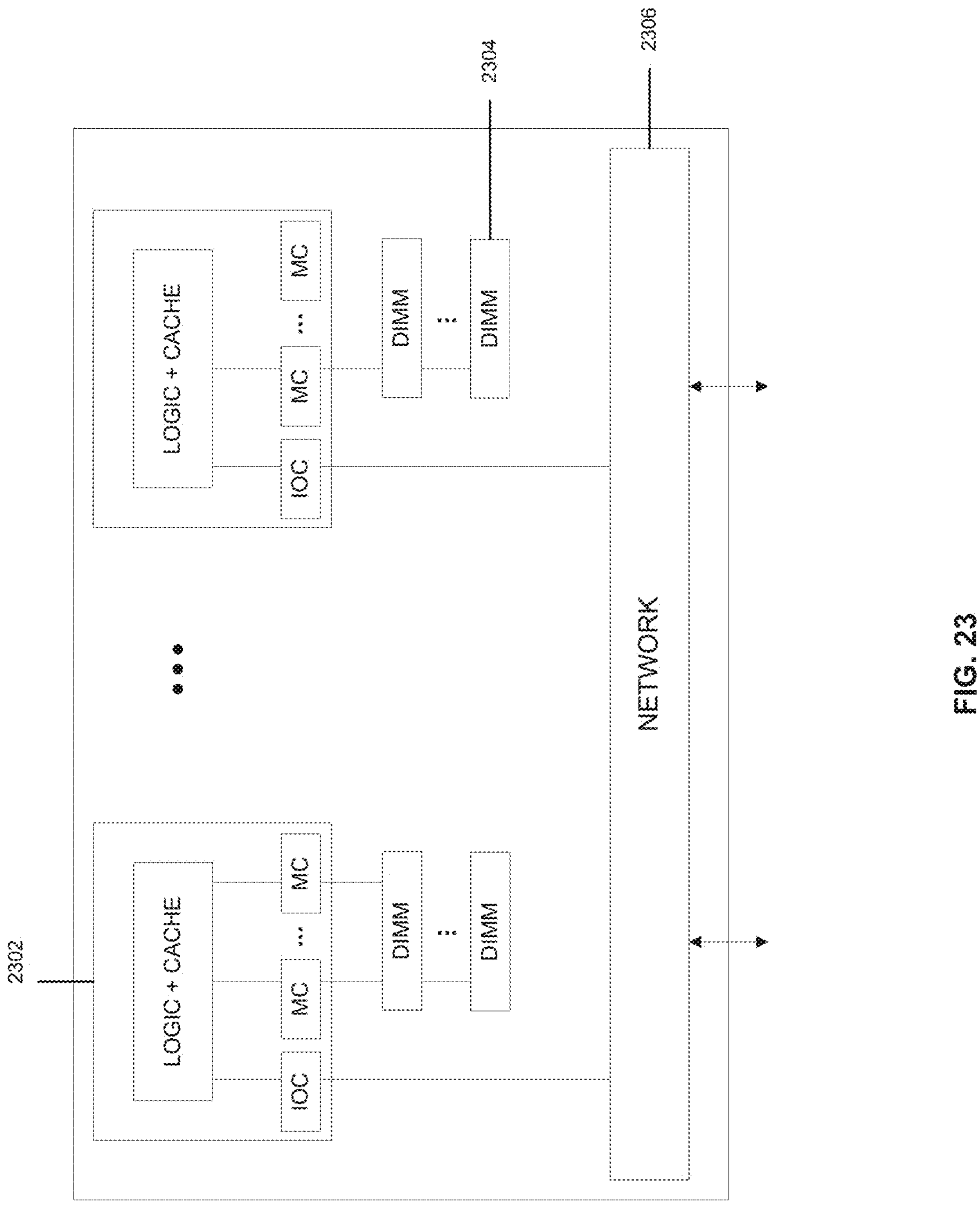
FIG. 23 illustrates a supercomputer at a rack module level, in accordance with at least one embodiment.

FIG. 23 illustrates a supercomputer at a rock module level, in accordance with at least one embodiment. In at least one embodiment, within a rack module, there are multiple FPGA or ASIC chips (2302) that are connected to one or more DRAM units (2304) which constitute main accelerator memory. In at least one embodiment, each FPGA/ASIC chip is connected to its neighbor FPGA/ASIC chip using wide busses on a board, with differential high speed signaling (2306). In at least one embodiment, each FPGA/ASIC chip is also connected to at least one high-speed serial communication cable.

In at least one embodiment, at least one component shown or described with respect to FIG. 23 is utilized to implement techniques and/or functions described in connection with FIGS. 1-13. In at least one embodiment, at least one component of FIG. 23 is used to cause scaling of one or more clocks of one or more cores, based at least in part, on a proximity of the one or more cores to each other. In at least one embodiment, at least one component of FIG. 23 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 24:
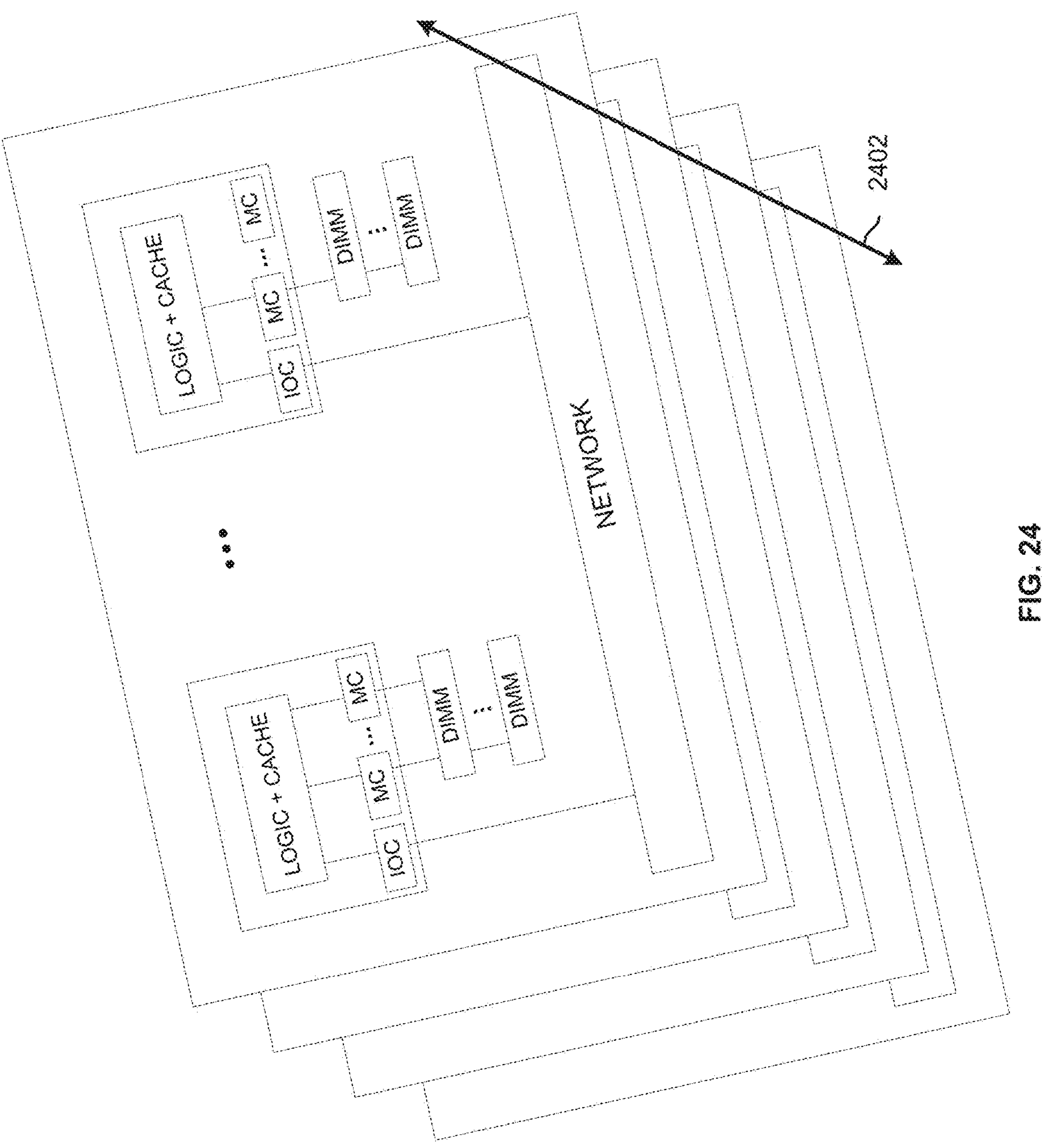
FIG. 24 illustrates a supercomputer at a rack level, in accordance with at least one embodiment.

FIG. 24 illustrates a supercomputer at a rack level, in accordance with at least one embodiment.

In at least one embodiment, at least one component shown or described with respect to FIG. 24 is utilized to implement techniques and/or functions described in connection with FIGS. 1-13. In at least one embodiment, at least one component of FIG. 24 is used to cause scaling of one or more clocks of one or more cores, based at least in part, on a proximity of the one or more cores to each other. In at least one embodiment, at least one component of FIG. 24 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 25:
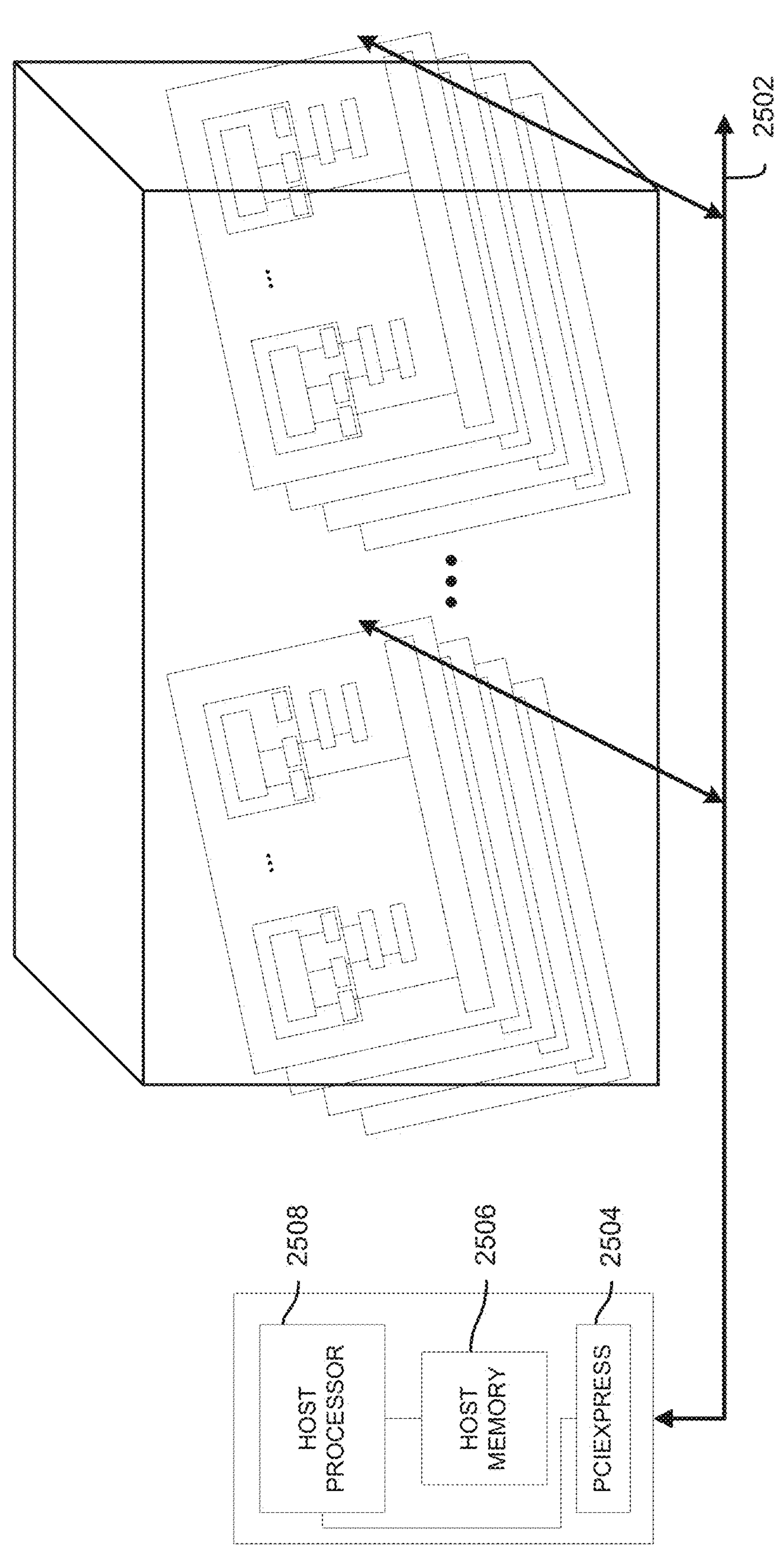
FIG. 25 illustrates a supercomputer at a whole system level, in accordance with at least one embodiment.

FIG. 25 illustrates a supercomputer at a whole system level, in accordance with at least one embodiment. In at least one embodiment, referring to FIG. 24 and FIG. 25, between rack modules in a rack and across racks throughout an entire system, high-speed serial optical or copper cables (2402, 2502) are used to realize a scalable, possibly incomplete hypercube network. In at least one embodiment, one of FPGA/ASIC chips of an accelerator is connected to a host system through a PCI-Express connection (2504). In at least one embodiment, host system comprises a host microprocessor (2508) that a software part of an application runs on and a memory consisting of one or more host memory DRAM units (2506) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 212=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

In at least one embodiment, at least one component shown or described with respect to FIG. 25 is utilized to implement techniques and/or functions described in connection with FIGS. 1-13. In at least one embodiment, at least one component of FIG. 25 is used to cause scaling of one or more clocks of one or more cores, based at least in part, on a proximity of the one or more cores to each other. In at least one embodiment, at least one component of FIG. 25 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Artificial Intelligence

The following figures set forth, without limitation, exemplary artificial intelligence-based systems that can be used to implement at least one embodiment.

FIG. 26A illustrates inference and/or training logic 2615 used to perform inferencing and/or training operations associated with one or more embodiments. Details regarding inference and/or training logic 2615 are provided below in conjunction with FIGS. 26A and/or 26B.

In at least one embodiment, inference and/or training logic 2615 may include, without limitation, code and/or data storage 2601 to store forward and/or output weight and/or input/output data, and/or other parameters to configure neurons or layers of a neural network trained and/or used for inferencing in aspects of one or more embodiments. In at least one embodiment, training logic 2615 may include, or be coupled to code and/or data storage 2601 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment code and/or data storage 2601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2601 may be included with other on-chip or off-chip data storage, including a processor's L1, L2, or L3 cache or system memory.

In at least one embodiment, any portion of code and/or data storage 2601 may be internal or external to one or more processors or other hardware logic devices or circuits. In at least one embodiment, code and/or code and/or data storage 2601 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2601 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2615 may include, without limitation, a code and/or data storage 2605 to store backward and/or output weight and/or input/output data corresponding to neurons or layers of a neural network trained and/or used for inferencing in aspects of one or more embodiments. In at least one embodiment, code and/or data storage 2605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2615 may include, or be coupled to code and/or data storage 2605 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes loading of weight or other parameter information into processor ALUs based on an architecture of a neural network to which such code corresponds. In at least one embodiment, any portion of code and/or data storage 2605 may be included with other on-chip or off-chip data storage, including a processor's L1, L2, or L3 cache or system memory. In at least one embodiment, any portion of code and/or data storage 2605 may be internal or external to one or more processors or other hardware logic devices or circuits. In at least one embodiment, code and/or data storage 2605 may be cache memory, DRAM, SRAM, non-volatile memory (e.g., flash memory), or other storage. In at least one embodiment, a choice of whether code and/or data storage 2605 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2601 and code and/or data storage 2605 may be separate storage structures. In at least one embodiment, code and/or data storage 2601 and code and/or data storage 2605 may be a combined storage structure. In at least one embodiment, code and/or data storage 2601 and code and/or data storage 2605 may be partially combined and partially separate. In at least one embodiment, any portion of code and/or data storage 2601 and code and/or data storage 2605 may be included with other on-chip or off-chip data storage, including a processor's L1, L2, or L3 cache or system memory.

In at least one embodiment, inference and/or training logic 2615 may include, without limitation, one or more arithmetic logic unit(s) ("ALU(s)") 2610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2620 that are functions of input/output and/or weight parameter data stored in code and/or data storage 2601 and/or code and/or data storage 2605. In at least one embodiment, activations stored in activation storage 2620 are generated according to linear algebraic and or matrix-based mathematics performed by ALU(s) 2610 in response to performing instructions or other code, wherein weight values stored in code and/or data storage 2605 and/or data storage 2601 are used as operands along with other values, such as bias values, gradient information, momentum values, or other parameters or hyperparameters, any or all of which may be stored in code and/or data storage 2605 or code and/or data storage 2601 or another storage on or off-chip.

In at least one embodiment, ALU(s) 2610 are included within one or more processors or other hardware logic devices or circuits, whereas in another embodiment, ALU(s) 2610 may be external to a processor or other hardware logic device or circuit that uses them (e.g., a co-processor). In at least one embodiment, ALUs 2610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2601, code and/or data storage 2605, and activation storage 2620 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2620 may be cache memory, DRAM, SRAM, non-volatile memory (e.g., flash memory), or other storage. In at least one embodiment, activation storage 2620 may be completely or partially within or external to one or more processors or other logical circuits. In at least one embodiment, a choice of whether activation storage 2620 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2615 illustrated in FIG. 26A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2615 illustrated in FIG. 26A may be used in conjunction with central processing unit ("CPU") hardware, graphics processing unit ("GPU") hardware or other hardware, such as field programmable gate arrays ("FPGAs").

Figure 26B:
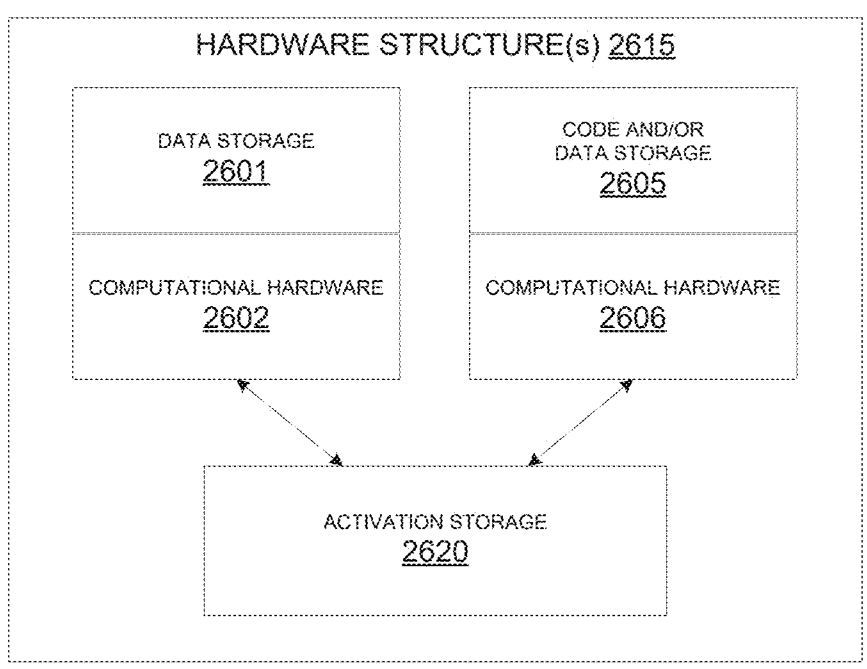
FIG. 26B illustrates inference and/or training logic, in accordance with at least one embodiment.

FIG. 26B illustrates inference and/or training logic 2615, according to at least one embodiment. In at least one embodiment, inference and/or training logic 2615 may include, without limitation, hardware logic in which computational resources are dedicated or otherwise exclusively used in conjunction with weight values or other information corresponding to one or more layers of neurons within a neural network. In at least one embodiment, inference and/or training logic 2615 illustrated in FIG. 26B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2615 illustrated in FIG. 26B may be used in conjunction with central processing unit (CPU) hardware, graphics processing unit (GPU) hardware or other hardware, such as field programmable gate arrays (FPGAs). In at least one embodiment, inference and/or training logic 2615 includes, without limitation, code and/or data storage 2601 and code and/or data storage 2605, which may be used to store code (e.g., graph code), weight values and/or other information, including bias values, gradient information, momentum values, and/or other parameter or hyperparameter information. In at least one embodiment illustrated in FIG. 26B, each of code and/or data storage 2601 and code and/or data storage 2605 is associated with a dedicated computational resource, such as computational hardware 2602 and computational hardware 2606, respectively. In at least one embodiment, each of computational hardware 2602 and computational hardware 2606 comprises one or more ALUs that perform mathematical functions, such as linear algebraic functions, only on information stored in code and/or data storage 2601 and code and/or data storage 2605, respectively, result of which is stored in activation storage 2620.

In at least one embodiment, each of code and/or data storage 2601 and 2605 and corresponding computational hardware 2602 and 2606, respectively, correspond to different layers of a neural network, such that resulting activation from one storage/computational pair 2601/2602 of code and/or data storage 2601 and computational hardware 2602 is provided as an input to a next storage/computational pair 2605/2606 of code and/or data storage 2605 and computational hardware 2606, in order to mirror a conceptual organization of a neural network. In at least one embodiment, each of storage/computational pairs 2601/2602 and 2605/2606 may correspond to more than one neural network layer. In at least one embodiment, additional storage/computation pairs (not shown) subsequent to or in parallel with storage/computation pairs 2601/2602 and 2605/2606 may be included in inference and/or training logic 2615.

In at least one embodiment, at least one component shown or described with respect to FIG. 26 is utilized to implement techniques and/or functions described in connection with FIGS. 1-13. In at least one embodiment, at least one component of FIG. 26 is used to cause scaling of one or more clocks of one or more cores, based at least in part, on a proximity of the one or more cores to each other. In at least one embodiment, at least one component of FIG. 26 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

FIG. 27 illustrates training and deployment of a deep neural network, according to at least one embodiment. In at least one embodiment, untrained neural network 2706 is trained using a training dataset 2702. In at least one embodiment, training framework 2704 is a PyTorch framework, whereas in other embodiments, training framework 2704 is a TensorFlow, Boost, Caffe, Microsoft Cognitive Toolkit/CNTK, MXNet, Chainer, Keras, Deeplearning4j, or other training framework. In at least one embodiment, training framework 2704 trains an untrained neural network 2706 and enables it to be trained using processing resources described herein to generate a trained neural network 2708. In at least one embodiment, weights may be chosen randomly or by pre-training using a deep belief network. In at least one embodiment, training may be performed in either a supervised, partially supervised, or unsupervised manner.

In at least one embodiment, untrained neural network 2706 is trained using supervised learning, wherein training dataset 2702 includes an input paired with a desired output for an input, or where training dataset 2702 includes input having a known output and an output of neural network 2706 is manually graded. In at least one embodiment, untrained neural network 2706 is trained in a supervised manner and processes inputs from training dataset 2702 and compares resulting outputs against a set of expected or desired outputs. In at least one embodiment, errors are then propagated back through untrained neural network 2706. In at least one embodiment, training framework 2704 adjusts weights that control untrained neural network 2706. In at least one embodiment, training framework 2704 includes tools to monitor how well untrained neural network 2706 is converging towards a model, such as trained neural network 2708, suitable to generating correct answers, such as in result 2714, based on input data such as a new dataset 2712. In at least one embodiment, training framework 2704 trains untrained neural network 2706 repeatedly while adjust weights to refine an output of untrained neural network 2706 using a loss function and adjustment algorithm, such as stochastic gradient descent. In at least one embodiment, training framework 2704 trains untrained neural network 2706 until untrained neural network 2706 achieves a desired accuracy. In at least one embodiment, trained neural network 2708 can then be deployed to implement any number of machine learning operations.

In at least one embodiment, untrained neural network 2706 is trained using unsupervised learning, wherein untrained neural network 2706 attempts to train itself using unlabeled data. In at least one embodiment, unsupervised learning training dataset 2702 will include input data without any associated output data or "ground truth" data. In at least one embodiment, untrained neural network 2706 can learn groupings within training dataset 2702 and can determine how individual inputs are related to untrained dataset 2702. In at least one embodiment, unsupervised training can be used to generate a self-organizing map in trained neural network 2708 capable of performing operations useful in reducing dimensionality of new dataset 2712. In at least one embodiment, unsupervised training can also be used to perform anomaly detection, which allows identification of data points in new dataset 2712 that deviate from normal patterns of new dataset 2712.

In at least one embodiment, semi-supervised learning may be used, which is a technique in which in training dataset 2702 includes a mix of labeled and unlabeled data. In at least one embodiment, training framework 2704 may be used to perform incremental learning, such as through transferred learning techniques. In at least one embodiment, incremental learning enables trained neural network 2708 to adapt to new dataset 2712 without forgetting knowledge instilled within trained neural network 2708 during initial training.

In at least one embodiment, at least one component shown or described with respect to FIG. 27 is utilized to implement techniques and/or functions described in connection with FIGS. 1-13. In at least one embodiment, at least one component of FIG. 27 is used to cause scaling of one or more clocks of one or more cores, based at least in part, on a proximity of the one or more cores to each other. In at least one embodiment, at least one component of FIG. 27 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

5G Networks

The following figures set forth, without limitation, exemplary 5G network-based systems that can be used to implement at least one embodiment.

Figure 28:
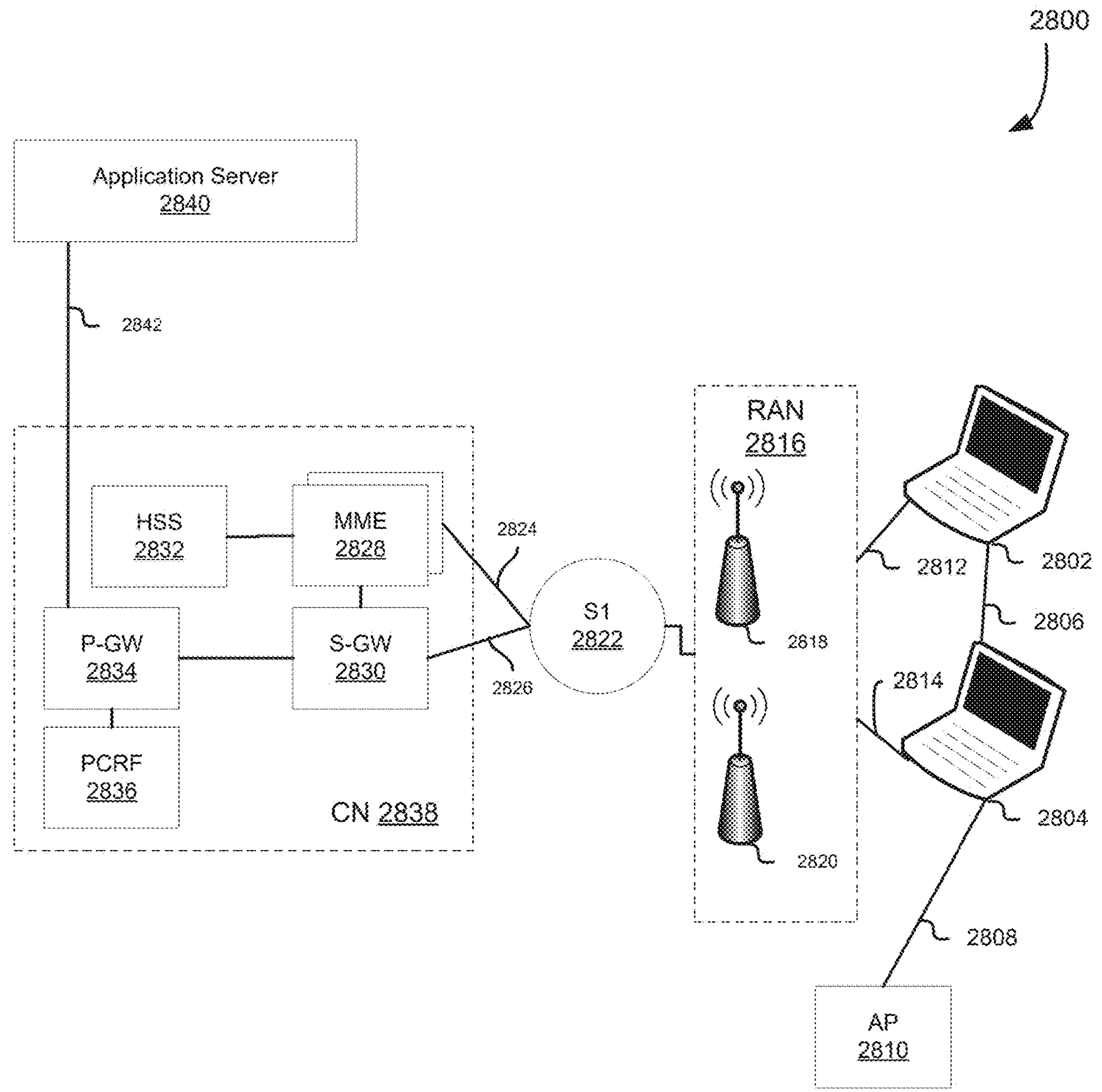
FIG. 28 illustrates an architecture of a system of a network, in accordance with at least one embodiment.

FIG. 28 illustrates an architecture of a system 2800 of a network, in accordance with at least one embodiment. In at least one embodiment, system 2800 is shown to include a user equipment (UE) 2802 and a UE 2804. In at least one embodiment, UEs 2802 and 2804 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In at least one embodiment, any of UEs 2802 and 2804 can comprise an Internet of Things (IoT) UE, which can comprise a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 2802 and 2804 may be configured to connect, e.g., communicatively couple, with a radio access network (RAN) 2816. In at least one embodiment, RAN 2816 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 2802 and 2804 utilize connections 2812 and 2814, respectively, each of which comprises a physical communications interface or layer. In at least one embodiment, connections 2812 and 2814 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 2802 and 2804 may further directly exchange communication data via a ProSe interface 2806. In at least one embodiment, ProSe interface 2806 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 2804 is shown to be configured to access an access point (AP) 2810 via connection 2808. In at least one embodiment, connection 2808 can comprise a local wireless connection, such as a connection consistent with any IEEE 802.11 protocol, wherein AP 2810 would comprise a wireless fidelity (WiFi®) router. In at least one embodiment, AP 2810 is shown to be connected to an Internet without connecting to a core network of a wireless system.

In at least one embodiment, RAN 2816 can include one or more access nodes that enable connections 2812 and 2814. In at least one embodiment, these access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). In at least one embodiment, RAN 2816 may include one or more RAN nodes for providing macrocells, e.g., macro RAN node 2818, and one or more RAN nodes for providing femtocells or picocells (e.g., cells having smaller coverage areas, smaller user capacity, or higher bandwidth compared to macrocells), e.g., low power (LP) RAN node 2820.

In at least one embodiment, any of RAN nodes 2818 and 2820 can terminate an air interface protocol and can be a first point of contact for UEs 2802 and 2804. In at least one embodiment, any of RAN nodes 2818 and 2820 can fulfill various logical functions for RAN 2816 including, but not limited to, radio network controller (RNC) functions such as radio bearer management, uplink and downlink dynamic radio resource management and data packet scheduling, and mobility management.

In at least one embodiment, UEs 2802 and 2804 can be configured to communicate using Orthogonal Frequency-Division Multiplexing (OFDM) communication signals with each other or with any of RAN nodes 2818 and 2820 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can comprise a plurality of orthogonal subcarriers.

In at least one embodiment, a downlink resource grid can be used for downlink transmissions from any of RAN nodes 2818 and 2820 to UEs 2802 and 2804, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid comprises a number of resource blocks, which describe a mapping of certain physical channels to resource elements. In at least one embodiment, each resource block comprises a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 2802 and 2804. In at least one embodiment, a physical downlink control channel (PDCCH) may carry information about a transport format and resource allocations related to PDSCH channel, among other things. In at least one embodiment, it may also inform UEs 2802 and 2804 about a transport format, resource allocation, and HARQ (Hybrid Automatic Repeat Request) information related to an uplink shared channel. In at least one embodiment, typically, downlink scheduling (assigning control and shared channel resource blocks to UE 2802 within a cell) may be performed at any of RAN nodes 2818 and 2820 based on channel quality information fed back from any of UEs 2802 and 2804. In at least one embodiment, downlink resource assignment information may be sent on a PDCCH used for (e.g., assigned to) each of UEs 2802 and 2804.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element groups (EREGs). In at least one embodiment, an ECCE may have other numbers of EREGs in some situations.

In at least one embodiment, RAN 2816 is shown to be communicatively coupled to a core network (CN) 2838 via an S1 interface 2822. In at least one embodiment, CN 2838 may be an evolved packet core (EPC) network, a NextGen Packet Core (NPC) network, or some other type of CN. In at least one embodiment, S1 interface 2822 is split into two parts: S1-U interface 2826, which carries traffic data between RAN nodes 2818 and 2820 and serving gateway (S-GW) 2830, and a S1-mobility management entity (MME) interface 2824, which is a signaling interface between RAN nodes 2818 and 2820 and MMEs 2828.

In at least one embodiment, CN 2838 comprises MMEs 2828, S-GW 2830, Packet Data Network (PDN) Gateway (P-GW) 2834, and a home subscriber server (HSS) 2832. In at least one embodiment, MMEs 2828 may be similar in function to a control plane of legacy Serving General Packet Radio Service (GPRS) Support Nodes (SGSN). In at least one embodiment, MMEs 2828 may manage mobility aspects in access such as gateway selection and tracking area list management. In at least one embodiment, HSS 2832 may comprise a database for network users, including subscription related information to support a network entities' handling of communication sessions. In at least one embodiment, CN 2838 may comprise one or several HSSs 2832, depending on a number of mobile subscribers, on a capacity of an equipment, on an organization of a network, etc. In at least one embodiment, HSS 2832 can provide support for routing/roaming, authentication, authorization, naming/addressing location dependencies, etc.

In at least one embodiment, S-GW 2830 may terminate a S1 interface 2822 towards RAN 2816, and routes data packets between RAN 2816 and CN 2838. In at least one embodiment, S-GW 2830 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 2834 may terminate an SGi interface toward a PDN. In at least one embodiment, P-GW 2834 may route data packets between an EPC network 2838 and external networks such as a network including application server 2840 (alternatively referred to as application function (AF)) via an Internet Protocol (IP) interface 2842. In at least one embodiment, application server 2840 may be an element offering applications that use IP bearer resources with a core network (e.g., UMTS Packet Services (PS) domain, LTE PS data services, etc.). In at least one embodiment, P-GW 2834 is shown to be communicatively coupled to an application server 2840 via an IP communications interface 2842. In at least one embodiment, application server 2840 can also be configured to support one or more communication services (e.g., Voice-over-Internet Protocol (VOIP) sessions, PTT sessions, group communication sessions, social networking services, etc.) for UEs 2802 and 2804 via CN 2838.

In at least one embodiment, P-GW 2834 may further be a node for policy enforcement and charging data collection. In at least one embodiment, policy and Charging Enforcement Function (PCRF) 2836 is a policy and charging control element of CN 2838. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 2836 may be communicatively coupled to application server 2840 via P-GW 2834. In at least one embodiment, application server 2840 may signal PCRF 2836 to indicate a new service flow and select an appropriate Quality of Service (QOS) and charging parameters. In at least one embodiment, PCRF 2836 may provision this rule into a Policy and Charging Enforcement Function (PCEF) (not shown) with an appropriate traffic flow template (TFT) and QoS class of identifier (QCI), which commences a QoS and charging as specified by application server 2840.

In at least one embodiment, at least one component shown or described with respect to FIG. 28 is utilized to implement techniques and/or functions described in connection with FIGS. 1-13. In at least one embodiment, at least one component of FIG. 28 is used to cause scaling of one or more clocks of one or more cores, based at least in part, on a proximity of the one or more cores to each other. In at least one embodiment, at least one component of FIG. 28 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 29:
FIG. 29 illustrates an architecture of a system of a network, in accordance with at least one embodiment.
Figure 29:
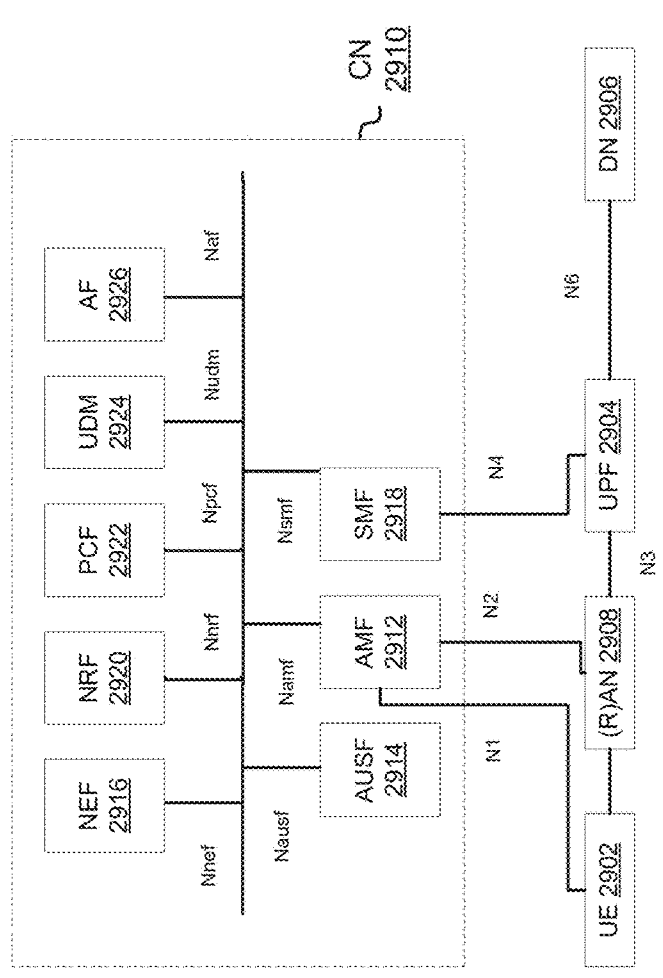

FIG. 29 illustrates an architecture of a system 2900 of a network in accordance with some embodiments. In at least one embodiment, system 2900 is shown to include a UE 2902, a 5G access node or RAN node (shown as (R)AN node 2908), a User Plane Function (shown as UPF 2904), a Data Network (DN 2906), which may be, for example, operator services, Internet access or 3rd party services, and a 5G Core Network (5GC) (shown as CN 2910).

In at least one embodiment, CN 2910 includes an Authentication Server Function (AUSF 2914); a Core Access and Mobility Management Function (AMF 2912); a Session Management Function (SMF 2918); a Network Exposure Function (NEF 2916); a Policy Control Function (PCF 2922); a Network Function (NF) Repository Function (NRF 2920); a Unified Data Management (UDM 2924); and an Application Function (AF 2926). In at least one embodiment, CN 2910 may also include other elements that are not shown, such as a Structured Data Storage network function (SDSF), an Unstructured Data Storage network function (UDSF), and variations thereof.

In at least one embodiment, UPF 2904 may act as an anchor point for intra-RAT and inter-RAT mobility, an external PDU session point of interconnect to DN 2906, and a branching point to support multi-homed PDU session. In at least one embodiment, UPF 2904 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 2904 may include an uplink classifier to support routing traffic flows to a data network. In at least one embodiment, DN 2906 may represent various network operator services, Internet access, or third party services.

In at least one embodiment, AUSF 2914 may store data for authentication of UE 2902 and handle authentication related functionality. In at least one embodiment, AUSF 2914 may facilitate a common authentication framework for various access types.

In at least one embodiment, AMF 2912 may be responsible for registration management (e.g., for registering UE 2902, etc.), connection management, reachability management, mobility management, and lawful interception of AMF-related events, and access authentication and authorization. In at least one embodiment, AMF 2912 may provide transport for SM messages for SMF 2918, and act as a transparent proxy for routing SM messages. In at least one embodiment, AMF 2912 may also provide transport for short message service (SMS) messages between UE 2902 and an SMS function (SMSF) (not shown by FIG. 29). In at least one embodiment, AMF 2912 may act as Security Anchor Function (SEA), which may include interaction with AUSF 2914 and UE 2902 and receipt of an intermediate key that was established as a result of UE 2902 authentication process. In at least one embodiment, where USIM based authentication is used, AMF 2912 may retrieve security material from AUSF 2914. In at least one embodiment, AMF 2912 may also include a Security Context Management (SCM) function, which receives a key from SEA that it uses to derive access-network specific keys. In at least one embodiment, furthermore, AMF 2912 may be a termination point of RAN CP interface (N2 reference point), a termination point of NAS (NI) signaling, and perform NAS ciphering and integrity protection.

In at least one embodiment, AMF 2912 may also support NAS signaling with a UE 2902 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 2902 and AMF 2912, and relay uplink and downlink user-plane packets between UE 2902 and UPF 2904. In at least one embodiment, N3IWF also provides mechanisms for IPsec tunnel establishment with UE 2902.

In at least one embodiment, SMF 2918 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 2918 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 2916 may provide means for securely exposing services and capabilities provided by 3GPP network functions for third party, internal exposure/re-exposure, Application Functions (e.g., AF 2926), edge computing or fog computing systems, etc. In at least one embodiment, NEF 2916 may authenticate, authorize, and/or throttle AFs. In at least one embodiment, NEF 2916 may also translate information exchanged with AF 2926 and information exchanged with internal network functions. In at least one embodiment, NEF 2916 may translate between an AF-Service-Identifier and an internal 5GC information. In at least one embodiment, NEF 2916 may also receive information from other network functions (NFs) based on exposed capabilities of other network functions. In at least one embodiment, this information may be stored at NEF 2916 as structured data, or at a data storage NF using a standardized interfaces. In at least one embodiment, stored information can then be re-exposed by NEF 2916 to other NFs and AFs, and/or used for other purposes such as analytics.

In at least one embodiment, NRF 2920 may support service discovery functions, receive NF Discovery Requests from NF instances, and provide information of discovered NF instances to NF instances. In at least one embodiment, NRF 2920 also maintains information of available NF instances and their supported services.

In at least one embodiment, PCF 2922 may provide policy rules to control plane function(s) to enforce them, and may also support unified policy framework to govern network behavior. In at least one embodiment, PCF 2922 may also implement a front end (FE) to access subscription information relevant for policy decisions in a UDR of UDM 2924.

In at least one embodiment, UDM 2924 may handle subscription-related information to support a network entities' handling of communication sessions, and may store subscription data of UE 2902. In at least one embodiment, UDM 2924 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 2922. In at least one embodiment, UDM 2924 may also support SMS management, wherein an SMS-FE implements a similar application logic as discussed previously.

In at least one embodiment, AF 2926 may provide application influence on traffic routing, access to a Network Capability Exposure (NCE), and interact with a policy framework for policy control. In at least one embodiment, NCE may be a mechanism that allows a 5GC and AF 2926 to provide information to each other via NEF 2916, which may be used for edge computing implementations. In at least one embodiment, network operator and third party services may be hosted close to UE 2902 access point of attachment to achieve an efficient service delivery through a reduced end-to-end latency and load on a transport network. In at least one embodiment, for edge computing implementations, 5GC may select a UPF 2904 close to UE 2902 and execute traffic steering from UPF 2904 to DN 2906 via N6 interface. In at least one embodiment, this may be based on UE subscription data, UE location, and information provided by AF 2926. In at least one embodiment, AF 2926 may influence UPF (re) selection and traffic routing. In at least one embodiment, based on operator deployment, when AF 2926 is considered to be a trusted entity, a network operator may permit AF 2926 to interact directly with relevant NFs.

In at least one embodiment, CN 2910 may include an SMSF, which may be responsible for SMS subscription checking and verification, and relaying SM messages to/from UE 2902 to/from other entities, such as an SMS-GMSC/IWMSC/SMS-router. In at least one embodiment, SMS may also interact with AMF 2912 and UDM 2924 for notification procedure that UE 2902 is available for SMS transfer (e.g., set a UE not reachable flag, and notifying UDM 2924 when UE 2902 is available for SMS).

In at least one embodiment, system 2900 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 2900 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 2910 may include an Nx interface, which is an inter-CN interface between MME and AMF 2912 in order to enable interworking between CN 2910 and CN 7229.

In at least one embodiment, system 2900 may include multiple RAN nodes (such as (R)AN node 2908) wherein an Xn interface is defined between two or more (R)AN node 2908 (e.g., gNBs) that connecting to 5GC 410, between a (R)AN node 2908 (e.g., gNB) connecting to CN 2910 and an eNB (e.g., a macro RAN node), and/or between two eNBs connecting to CN 2910.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C interface; mobility support for UE 2902 in a connected mode (e.g., CM-CONNECTED) including functionality to manage UE mobility for connected mode between one or more (R)AN node 2908. In at least one embodiment, mobility support may include context transfer from an old (source) serving (R)AN node 2908 to new (target) serving (R)AN node 2908; and control of user plane tunnels between old (source) serving (R)AN node 2908 to new (target) serving (R)AN node 2908.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to an user plane and/or control plane protocol stack(s) shown and described herein.

In at least one embodiment, at least one component shown or described with respect to FIG. 29 is utilized to implement techniques and/or functions described in connection with FIGS. 1-13. In at least one embodiment, at least one component of FIG. 29 is used to cause scaling of one or more clocks of one or more cores, based at least in part, on a proximity of the one or more cores to each other. In at least one embodiment, at least one component of FIG. 29 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 30:
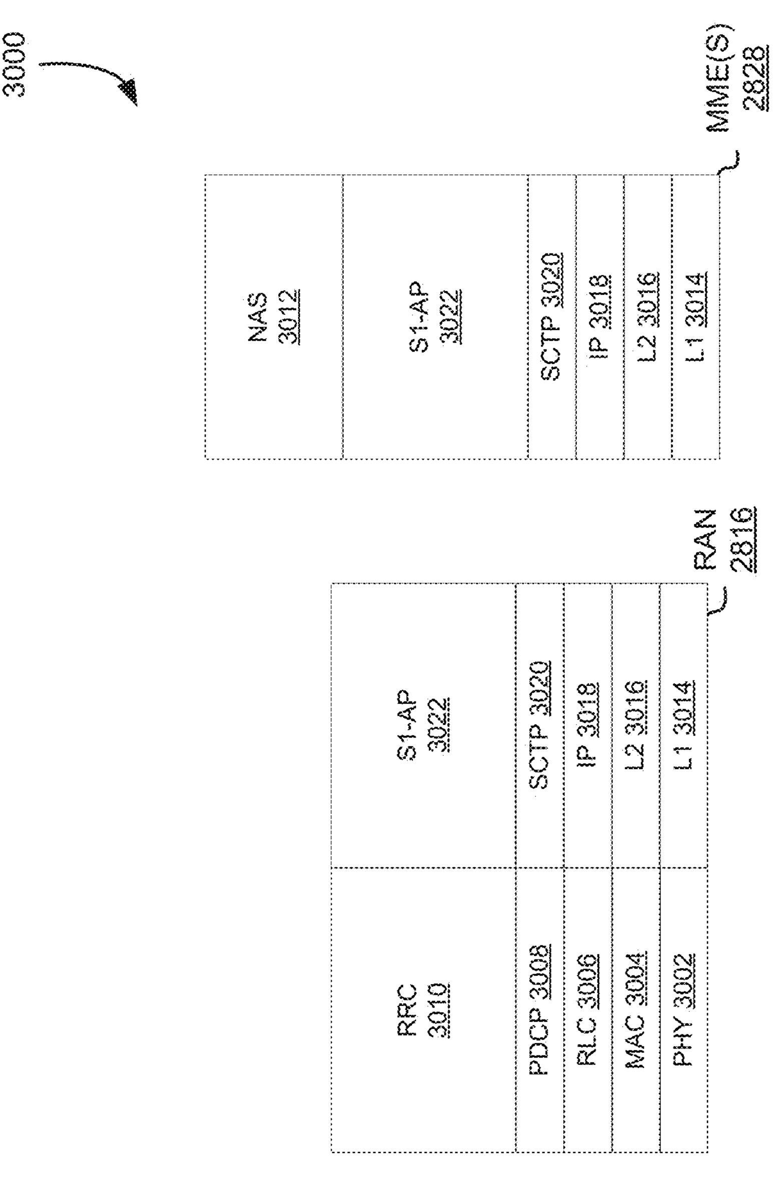
FIG. 30 illustrates a control plane protocol stack, in accordance with at least one embodiment.

FIG. 30 is an illustration of a control plane protocol stack in accordance with some embodiments. In at least one embodiment, a control plane 3000 is shown as a communications protocol stack between UE 2802 (or alternatively, UE 2804), RAN 2816, and MME(s) 2828.

In at least one embodiment, PHY layer 3002 may transmit or receive information used by MAC layer 3004 over one or more air interfaces. In at least one embodiment, PHY layer 3002 may further perform link adaptation or adaptive modulation and coding (AMC), power control, cell search (e.g., for initial synchronization and handover purposes), and other measurements used by higher layers, such as an RRC layer 3010. In at least one embodiment, PHY layer 3002 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 3004 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 3006 may operate in a plurality of modes of operation, including: Transparent Mode (TM), Unacknowledged Mode (UM), and Acknowledged Mode (AM). In at least one embodiment, RLC layer 3006 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 3006 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 3008 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 3010 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may comprise one or more information elements (IEs), which may each comprise individual data fields or data structures.

In at least one embodiment, UE 2802 and RAN 2816 may utilize a Uu interface (e.g., an LTE-Uu interface) to exchange control plane data via a protocol stack comprising PHY layer 3002, MAC layer 3004, RLC layer 3006, PDCP layer 3008, and RRC layer 3010.

In at least one embodiment, non-access stratum (NAS) protocols (NAS protocols 3012) form a highest stratum of a control plane between UE 2802 and MME(s) 2828. In at least one embodiment, NAS protocols 3012 support mobility of UE 2802 and session management procedures to establish and maintain IP connectivity between UE 2802 and P-GW 2834.

In at least one embodiment, Si Application Protocol (S1-AP) layer (Si-AP layer 3022) may support functions of a Si interface and comprise Elementary Procedures (EPS). In at least one embodiment, an EP is a unit of interaction between RAN 2816 and CN 2828. In at least one embodiment, S1-AP layer services may comprise two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 3020) may ensure reliable delivery of signaling messages between RAN 2816 and MME(s) 2828 based, in part, on an IP protocol, supported by an IP layer 3018. In at least one embodiment, L2 layer 3016 and an L1 layer 3014 may refer to communication links (e.g., wired or wireless) used by a RAN node and MME to exchange information.

In at least one embodiment, RAN 2816 and MME(s) 2828 may utilize an S1-MME interface to exchange control plane data via a protocol stack comprising a L1 layer 3014, L2 layer 3016, IP layer 3018, SCTP layer 3020, and Si-AP layer 3022.

In at least one embodiment, at least one component shown or described with respect to FIG. 30 is utilized to implement techniques and/or functions described in connection with FIGS. 1-13. In at least one embodiment, at least one component of FIG. 30 is used to cause scaling of one or more clocks of one or more cores, based at least in part, on a proximity of the one or more cores to each other. In at least one embodiment, at least one component of FIG. 30 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 31:
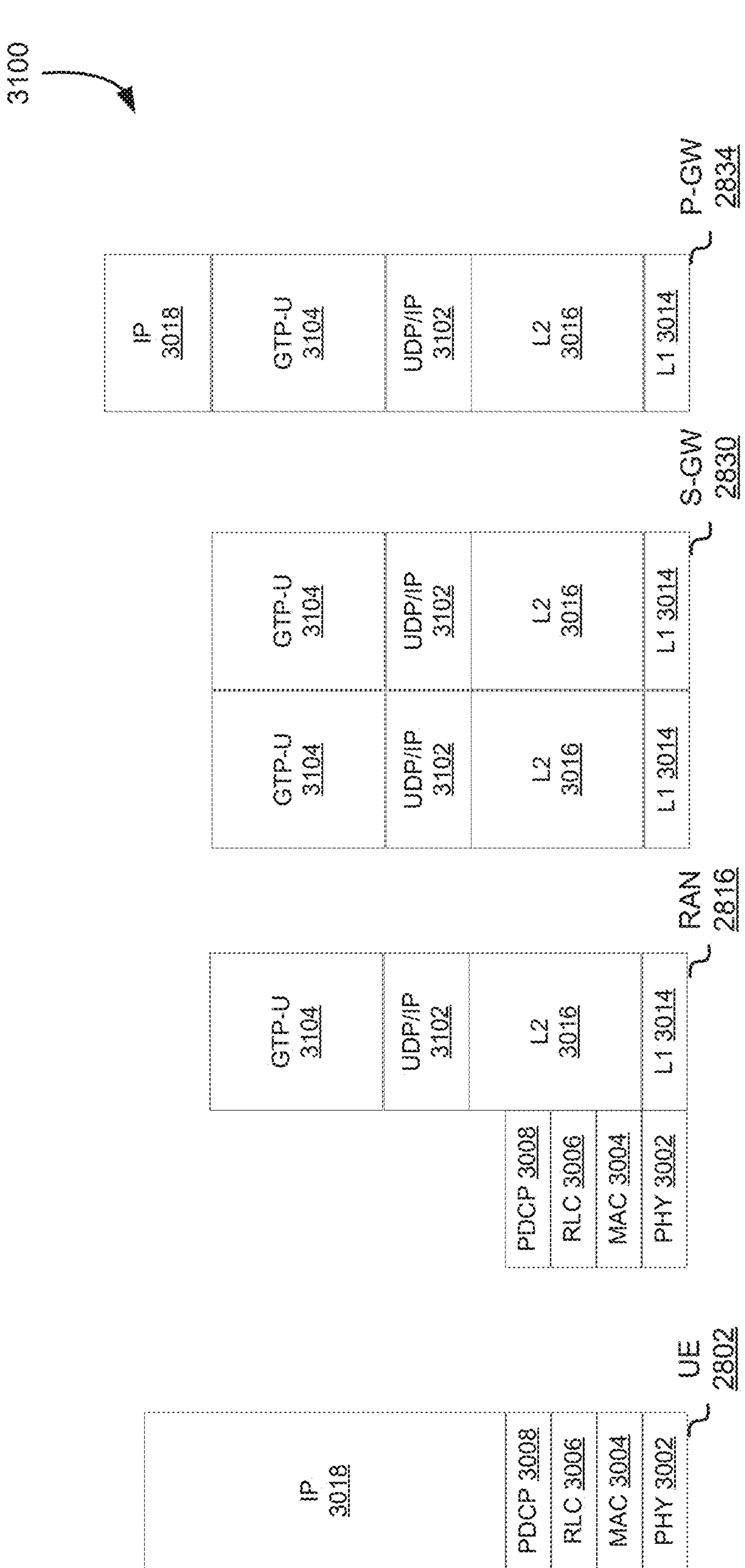
FIG. 31 illustrates a user plane protocol stack, in accordance with at least one embodiment.

FIG. 31 is an illustration of a user plane protocol stack in accordance with at least one embodiment. In at least one embodiment, a user plane 3100 is shown as a communications protocol stack between a UE 2802, RAN 2816, S-GW 2830, and P-GW 2834. In at least one embodiment, user plane 3100 may utilize a same protocol layers as control plane 3000. In at least one embodiment, for example, UE 2802 and RAN 2816 may utilize a Uu interface (e.g., an LTE-Uu interface) to exchange user plane data via a protocol stack comprising PHY layer 3002, MAC layer 3004, RLC layer 3006, PDCP layer 3008.

In at least one embodiment, General Packet Radio Service (GPRS) Tunneling Protocol for a user plane (GTP-U) layer (GTP-U layer 3104) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 3102) may provide checksums for data integrity, port numbers for addressing different functions at a source and destination, and encryption and authentication on selected data flows. In at least one embodiment, RAN 2816 and S-GW 2830 may utilize an S1-U interface to exchange user plane data via a protocol stack comprising L1 layer 3014, L2 layer 3016, UDP/IP layer 3102, and GTP-U layer 3104. In at least one embodiment, S-GW 2830 and P-GW 2834 may utilize an S5/S8a interface to exchange user plane data via a protocol stack comprising L1 layer 3014, L2 layer 3016, UDP/IP layer 3102, and GTP-U layer 3104. In at least one embodiment, as discussed above with respect to FIG. 30, NAS protocols support a mobility of UE 2802 and session management procedures to establish and maintain IP connectivity between UE 2802 and P-GW 2834.

In at least one embodiment, at least one component shown or described with respect to FIG. 31 is utilized to implement techniques and/or functions described in connection with FIGS. 1-13. In at least one embodiment, at least one component of FIG. 31 is used to cause scaling of one or more clocks of one or more cores, based at least in part, on a proximity of the one or more cores to each other. In at least one embodiment, at least one component of FIG. 31 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 32:
FIG. 32 illustrates components of a core network, in accordance with at least one embodiment.
Figure 32:
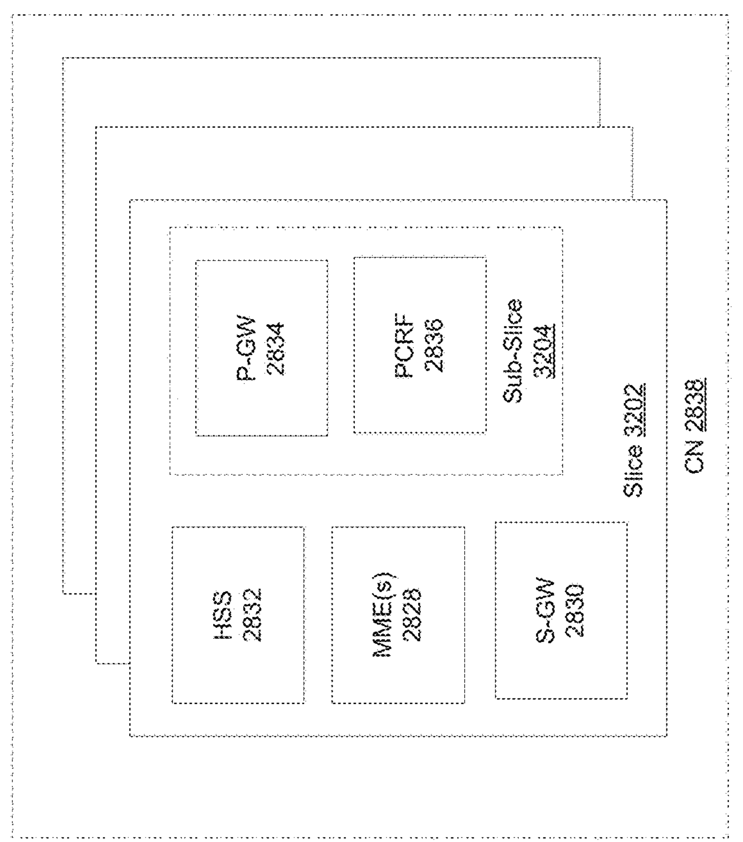

FIG. 32 illustrates components 3200 of a core network in accordance with at least one embodiment. In at least one embodiment, components of CN 2838 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 2838 may be referred to as a network slice 3202 (e.g., network slice 3202 is shown to include HSS 2832, MME(s) 2828, and S-GW 2830). In at least one embodiment, a logical instantiation of a portion of CN 2838 may be referred to as a network sub-slice 3204 (e.g., network sub-slice 3204 is shown to include P-GW 2834 and PCRF 2836).

In at least one embodiment, NFV architectures and infrastructures may be used to virtualize one or more network functions, alternatively performed by proprietary hardware, onto physical resources comprising a combination of industry-standard server hardware, storage hardware, or switches. In at least one embodiment, NFV systems can be used to execute virtual or reconfigurable implementations of one or more EPC components/functions.

In at least one embodiment, at least one component shown or described with respect to FIG. 32 is utilized to implement techniques and/or functions described in connection with FIGS. 1-13. In at least one embodiment, at least one component of FIG. 32 is used to cause scaling of one or more clocks of one or more cores, based at least in part, on a proximity of the one or more cores to each other. In at least one embodiment, at least one component of FIG. 32 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 33:
FIG. 33 illustrates components of a system to support network function virtualization (NFV), in accordance with at least one embodiment.
Figure 33:
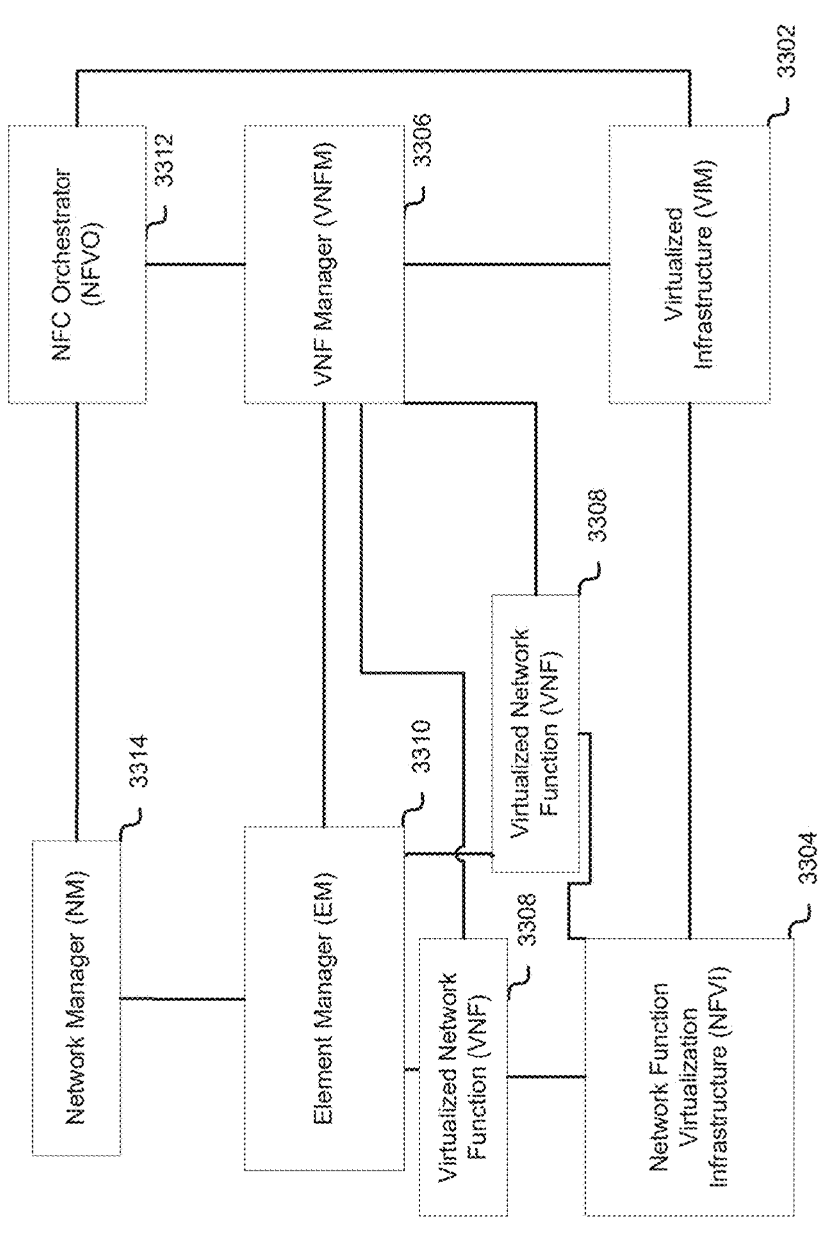

FIG. 33 is a block diagram illustrating components, according to at least one embodiment, of a system 3300 to support network function virtualization (NFV). In at least one embodiment, system 3300 is illustrated as including a virtualized infrastructure manager (shown as VIM 3302), a network function virtualization infrastructure (shown as NFVI 3304), a VNF manager (shown as VNFM 3306), virtualized network functions (shown as VNF 3308), an element manager (shown as EM 3310), an NFV Orchestrator (shown as NFVO 3312), and a network manager (shown as NM 3314).

In at least one embodiment, VIM 3302 manages resources of NFVI 3304. In at least one embodiment, NFVI 3304 can include physical or virtual resources and applications (including hypervisors) used to execute system 3300. In at least one embodiment, VIM 3302 may manage a life cycle of virtual resources with NFVI 3304 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 3306 may manage VNF 3308. In at least one embodiment, VNF 3308 may be used to execute EPC components/functions. In at least one embodiment, VNFM 3306 may manage a life cycle of VNF 3308 and track performance, fault and security of virtual aspects of VNF 3308. In at least one embodiment, EM 3310 may track performance, fault and security of functional aspects of VNF 3308. In at least one embodiment, tracking data from VNFM 3306 and EM 3310 may comprise, for example, performance measurement (PM) data used by VIM 3302 or NFVI 3304. In at least one embodiment, both VNFM 3306 and EM 3310 can scale up/down a quantity of VNFs of system 3300.

In at least one embodiment, NFVO 3312 may coordinate, authorize, release and engage resources of NFVI 3304 in order to provide a requested service (e.g., to execute an EPC function, component, or slice). In at least one embodiment, NM 3314 may provide a package of end-user functions with responsibility for a management of a network, which may include network elements with VNFs, non-virtualized network functions, or both (management of VNFs may occur via an EM 3310).

In at least one embodiment, at least one component shown or described with respect to FIG. 33 is utilized to implement techniques and/or functions described in connection with FIGS. 1-13. In at least one embodiment, at least one component of FIG. 33 is used to cause scaling of one or more clocks of one or more cores, based at least in part, on a proximity of the one or more cores to each other. In at least one embodiment, at least one component of FIG. 33 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Computer-Based Systems

The following figures set forth, without limitation, exemplary computer-based systems that can be used to implement at least one embodiment.

Figure 34:
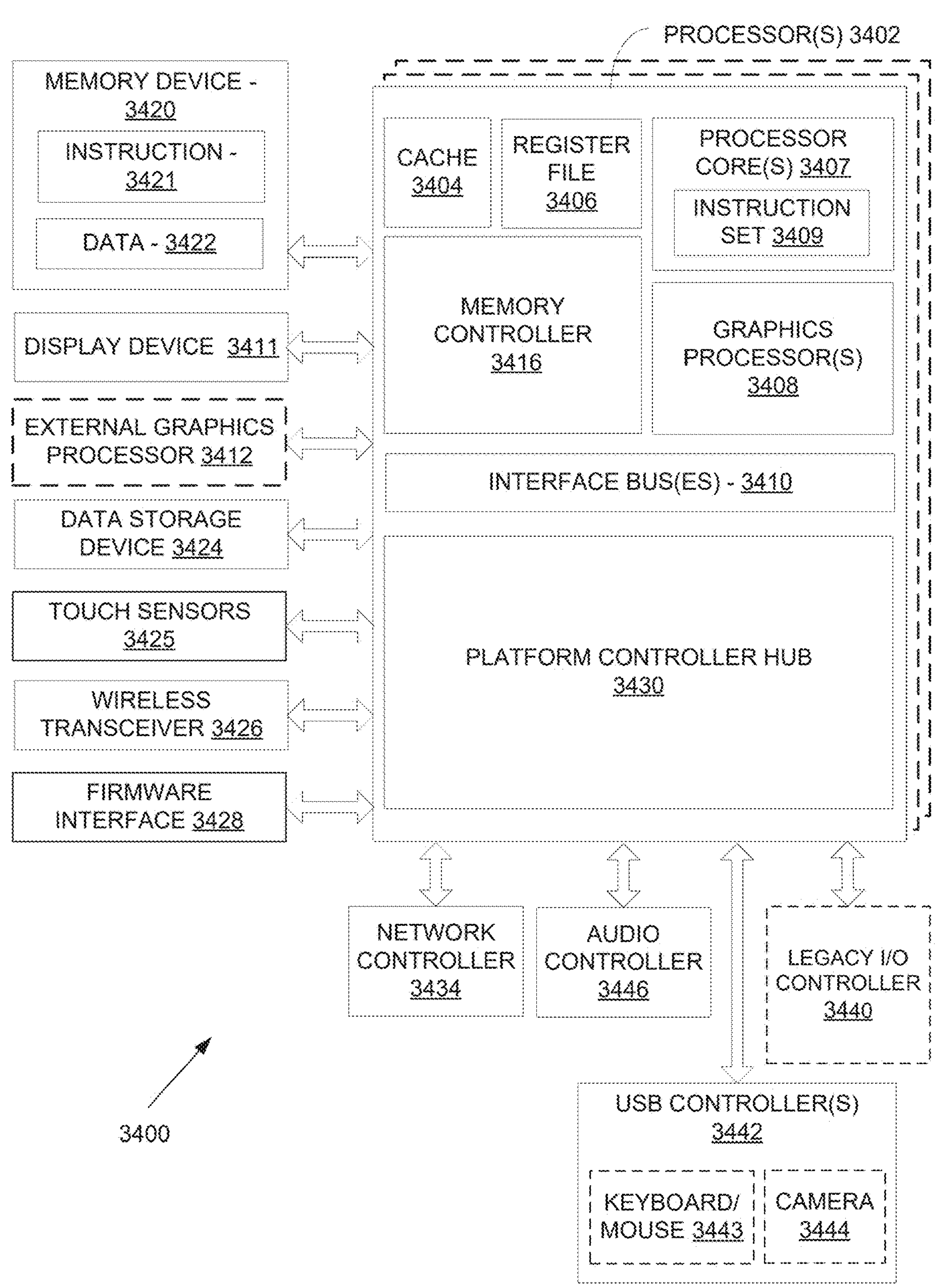
FIG. 34 illustrates a processing system, in accordance with at least one embodiment.

FIG. 34 illustrates a processing system 3400, in accordance with at least one embodiment. In at least one embodiment, processing system 3400 includes one or more processors 3402 and one or more graphics processors 3408, and may be a single processor desktop system, a multiprocessor workstation system, or a server system having a large number of processors 3402 or processor cores 3407. In at least one embodiment, processing system 3400 is a processing platform incorporated within a system-on-a-chip ("SoC") integrated circuit for use in mobile, handheld, or embedded devices.

In at least one embodiment, processing system 3400 can include, or be incorporated within a server-based gaming platform, a game console, a media console, a mobile gaming console, a handheld game console, or an online game console. In at least one embodiment, processing system 3400 is a mobile phone, smart phone, tablet computing device or mobile Internet device. In at least one embodiment, processing system 3400 can also include, couple with, or be integrated within a wearable device, such as a smart watch wearable device, smart eyewear device, augmented reality device, or virtual reality device. In at least one embodiment, processing system 3400 is a television or set top box device having one or more processors 3402 and a graphical interface generated by one or more graphics processors 3408.

In at least one embodiment, one or more processors 3402 each include one or more processor cores 3407 to process instructions which, when executed, perform operations for system and user software. In at least one embodiment, each of one or more processor cores 3407 is configured to process a specific instruction set 3409. In at least one embodiment, instruction set 3409 may facilitate Complex Instruction Set Computing ("CISC"), Reduced Instruction Set Computing ("RISC"), or computing via a Very Long Instruction Word ("VLIW"). In at least one embodiment, processor cores 3407 may each process a different instruction set 3409, which may include instructions to facilitate emulation of other instruction sets. In at least one embodiment, processor core 3407 may also include other processing devices, such as a digital signal processor ("DSP").

In at least one embodiment, processor 3402 includes cache memory ("cache") 3404. In at least one embodiment, processor 3402 can have a single internal cache or multiple levels of internal cache. In at least one embodiment, cache memory is shared among various components of processor 3402. In at least one embodiment, processor 3402 also uses an external cache (e.g., a Level 3 ("L3") cache or Last Level Cache ("LLC")) (not shown), which may be shared among processor cores 3407 using known cache coherency techniques. In at least one embodiment, register file 3406 is additionally included in processor 3402 which may include different types of registers for storing different types of data (e.g., integer registers, floating point registers, status registers, and an instruction pointer register). In at least one embodiment, register file 3406 may include general-purpose registers or other registers.

In at least one embodiment, one or more processor(s) 3402 are coupled with one or more interface bus(es) 3410 to transmit communication signals such as address, data, or control signals between processor 3402 and other components in processing system 3400. In at least one embodiment interface bus 3410, in one embodiment, can be a processor bus, such as a version of a Direct Media Interface ("DMI") bus. In at least one embodiment, interface bus 3410 is not limited to a DMI bus, and may include one or more Peripheral Component Interconnect buses (e.g., "PCI," PCI Express ("PCIe")), memory buses, or other types of interface buses. In at least one embodiment processor(s) 3402 include an integrated memory controller 3416 and a platform controller hub 3430. In at least one embodiment, memory controller 3416 facilitates communication between a memory device and other components of processing system 3400, while platform controller hub ("PCH") 3430 provides connections to Input/Output ("I/O") devices via a local I/O bus.

In at least one embodiment, memory device 3420 can be a dynamic random access memory ("DRAM") device, a static random access memory ("SRAM") device, flash memory device, phase-change memory device, or some other memory device having suitable performance to serve as processor memory. In at least one embodiment memory device 3420 can operate as system memory for processing system 3400, to store data 3422 and instructions 3421 for use when one or more processors 3402 executes an application or process. In at least one embodiment, memory controller 3416 also couples with an optional external graphics processor 3412, which may communicate with one or more graphics processors 3408 in processors 3402 to perform graphics and media operations. In at least one embodiment, a display device 3411 can connect to processor(s) 3402. In at least one embodiment display device 3411 can include one or more of an internal display device, as in a mobile electronic device or a laptop device or an external display device attached via a display interface (e.g., DisplayPort, etc.). In at least one embodiment, display device 3411 can include a head mounted display ("HMD") such as a stereoscopic display device for use in virtual reality ("VR") applications or augmented reality ("AR") applications.

In at least one embodiment, platform controller hub 3430 enables peripherals to connect to memory device 3420 and processor 3402 via a high-speed I/O bus. In at least one embodiment, I/O peripherals include, but are not limited to, an audio controller 3446, a network controller 3434, a firmware interface 3428, a wireless transceiver 3426, touch sensors 3425, a data storage device 3424 (e.g., hard disk drive, flash memory, etc.). In at least one embodiment, data storage device 3424 can connect via a storage interface (e.g., SATA) or via a peripheral bus, such as PCI, or PCIe. In at least one embodiment, touch sensors 3425 can include touch screen sensors, pressure sensors, or fingerprint sensors. In at least one embodiment, wireless transceiver 3426 can be a Wi-Fi transceiver, a Bluetooth transceiver, or a mobile network transceiver such as a 3G, 4G, or Long Term Evolution ("LTE") transceiver. In at least one embodiment, firmware interface 3428 enables communication with system firmware, and can be, for example, a unified extensible firmware interface ("UEFI"). In at least one embodiment, network controller 3434 can enable a network connection to a wired network. In at least one embodiment, a high-performance network controller (not shown) couples with interface bus 3410. In at least one embodiment, audio controller 3446 is a multi-channel high definition audio controller. In at least one embodiment, processing system 3400 includes an optional legacy I/O controller 3440 for coupling legacy (e.g., Personal System 2 ("PS/2")) devices to processing system 3400. In at least one embodiment, platform controller hub 3430 can also connect to one or more Universal Serial Bus ("USB") controllers 3442 connect input devices, such as keyboard and mouse 3443 combinations, a camera 3444, or other USB input devices.

In at least one embodiment, an instance of memory controller 3416 and platform controller hub 3430 may be integrated into a discreet external graphics processor, such as external graphics processor 3412. In at least one embodiment, platform controller hub 3430 and/or memory controller 3416 may be external to one or more processor(s) 3402. For example, in at least one embodiment, processing system 3400 can include an external memory controller 3416 and platform controller hub 3430, which may be configured as a memory controller hub and peripheral controller hub within a system chipset that is in communication with processor(s) 3402.

In at least one embodiment, at least one component shown or described with respect to FIG. 34 is utilized to implement techniques and/or functions described in connection with FIGS. 1-13. In at least one embodiment, at least one component of FIG. 34 is used to cause scaling of one or more clocks of one or more cores, based at least in part, on a proximity of the one or more cores to each other. In at least one embodiment, at least one component of FIG. 34 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 35:
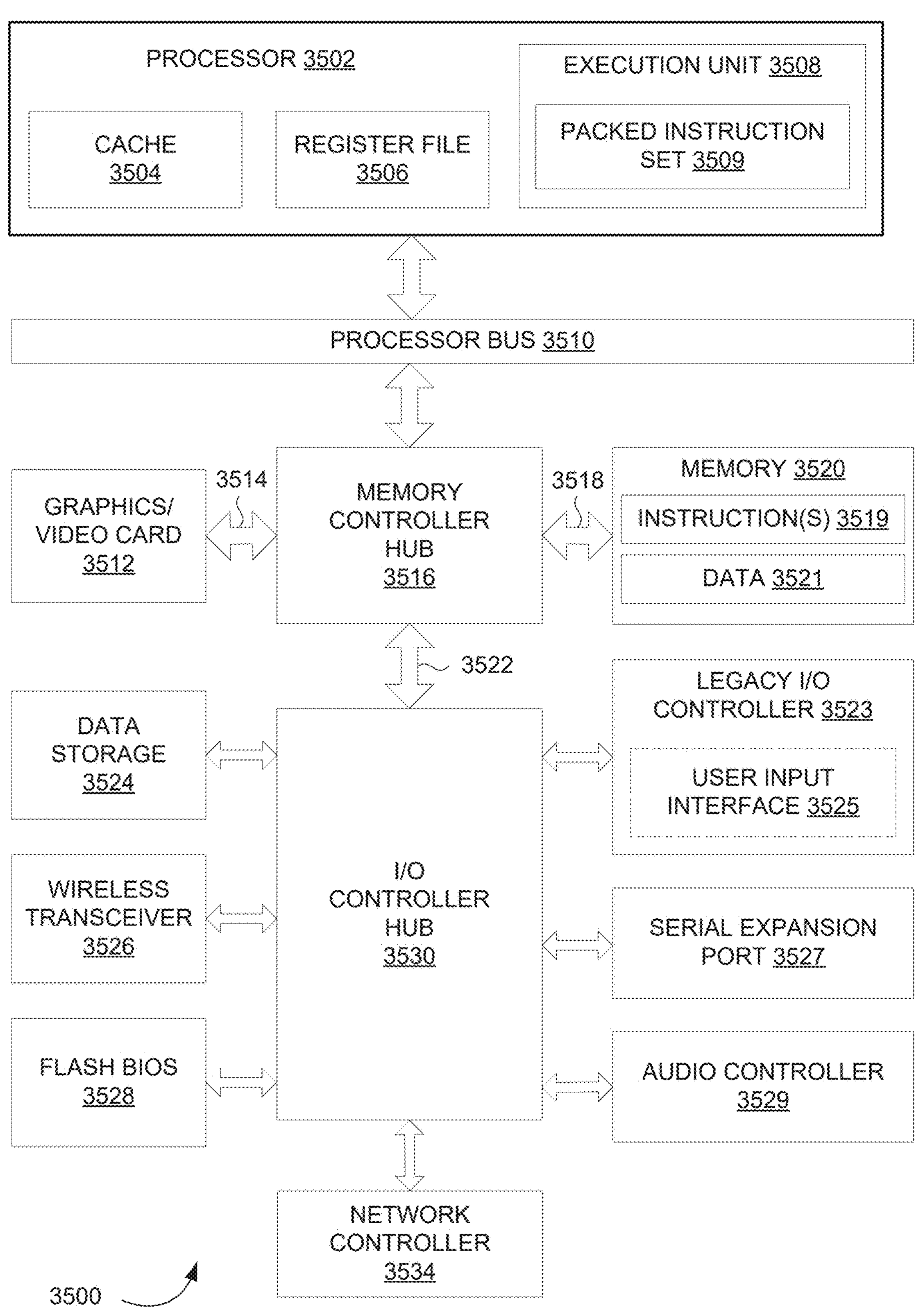
FIG. 35 illustrates a computer system, in accordance with at least one embodiment.

FIG. 35 illustrates a computer system 3500, in accordance with at least one embodiment. In at least one embodiment, computer system 3500 may be a system with interconnected devices and components, an SOC, or some combination. In at least on embodiment, computer system 3500 is formed with a processor 3502 that may include execution units to execute an instruction. In at least one embodiment, computer system 3500 may include, without limitation, a component, such as processor 3502 to employ execution units including logic to perform algorithms for processing data. In at least one embodiment, computer system 3500 may include processors, such as PENTIUM® Processor family, Xcon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3500 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 3500 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3500 may include, without limitation, processor 3502 that may include, without limitation, one or more execution units 3508 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 3500 is a single processor desktop or server system. In at least one embodiment, computer system 3500 may be a multiprocessor system. In at least one embodiment, processor 3502 may include, without limitation, a CISC microprocessor, a RISC microprocessor, a VLIW microprocessor, a processor implementing a combination of instruction sets, or any other processor device, such as a digital signal processor, for example. In at least one embodiment, processor 3502 may be coupled to a processor bus 3510 that may transmit data signals between processor 3502 and other components in computer system 3500.

In at least one embodiment, processor 3502 may include, without limitation, a Level 1 ("L1") internal cache memory ("cache") 3504. In at least one embodiment, processor 3502 may have a single internal cache or multiple levels of internal cache. In at least one embodiment, cache memory may reside external to processor 3502. In at least one embodiment, processor 3502 may also include a combination of both internal and external caches. In at least one embodiment, a register file 3506 may store different types of data in various registers including, without limitation, integer registers, floating point registers, status registers, and instruction pointer register.

In at least one embodiment, execution unit 3508, including, without limitation, logic to perform integer and floating point operations, also resides in processor 3502. Processor 3502 may also include a microcode ("ucode") read only memory ("ROM") that stores microcode for certain macro instructions. In at least one embodiment, execution unit 3508 may include logic to handle a packed instruction set 3509. In at least one embodiment, by including packed instruction set 3509 in an instruction set of a general-purpose processor 3502, along with associated circuitry to execute instructions, operations used by many multimedia applications may be performed using packed data in a general-purpose processor 3502. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3508 may also be used in microcontrollers, embedded processors, graphics devices, DSPs, and other types of logic circuits. In at least one embodiment, computer system 3500 may include, without limitation, a memory 3520. In at least one embodiment, memory 3520 may be implemented as a DRAM device, an SRAM device, flash memory device, or other memory device. Memory 3520 may store instruction(s) 3519 and/or data 3521 represented by data signals that may be executed by processor 3502.

In at least one embodiment, a system logic chip may be coupled to processor bus 3510 and memory 3520. In at least one embodiment, a system logic chip may include, without limitation, a memory controller hub ("MCH") 3516, and processor 3502 may communicate with MCH 3516 via processor bus 3510. In at least one embodiment, MCH 3516 may provide a high bandwidth memory path 3518 to memory 3520 for instruction and data storage and for storage of graphics commands, data and textures. In at least one embodiment, MCH 3516 may direct data signals between processor 3502, memory 3520, and other components in computer system 3500 and to bridge data signals between processor bus 3510, memory 3520, and a system I/O 3522. In at least one embodiment, system logic chip may provide a graphics port for coupling to a graphics controller. In at least one embodiment, MCH 3516 may be coupled to memory 3520 through high bandwidth memory path 3518 and graphics/video card 3512 may be coupled to MCH 3516 through an Accelerated Graphics Port ("AGP") interconnect 3514.

In at least one embodiment, computer system 3500 may use system I/O 3522 that is a proprietary hub interface bus to couple MCH 3516 to I/O controller hub ("ICH") 3530. In at least one embodiment, ICH 3530 may provide direct connections to some I/O devices via a local I/O bus. In at least one embodiment, local I/O bus may include, without limitation, a high-speed I/O bus for connecting peripherals to memory 3520, a chipset, and processor 3502. Examples may include, without limitation, an audio controller 3529, a firmware hub ("flash BIOS") 3528, a wireless transceiver 3526, a data storage 3524, a legacy I/O controller 3523 containing a user input interface 3525 and a keyboard interface, a serial expansion port 3527, such as a USB, and a network controller 3534. Data storage 3524 may comprise a hard disk drive, a floppy disk drive, a CD-ROM device, a flash memory device, or other mass storage device.

In at least one embodiment, FIG. 35 illustrates a system, which includes interconnected hardware devices or "chips." In at least one embodiment, FIG. 35 may illustrate an exemplary SoC. In at least one embodiment, devices illustrated in FIG. 35 may be interconnected with proprietary interconnects, standardized interconnects (e.g., PCIe), or some combination thereof. In at least one embodiment, one or more components of system 3500 are interconnected using compute express link ("CXL") interconnects.

In at least one embodiment, at least one component shown or described with respect to FIG. 35 is utilized to implement techniques and/or functions described in connection with FIGS. 1-13. In at least one embodiment, at least one component of FIG. 35 is used to cause scaling of one or more clocks of one or more cores, based at least in part, on a proximity of the one or more cores to each other. In at least one embodiment, at least one component of FIG. 35 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 36:
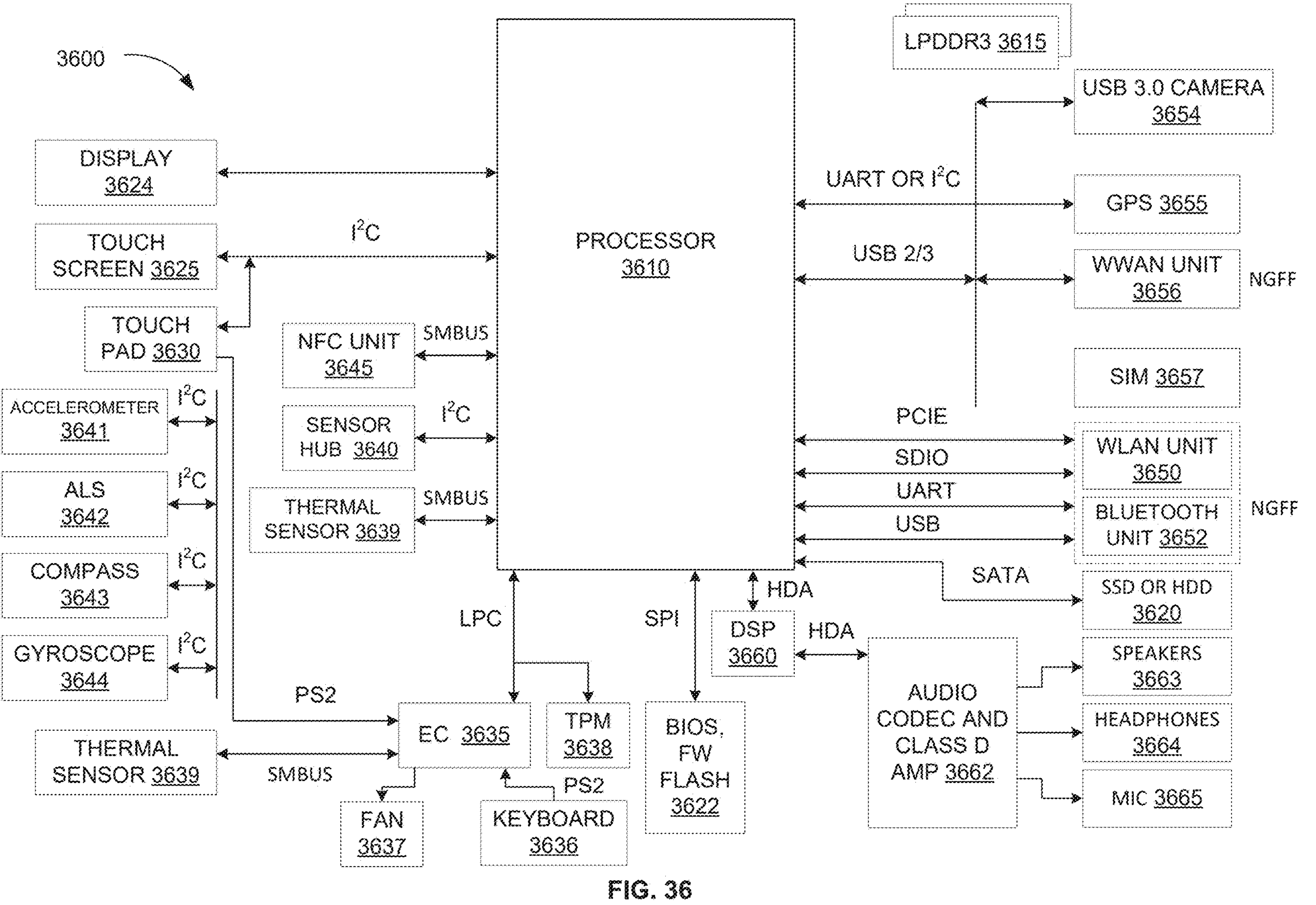
FIG. 36 illustrates a system, in accordance with at least one embodiment.

FIG. 36 illustrates a system 3600, in accordance with at least one embodiment. In at least one embodiment, system 3600 is an electronic device that utilizes a processor 3610. In at least one embodiment, system 3600 may be, for example and without limitation, a notebook, a tower server, a rack server, a blade server, a laptop, a desktop, a tablet, a mobile device, a phone, an embedded computer, or any other suitable electronic device.

In at least one embodiment, system 3600 may include, without limitation, processor 3610 communicatively coupled to any suitable number or kind of components, peripherals, modules, or devices. In at least one embodiment, processor 3610 is coupled using a bus or interface, such as an I2C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 36 illustrates a system which includes interconnected hardware devices or "chips." In at least one embodiment, FIG. 36 may illustrate an exemplary SoC. In at least one embodiment, devices illustrated in FIG. 36 may be interconnected with proprietary interconnects, standardized interconnects (e.g., PCIe) or some combination thereof. In at least one embodiment, one or more components of FIG. 36 are interconnected using CXL interconnects.

In at least one embodiment, FIG. 36 may include a display 3624, a touch screen 3625, a touch pad 3630, a Near Field Communications unit ("NFC") 3645, a sensor hub 3640, a thermal sensor 3646, an Express Chipset ("EC") 3635, a Trusted Platform Module ("TPM") 3638, BIOS/firmware/flash memory ("BIOS, FW Flash") 3622, a DSP 3660, a Solid State Disk ("SSD") or Hard Disk Drive ("HDD") 3620, a wireless local area network unit ("WLAN") 3650, a Bluetooth unit 3652, a Wireless Wide Area Network unit ("WWAN") 3656, a Global Positioning System ("GPS") 3655, a camera ("USB 3.0 camera") 3654 such as a USB 3.0 camera, or a Low Power Double Data Rate ("LPDDR") memory unit ("LPDDR3") 3615 implemented in, for example, LPDDR3 standard. These components may each be implemented in any suitable manner.

In at least one embodiment, other components may be communicatively coupled to processor 3610 through components discussed above. In at least one embodiment, an accelerometer 3641, an Ambient Light Sensor ("ALS") 3642, a compass 3643, and a gyroscope 3644 may be communicatively coupled to sensor hub 3640. In at least one embodiment, a thermal sensor 3639, a fan 3637, a keyboard 3646, and a touch pad 3630 may be communicatively coupled to EC 3635. In at least one embodiment, a speaker 3663, a headphones 3664, and a microphone ("mic") 3665 may be communicatively coupled to an audio unit ("audio codec and class d amp") 3664, which may in turn be communicatively coupled to DSP 3660. In at least one embodiment, audio unit 3664 may include, for example and without limitation, an audio coder/decoder ("codec") and a class D amplifier. In at least one embodiment, a SIM card ("SIM") 3657 may be communicatively coupled to WWAN unit 3656. In at least one embodiment, components such as WLAN unit 3650 and Bluetooth unit 3652, as well as WWAN unit 3656 may be implemented in a Next Generation Form Factor ("NGFF").

In at least one embodiment, at least one component shown or described with respect to FIG. 36 is utilized to implement techniques and/or functions described in connection with FIGS. 1-13. In at least one embodiment, at least one component of FIG. 36 is used to cause scaling of one or more clocks of one or more cores, based at least in part, on a proximity of the one or more cores to each other. In at least one embodiment, at least one component of FIG. 36 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 37:
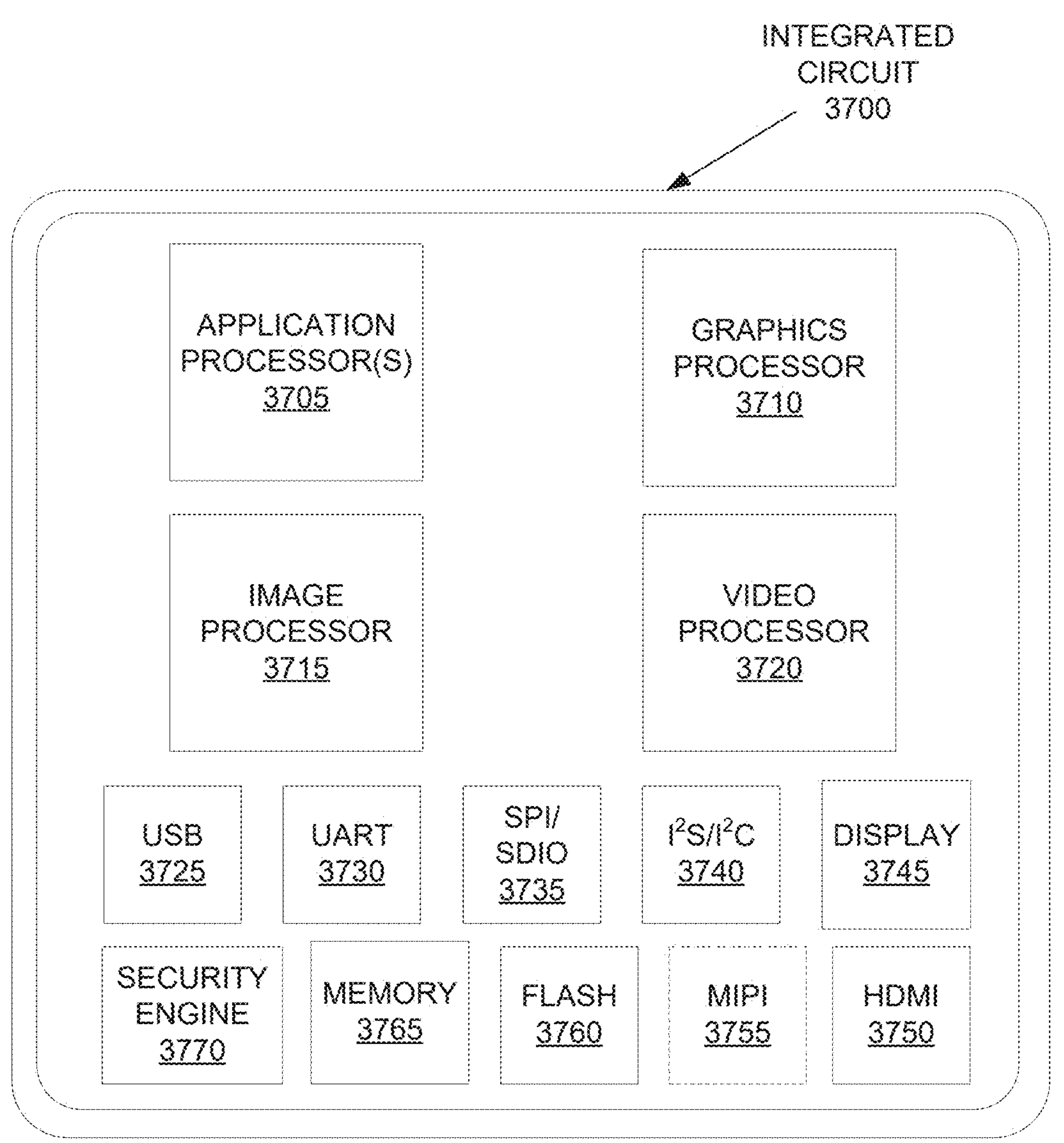
FIG. 37 illustrates an exemplary integrated circuit, in accordance with at least one embodiment.

FIG. 37 illustrates an exemplary integrated circuit 3700, in accordance with at least one embodiment. In at least one embodiment, exemplary integrated circuit 3700 is an SoC that may be fabricated using one or more IP cores. In at least one embodiment, integrated circuit 3700 includes one or more application processor(s) 3705 (e.g., CPUs), at least one graphics processor 3710, and may additionally include an image processor 3715 and/or a video processor 3720, any of which may be a modular IP core. In at least one embodiment, integrated circuit 3700 includes peripheral or bus logic including a USB controller 3725, a UART controller 3730, an SPI/SDIO controller 3735, and an $I^2S/I^2C$ controller 3740. In at least one embodiment, integrated circuit 3700 can include a display device 3745 coupled to one or more of a high-definition multimedia interface ("HDMI") controller 3750 and a mobile industry processor interface ("MIPI") display interface 3755. In at least one embodiment, storage may be provided by a flash memory subsystem 3760 including flash memory and a flash memory controller. In at least one embodiment, a memory interface may be provided via a memory controller 3765 for access to SDRAM or SRAM memory devices. In at least one embodiment, some integrated circuits additionally include an embedded security engine 3770.

In at least one embodiment, at least one component shown or described with respect to FIG. 37 is utilized to implement techniques and/or functions described in connection with FIGS. 1-13. In at least one embodiment, at least one component of FIG. 37 is used to cause scaling of one or more clocks of one or more cores, based at least in part, on a proximity of the one or more cores to each other. In at least one embodiment, at least one component of FIG. 37 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 38:
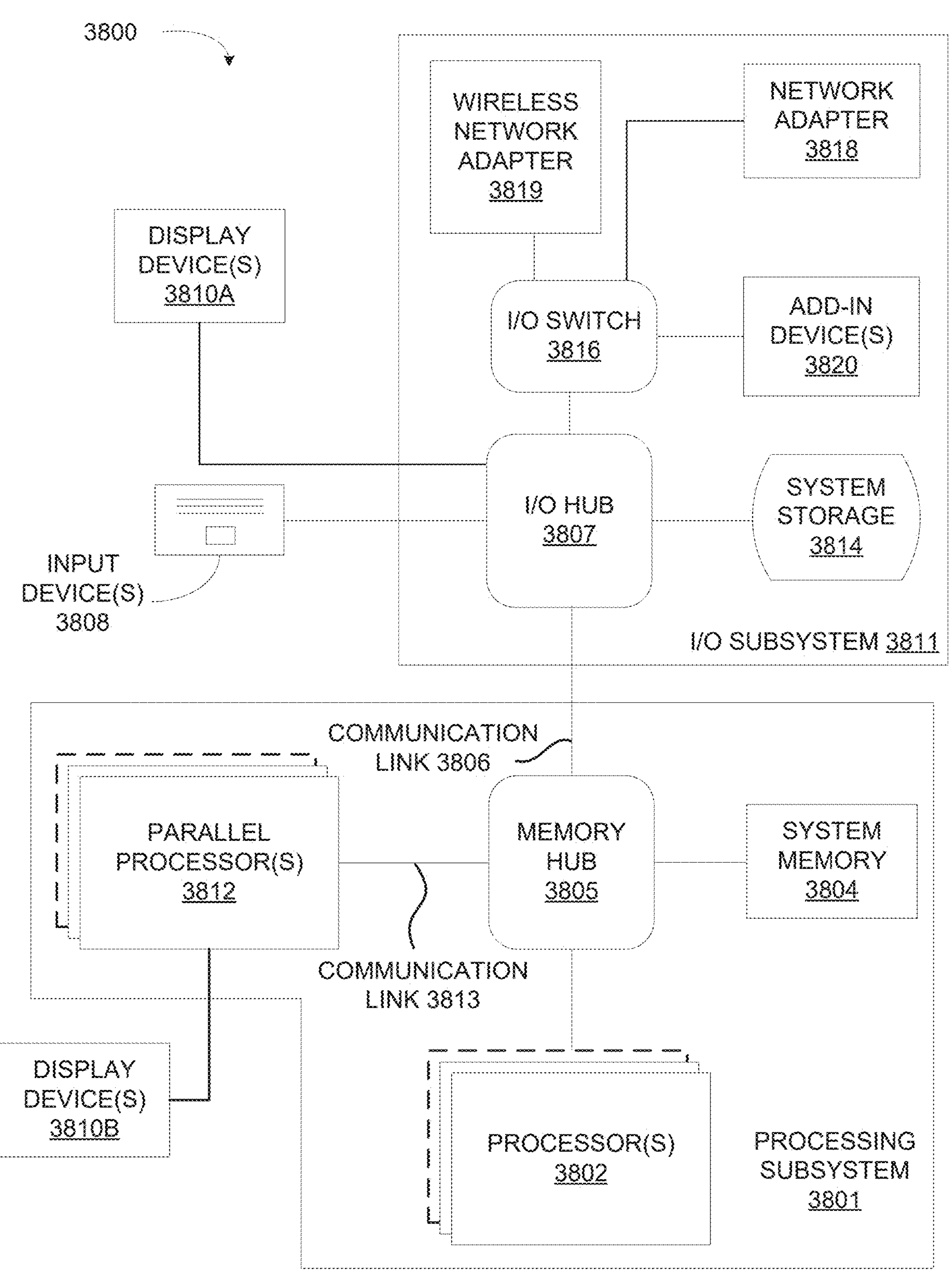
FIG. 38 illustrates a computing system, according to at least one embodiment.

FIG. 38 illustrates a computing system 3800, according to at least one embodiment; In at least one embodiment, computing system 3800 includes a processing subsystem 3801 having one or more processor(s) 3802 and a system memory 3804 communicating via an interconnection path that may include a memory hub 3805. In at least one embodiment, memory hub 3805 may be a separate component within a chipset component or may be integrated within one or more processor(s) 3802. In at least one embodiment, memory hub 3805 couples with an I/O subsystem 3811 via a communication link 3806. In at least one embodiment, I/O subsystem 3811 includes an I/O hub 3807 that can enable computing system 3800 to receive input from one or more input device(s) 3808. In at least one embodiment, I/O hub 3807 can enable a display controller, which may be included in one or more processor(s) 3802, to provide outputs to one or more display device(s) 3810A. In at least one embodiment, one or more display device(s) 3810A coupled with I/O hub 3807 can include a local, internal, or embedded display device.

In at least one embodiment, processing subsystem 3801 includes one or more parallel processor(s) 3812 coupled to memory hub 3805 via a bus or other communication link 3813. In at least one embodiment, communication link 3813 may be one of any number of standards based communication link technologies or protocols, such as, but not limited to PCIe, or may be a vendor specific communications interface or communications fabric. In at least one embodiment, one or more parallel processor(s) 3812 form a computationally focused parallel or vector processing system that can include a large number of processing cores and/or processing clusters, such as a many integrated core processor. In at least one embodiment, one or more parallel processor(s) 3812 form a graphics processing subsystem that can output pixels to one of one or more display device(s) 3810A coupled via I/O Hub 3807. In at least one embodiment, one or more parallel processor(s) 3812 can also include a display controller and display interface (not shown) to enable a direct connection to one or more display device(s) 3810B.

In at least one embodiment, a system storage unit 3814 can connect to I/O hub 3807 to provide a storage mechanism for computing system 3800. In at least one embodiment, an I/O switch 3816 can be used to provide an interface mechanism to enable connections between I/O hub 3807 and other components, such as a network adapter 3818 and/or wireless network adapter 3819 that may be integrated into a platform, and various other devices that can be added via one or more add-in device(s) 3820. In at least one embodiment, network adapter 3818 can be an Ethernet adapter or another wired network adapter. In at least one embodiment, wireless network adapter 3819 can include one or more of a Wi-Fi, Bluetooth, NFC, or other network device that includes one or more wireless radios.

In at least one embodiment, computing system 3800 can include other components not explicitly shown, including USB or other port connections, optical storage drives, video capture devices, and/or variations thereof, that may also be connected to I/O hub 3807. In at least one embodiment, communication paths interconnecting various components in FIG. 38 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3812 incorporate circuitry optimized for graphics and video processing, including, for example, video output circuitry, and constitutes a graphics processing unit ("GPU"). In at least one embodiment, one or more parallel processor(s) 3812 incorporate circuitry optimized for general purpose processing. In at least embodiment, components of computing system 3800 may be integrated with one or more other system elements on a single integrated circuit. For example, in at least one embodiment, one or more parallel processor(s) 3812, memory hub 3805, processor(s) 3802, and I/O hub 3807 can be integrated into a SoC integrated circuit. In at least one embodiment, components of computing system 3800 can be integrated into a single package to form a system in package ("SIP") configuration. In at least one embodiment, at least a portion of components of computing system 3800 can be integrated into a multi-chip module ("MCM"), which can be interconnected with other multi-chip modules into a modular computing system. In at least one embodiment, I/O subsystem 3811 and display devices 3810B are omitted from computing system 3800.

In at least one embodiment, at least one component shown or described with respect to FIG. 38 is utilized to implement techniques and/or functions described in connection with FIGS. 1-13. In at least one embodiment, at least one component of FIG. 38 is used to cause scaling of one or more clocks of one or more cores, based at least in part, on a proximity of the one or more cores to each other. In at least one embodiment, at least one component of FIG. 38 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Processing Systems

The following figures set forth, without limitation, exemplary processing systems that can be used to implement at least one embodiment.

Figure 39:
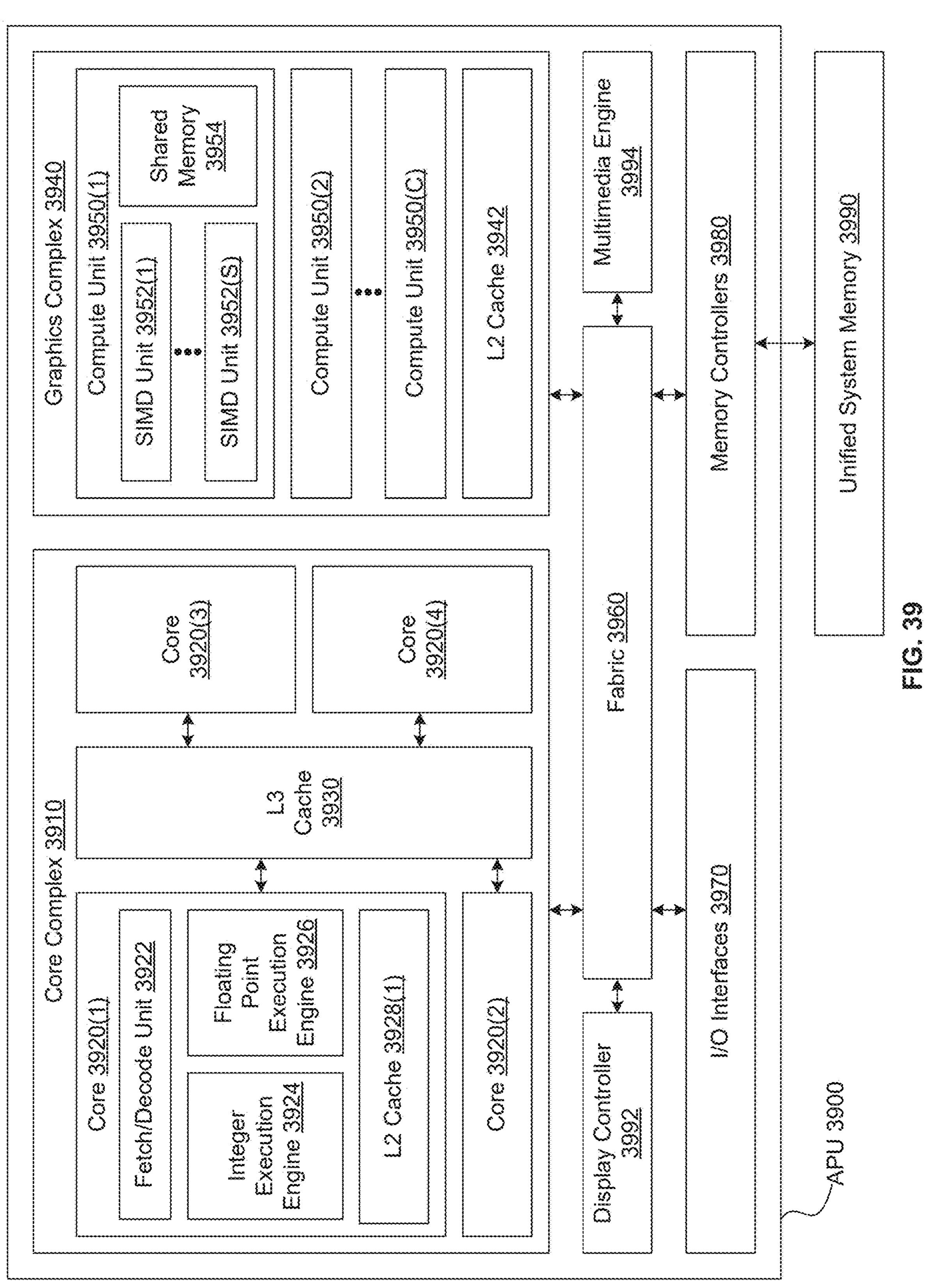
FIG. 39 illustrates an APU, in accordance with at least one embodiment.

FIG. 39 illustrates an accelerated processing unit ("APU") 3900, in accordance with at least one embodiment. In at least one embodiment, APU 3900 is developed by AMD Corporation of Santa Clara, CA. In at least one embodiment, APU 3900 can be configured to execute an application program, such as a CUDA program. In at least one embodiment, APU 3900 includes, without limitation, a core complex 3910, a graphics complex 3940, fabric 3960, I/O interfaces 3970, memory controllers 3980, a display controller 3992, and a multimedia engine 3994. In at least one embodiment, APU 3900 may include, without limitation, any number of core complexes 3910, any number of graphics complexes 3940, any number of display controllers 3992, and any number of multimedia engines 3994 in any combination. For explanatory purposes, multiple instances of like objects are denoted herein with reference numbers identifying an object and parenthetical numbers identifying an instance where needed.

In at least one embodiment, core complex 3910 is a CPU, graphics complex 3940 is a GPU, and APU 3900 is a processing unit that integrates, without limitation, 3910 and 3940 onto a single chip. In at least one embodiment, some tasks may be assigned to core complex 3910 and other tasks may be assigned to graphics complex 3940. In at least one embodiment, core complex 3910 is configured to execute main control software associated with APU 3900, such as an operating system. In at least one embodiment, core complex 3910 is a master processor of APU 3900, controlling and coordinating operations of other processors. In at least one embodiment, core complex 3910 issues commands that control an operation of graphics complex 3940. In at least one embodiment, core complex 3910 can be configured to execute host executable code derived from CUDA source code, and graphics complex 3940 can be configured to execute device executable code derived from CUDA source code.

In at least one embodiment, core complex 3910 includes, without limitation, cores 3920(1)-3920(4) and an L3 cache 3930. In at least one embodiment, core complex 3910 may include, without limitation, any number of cores 3920 and any number and type of caches in any combination. In at least one embodiment, cores 3920 are configured to execute instructions of a particular instruction set architecture ("ISA"). In at least one embodiment, each core 3920 is a CPU core.

In at least one embodiment, each core 3920 includes, without limitation, a fetch/decode unit 3922, an integer execution engine 3924, a floating point execution engine 3926, and an L2 cache 3928. In at least one embodiment, fetch/decode unit 3922 fetches instructions, decodes such instructions, generates micro-operations, and dispatches separate micro-instructions to integer execution engine 3924 and floating point execution engine 3926. In at least one embodiment, fetch/decode unit 3922 can concurrently dispatch one micro-instruction to integer execution engine 3924 and another micro-instruction to floating point execution engine 3926. In at least one embodiment, integer execution engine 3924 executes, without limitation, integer and memory operations. In at least one embodiment, floating point engine 3926 executes, without limitation, floating point and vector operations. In at least one embodiment, fetch-decode unit 3922 dispatches micro-instructions to a single execution engine that replaces both integer execution engine 3924 and floating point execution engine 3926.

In at least one embodiment, each core 3920(*i*), where i is an integer representing a particular instance of core 3920, may access L2 cache 3928(*i*) included in core 3920(*i*). In at least one embodiment, each core 3920 included in core complex 3910(*j*), where j is an integer representing a particular instance of core complex 3910, is connected to other cores 3920 included in core complex 3910(*j*) via L3 cache 3930(*j*) included in core complex 3910(*j*). In at least one embodiment, cores 3920 included in core complex 3910(*j*), where j is an integer representing a particular instance of core complex 3910, can access all of L3 cache 3930(*j*) included in core complex 3910(*j*). In at least one embodiment, L3 cache 3930 may include, without limitation, any number of slices.

In at least one embodiment, graphics complex 3940 can be configured to perform compute operations in a highly-parallel fashion. In at least one embodiment, graphics complex 3940 is configured to execute graphics pipeline operations such as draw commands, pixel operations, geometric computations, and other operations associated with rendering an image to a display. In at least one embodiment, graphics complex 3940 is configured to execute operations unrelated to graphics. In at least one embodiment, graphics complex 3940 is configured to execute both operations related to graphics and operations unrelated to graphics.

In at least one embodiment, graphics complex 3940 includes, without limitation, any number of compute units 3950 and an L2 cache 3942. In at least one embodiment, compute units 3950 share L2 cache 3942. In at least one embodiment, L2 cache 3942 is partitioned. In at least one embodiment, graphics complex 3940 includes, without limitation, any number of compute units 3950 and any number (including zero) and type of caches. In at least one embodiment, graphics complex 3940 includes, without limitation, any amount of dedicated graphics hardware.

In at least one embodiment, each compute unit 3950 includes, without limitation, any number of SIMD units 3952 and a shared memory 3954. In at least one embodiment, each SIMD unit 3952 implements a SIMD architecture and is configured to perform operations in parallel. In at least one embodiment, each compute unit 3950 may execute any number of thread blocks, but each thread block executes on a single compute unit 3950. In at least one embodiment, a thread block includes, without limitation, any number of threads of execution. In at least one embodiment, a workgroup is a thread block. In at least one embodiment, each SIMD unit 3952 executes a different warp. In at least one embodiment, a warp is a group of threads (e.g., 16 threads), where each thread in a warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3954.

In at least one embodiment, fabric 3960 is a system interconnect that facilitates data and control transmissions across core complex 3910, graphics complex 3940, I/O interfaces 3970, memory controllers 3980, display controller 3992, and multimedia engine 3994. In at least one embodiment, APU 3900 may include, without limitation, any amount and type of system interconnect in addition to or instead of fabric 3960 that facilitates data and control transmissions across any number and type of directly or indirectly linked components that may be internal or external to APU 3900. In at least one embodiment, I/O interfaces 3970 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3970 In at least one embodiment, peripheral devices that are coupled to I/O interfaces 3970 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3994 includes, without limitation, any amount and type of circuitry that is related to multimedia, such as a video decoder, a video encoder, an image signal processor, etc. In at least one embodiment, memory controllers 3980 facilitate data transfers between APU 3900 and a unified system memory 3990. In at least one embodiment, core complex 3910 and graphics complex 3940 share unified system memory 3990.

In at least one embodiment, APU 3900 implements a memory subsystem that includes, without limitation, any amount and type of memory controllers 3980 and memory devices (e.g., shared memory 3954) that may be dedicated to one component or shared among multiple components. In at least one embodiment, APU 3900 implements a cache subsystem that includes, without limitation, one or more cache memories (e.g., L2 caches 4028, L3 cache 3930, and L2 cache 3942) that may each be private to or shared between any number of components (e.g., cores 3920, core complex 3910, SIMD units 3952, compute units 3950, and graphics complex 3940).

In at least one embodiment, at least one component shown or described with respect to FIG. 39 is utilized to implement techniques and/or functions described in connection with FIGS. 1-13. In at least one embodiment, at least one component of FIG. 39 is used to cause scaling of one or more clocks of one or more cores, based at least in part, on a proximity of the one or more cores to each other. In at least one embodiment, at least one component of FIG. 39 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 40:
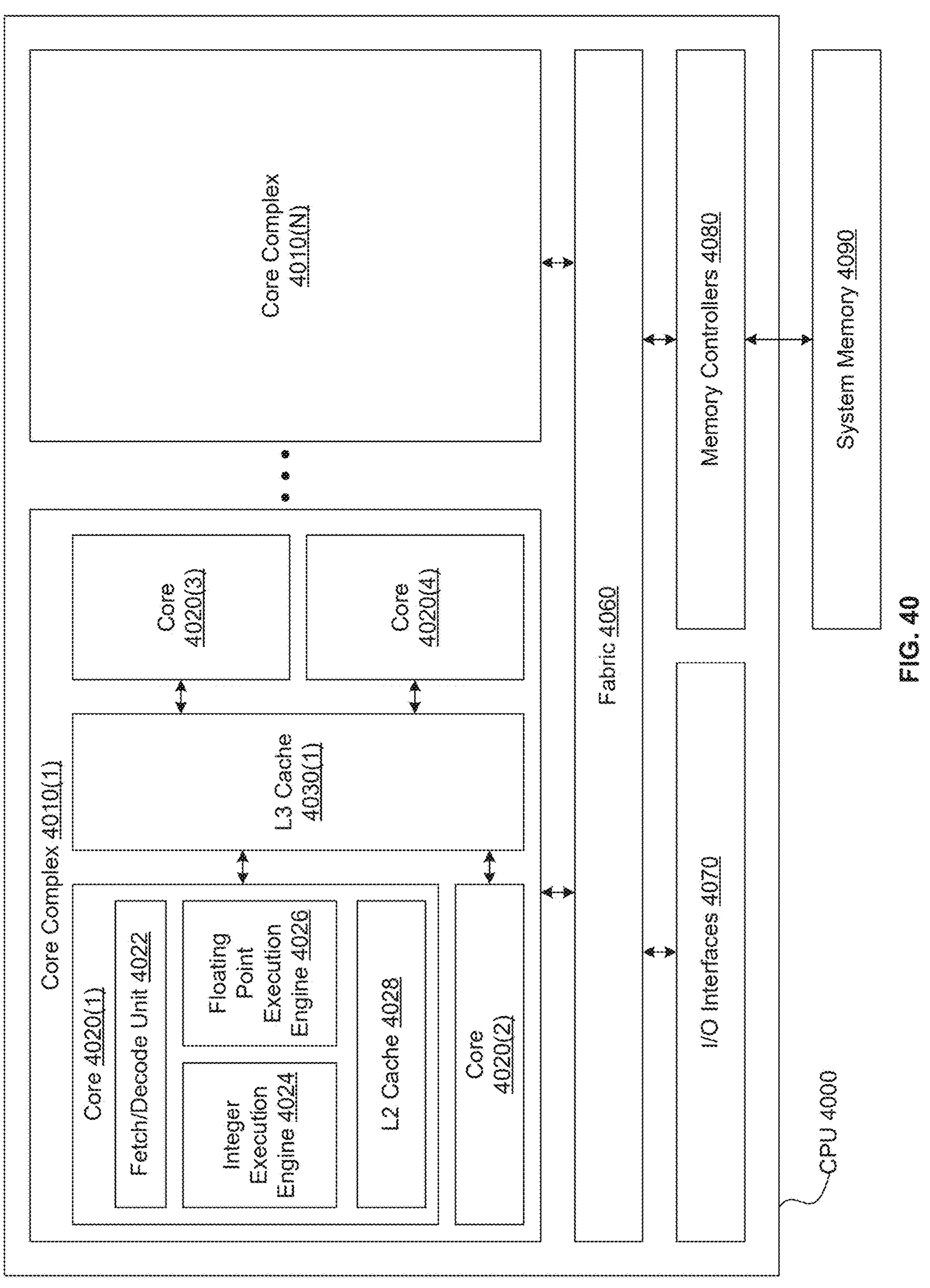
FIG. 40 illustrates a CPU, in accordance with at least one embodiment.

FIG. 40 illustrates a CPU 4000, in accordance with at least one embodiment. In at least one embodiment, CPU 4000 is developed by AMD Corporation of Santa Clara, CA. In at least one embodiment, CPU 4000 can be configured to execute an application program. In at least one embodiment, CPU 4000 is configured to execute main control software, such as an operating system. In at least one embodiment, CPU 4000 issues commands that control an operation of an external GPU (not shown). In at least one embodiment, CPU 4000 can be configured to execute host executable code derived from CUDA source code, and an external GPU can be configured to execute device executable code derived from such CUDA source code. In at least one embodiment, CPU 4000 includes, without limitation, any number of core complexes 4010, fabric 4060, I/O interfaces 4070, and memory controllers 4080.

In at least one embodiment, core complex 4010 includes, without limitation, cores 4020(1)-4020(4) and an L3 cache 4030. In at least one embodiment, core complex 4010 may include, without limitation, any number of cores 4020 and any number and type of caches in any combination. In at least one embodiment, cores 4020 are configured to execute instructions of a particular ISA. In at least one embodiment, each core 4020 is a CPU core.

In at least one embodiment, each core 4020 includes, without limitation, a fetch/decode unit 4022, an integer execution engine 4024, a floating point execution engine 4026, and an L2 cache 4028. In at least one embodiment, fetch/decode unit 4022 fetches instructions, decodes such instructions, generates micro-operations, and dispatches separate micro-instructions to integer execution engine 4024 and floating point execution engine 4026. In at least one embodiment, fetch/decode unit 4022 can concurrently dispatch one micro-instruction to integer execution engine 4024 and another micro-instruction to floating point execution engine 4026. In at least one embodiment, integer execution engine 4024 executes, without limitation, integer and memory operations. In at least one embodiment, floating point engine 4026 executes, without limitation, floating point and vector operations. In at least one embodiment, fetch-decode unit 4022 dispatches micro-instructions to a single execution engine that replaces both integer execution engine 4024 and floating point execution engine 4026.

In at least one embodiment, each core 4020(*i*), where i is an integer representing a particular instance of core 4020, may access L2 cache 4028(*i*) included in core 4020(*i*). In at least one embodiment, each core 4020 included in core complex 4010(*j*), where j is an integer representing a particular instance of core complex 4010, is connected to other cores 4020 in core complex 4010(*j*) via L3 cache 4030(*j*) included in core complex 4010(*j*). In at least one embodiment, cores 4020 included in core complex 4010(*j*), where j is an integer representing a particular instance of core complex 4010, can access all of L3 cache 4030(*j*) included in core complex 4010(*j*). In at least one embodiment, L3 cache 4030 may include, without limitation, any number of slices.

In at least one embodiment, fabric 4060 is a system interconnect that facilitates data and control transmissions across core complexes 4010(1)-4010(N) (where N is an integer greater than zero), I/O interfaces 4070, and memory controllers 4080. In at least one embodiment, CPU 4000 may include, without limitation, any amount and type of system interconnect in addition to or instead of fabric 4060 that facilitates data and control transmissions across any number and type of directly or indirectly linked components that may be internal or external to CPU 4000. In at least one embodiment, I/O interfaces 4070 are representative of any number and type of I/O interfaces (e.g., PCI, PCI-X, PCIe, GBE, USB, etc.). In at least one embodiment, various types of peripheral devices are coupled to I/O interfaces 4070 In at least one embodiment, peripheral devices that are coupled to I/O interfaces 4070 may include, without limitation, displays, keyboards, mice, printers, scanners, joysticks or other types of game controllers, media recording devices, external storage devices, network interface cards, and so forth.

In at least one embodiment, memory controllers 4080 facilitate data transfers between CPU 4000 and a system memory 4090. In at least one embodiment, core complex 4010 and graphics complex 4040 share system memory 4090. In at least one embodiment, CPU 4000 implements a memory subsystem that includes, without limitation, any amount and type of memory controllers 4080 and memory devices that may be dedicated to one component or shared among multiple components. In at least one embodiment, CPU 4000 implements a cache subsystem that includes, without limitation, one or more cache memories (e.g., L2 caches 4028 and L3 caches 4030) that may each be private to or shared between any number of components (e.g., cores 4020 and core complexes 4010).

In at least one embodiment, at least one component shown or described with respect to FIG. 40 is utilized to implement techniques and/or functions described in connection with FIGS. 1-13. In at least one embodiment, at least one component of FIG. 40 is used to cause scaling of one or more clocks of one or more cores, based at least in part, on a proximity of the one or more cores to each other. In at least one embodiment, at least one component of FIG. 40 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 41:
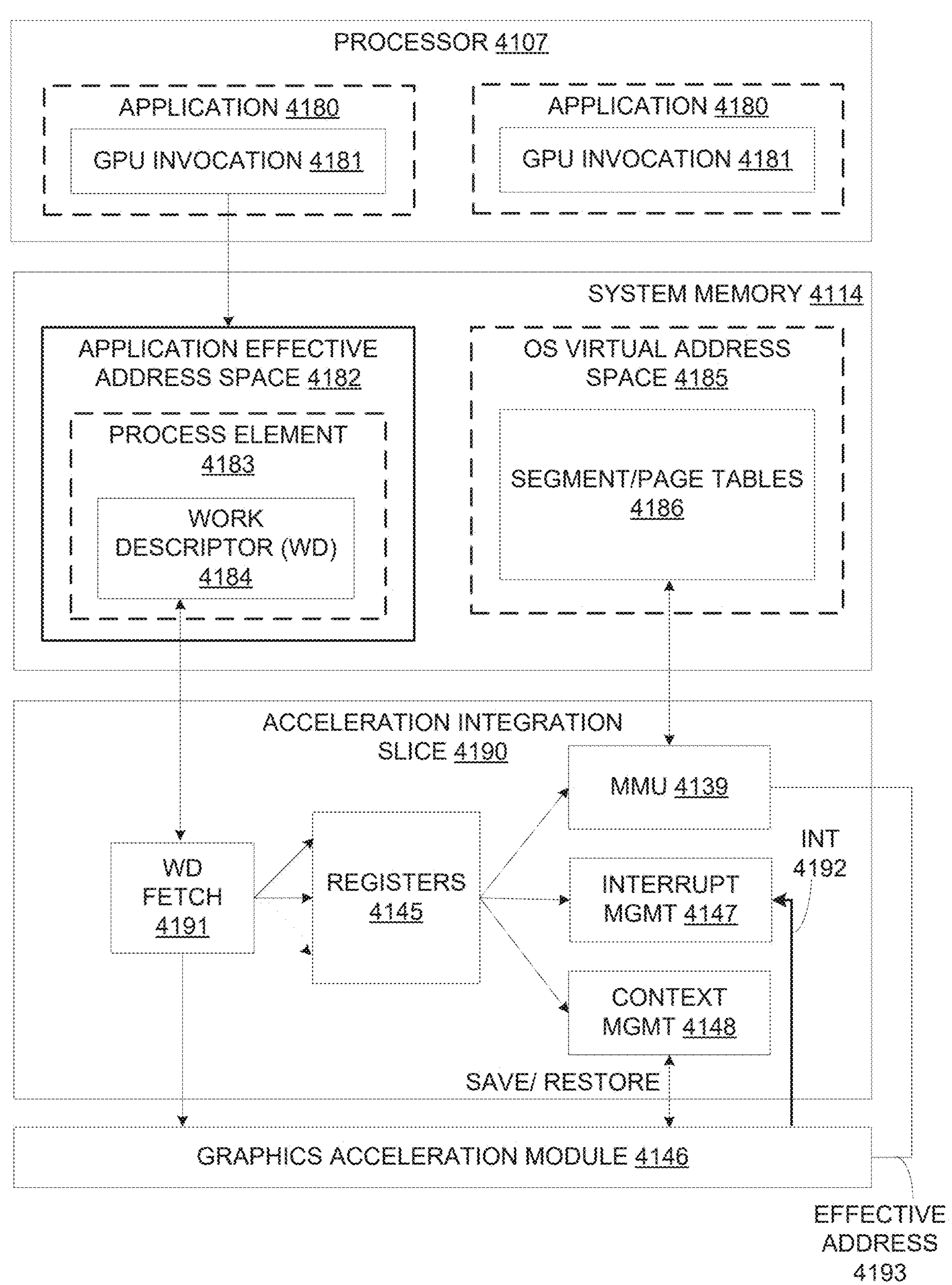
FIG. 41 illustrates an exemplary accelerator integration slice, in accordance with at least one embodiment.

FIG. 41 illustrates an exemplary accelerator integration slice 4190, in accordance with at least one embodiment. As used herein, a "slice" comprises a specified portion of processing resources of an accelerator integration circuit. In at least one embodiment, an accelerator integration circuit provides cache management, memory access, context management, and interrupt management services on behalf of multiple graphics processing engines included in a graphics acceleration module. Graphics processing engines may each comprise a separate GPU. Alternatively, graphics processing engines may comprise different types of graphics processing engines within a GPU such as graphics execution units, media processing engines (e.g., video encoders/decoders), samplers, and blit engines. In at least one embodiment, a graphics acceleration module may be a GPU with multiple graphics processing engines. In at least one embodiment, graphics processing engines may be individual GPUs integrated on a common package, line card, or chip.

An application effective address space 4182 within system memory 4114 stores process elements 4183. In one embodiment, process elements 4183 are stored in response to GPU invocations 4181 from applications 4180 executed on processor 4107. A process element 4183 contains process state for corresponding application 4180. A work descriptor ("WD") 4184 contained in process element 4183 can be a single job requested by an application or may contain a pointer to a queue of jobs. In at least one embodiment, WD 4184 is a pointer to a job request queue in application effective address space 4182.

Graphics acceleration module 4146 and/or individual graphics processing engines can be shared by all or a subset of processes in a system. In at least one embodiment, an infrastructure for setting up process state and sending WD 4184 to graphics acceleration module 4146 to start a job in a virtualized environment may be included.

In at least one embodiment, a dedicated-process programming model is implementation-specific. In this model, a single process owns graphics acceleration module 4146 or an individual graphics processing engine. Because graphics acceleration module 4146 is owned by a single process, a hypervisor initializes an accelerator integration circuit for an owning partition and an operating system initializes accelerator integration circuit for an owning process when graphics acceleration module 4146 is assigned.

In operation, a WD fetch unit 4191 in accelerator integration slice 4190 fetches next WD 4184 which includes an indication of work to be done by one or more graphics processing engines of graphics acceleration module 4146. Data from WD 4184 may be stored in registers 4145 and used by a memory management unit ("MMU") 4139, interrupt management circuit 4147 and/or context management circuit 4148 as illustrated. For example, one embodiment of MMU 4139 includes segment/page walk circuitry for accessing segment/page tables 4186 within OS virtual address space 4185. Interrupt management circuit 4147 may process interrupt events ("INT") 4192 received from graphics acceleration module 4146. When performing graphics operations, an effective address 4193 generated by a graphics processing engine is translated to a real address by MMU 4139.

In one embodiment, a same set of registers 4145 are duplicated for each graphics processing engine and/or graphics acceleration module 4146 and may be initialized by a hypervisor or operating system. Each of these duplicated registers may be included in accelerator integration slice 4190. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 4184 is specific to a particular graphics acceleration module 4146 and/or a particular graphics processing engine. It contains all information required by a graphics processing engine to do work or it can be a pointer to a memory location where an application has set up a command queue of work to be completed.

In at least one embodiment, at least one component shown or described with respect to FIG. 41 is utilized to implement techniques and/or functions described in connection with FIGS. 1-13. In at least one embodiment, at least one component of FIG. 41 is used to cause scaling of one or more clocks of one or more cores, based at least in part, on a proximity of the one or more cores to each other. In at least one embodiment, at least one component of FIG. 41 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 42A:
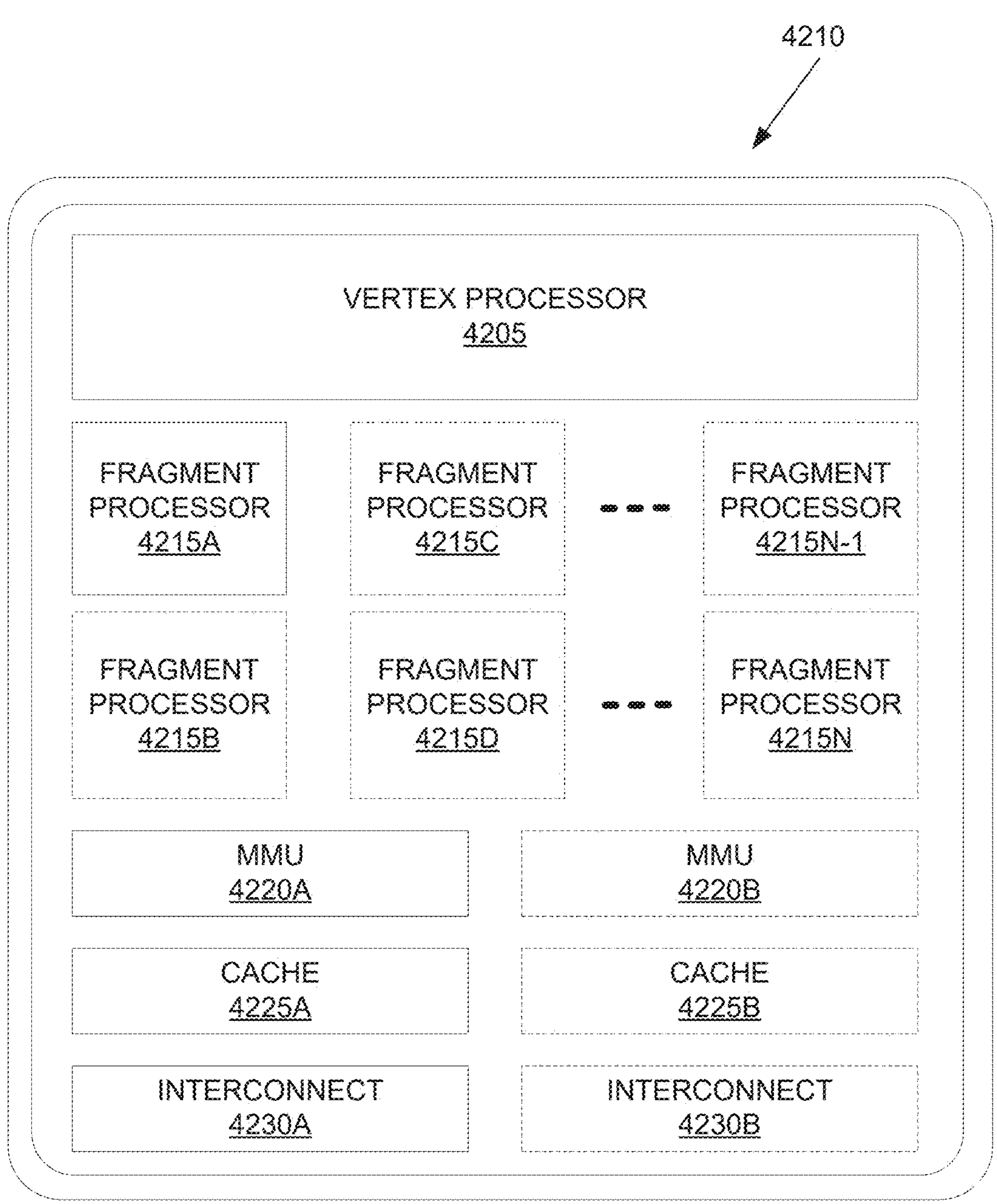
FIGS. 42A and 42B illustrate exemplary graphics processors, in accordance with at least one embodiment.
Figure 42B:
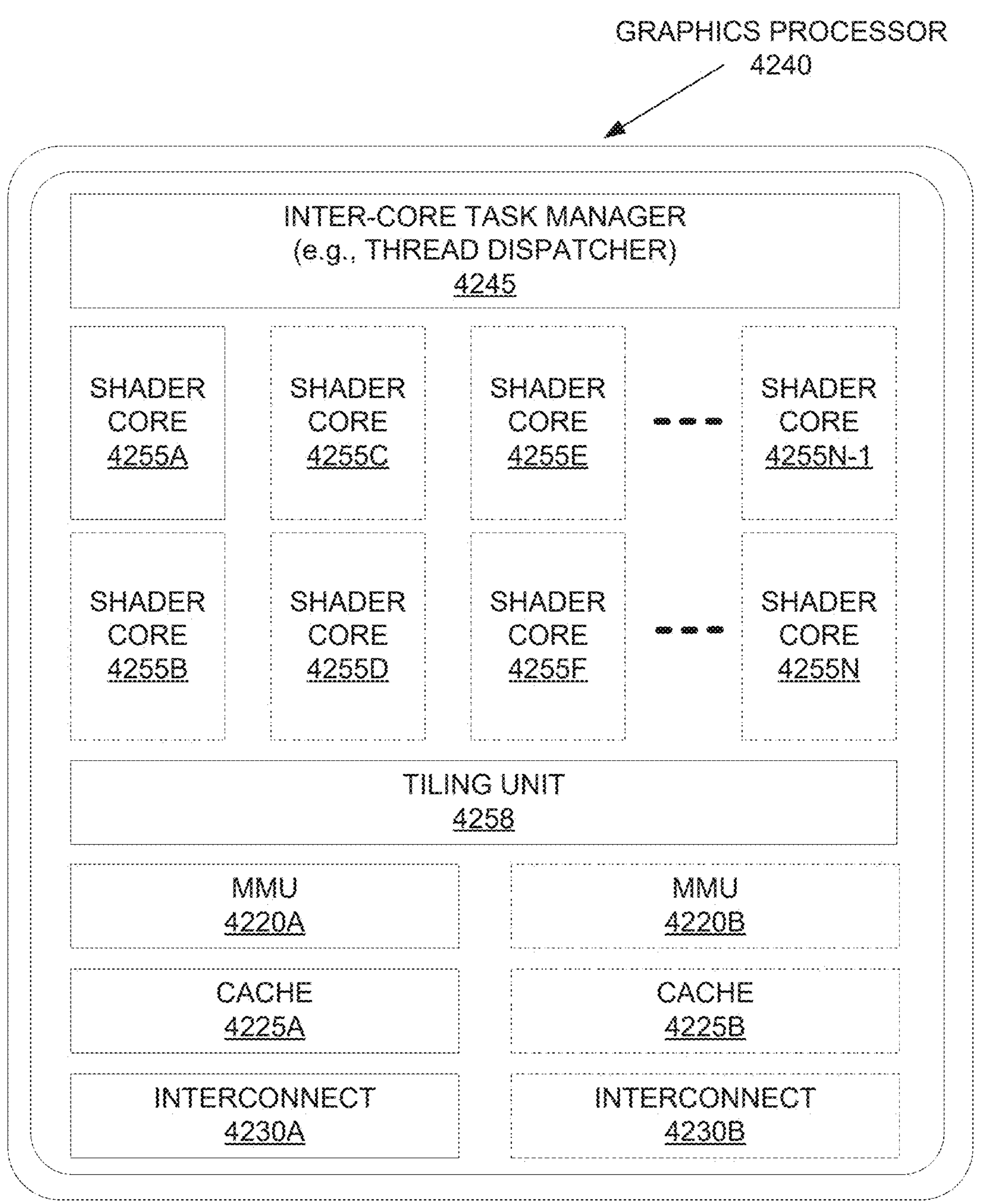

FIGS. 42A-42B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 42A illustrates an exemplary graphics processor 4210 of an SoC integrated circuit that may be fabricated using one or more IP cores, in accordance with at least one embodiment. FIG. 42B illustrates an additional exemplary graphics processor 4240 of an SoC integrated circuit that may be fabricated using one or more IP cores, in accordance with at least one embodiment. In at least one embodiment, graphics processor 4210 of FIG. 42A is a low power graphics processor core. In at least one embodiment, graphics processor 4240 of FIG. 42B is a higher performance graphics processor core. In at least one embodiment, each of graphics processors 4210, 4240 can be variants of graphics processor 1810 of FIG. 18.

In at least one embodiment, graphics processor 4210 includes a vertex processor 4205 and one or more fragment processor(s) 4215A-4215N (e.g., 4215A, 4215B, 4215C, 4215D, through 4215N-1, and 4215N). In at least one embodiment, graphics processor 4210 can execute different shader programs via separate logic, such that vertex processor 4205 is optimized to execute operations for vertex shader programs, while one or more fragment processor(s) 4215A-4215N execute fragment (e.g., pixel) shading operations for fragment or pixel shader programs. In at least one embodiment, vertex processor 4205 performs a vertex processing stage of a 3D graphics pipeline and generates primitives and vertex data. In at least one embodiment, fragment processor(s) 4215A-4215N use primitive and vertex data generated by vertex processor 4205 to produce a framebuffer that is displayed on a display device. In at least one embodiment, fragment processor(s) 4215A-4215N are optimized to execute fragment shader programs as provided for in an OpenGL API, which may be used to perform similar operations as a pixel shader program as provided for in a Direct 3D API.

In at least one embodiment, graphics processor 4210 additionally includes one or more MMU(s) 4220A-4220B, cache(s) 4225A-4225B, and circuit interconnect(s) 4230A-4230B. In at least one embodiment, one or more MMU(s) 4220A-4220B provide for virtual to physical address mapping for graphics processor 4210, including for vertex processor 4205 and/or fragment processor(s) 4215A-4215N, which may reference vertex or image/texture data stored in memory, in addition to vertex or image/texture data stored in one or more cache(s) 4225A-4225B. In at least one embodiment, one or more MMU(s) 4220A-4220B may be synchronized with other MMUs within a system, including one or more MMUs associated with one or more application processor(s) 1805, image processors 1815, and/or video processors 1820 of FIG. 18, such that each processor 1805-1820 can participate in a shared or unified virtual memory system. In at least one embodiment, one or more circuit interconnect(s) 4230A-4230B enable graphics processor 4210 to interface with other IP cores within an SoC, either via an internal bus of an SoC or via a direct connection.

In at least one embodiment, graphics processor 4240 includes one or more MMU(s) 4220A-4220B, caches 4225A-4225B, and circuit interconnects 4230A-4230B of graphics processor 4210 of FIG. 42A. In at least one embodiment, graphics processor 4240 includes one or more shader core(s) 4255A-4255N (e.g., 4255A, 4255B, 4255C, 4255D, 4255E, 4255F, through 4255N-1, and 4255N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 4240 includes an inter-core task manager 4245, which acts as a thread dispatcher to dispatch execution threads to one or more shader cores 4255A-4255N and a tiling unit 4258 to accelerate tiling operations for tile-based rendering, in which rendering operations for a scene are subdivided in image space, for example to exploit local spatial coherence within a scene or to optimize use of internal caches.

In at least one embodiment, at least one component shown or described with respect to FIG. 42 is utilized to implement techniques and/or functions described in connection with FIGS. 1-13. In at least one embodiment, at least one component of FIG. 42 is used to cause scaling of one or more clocks of one or more cores, based at least in part, on a proximity of the one or more cores to each other. In at least one embodiment, at least one component of FIG. 42 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 43A:
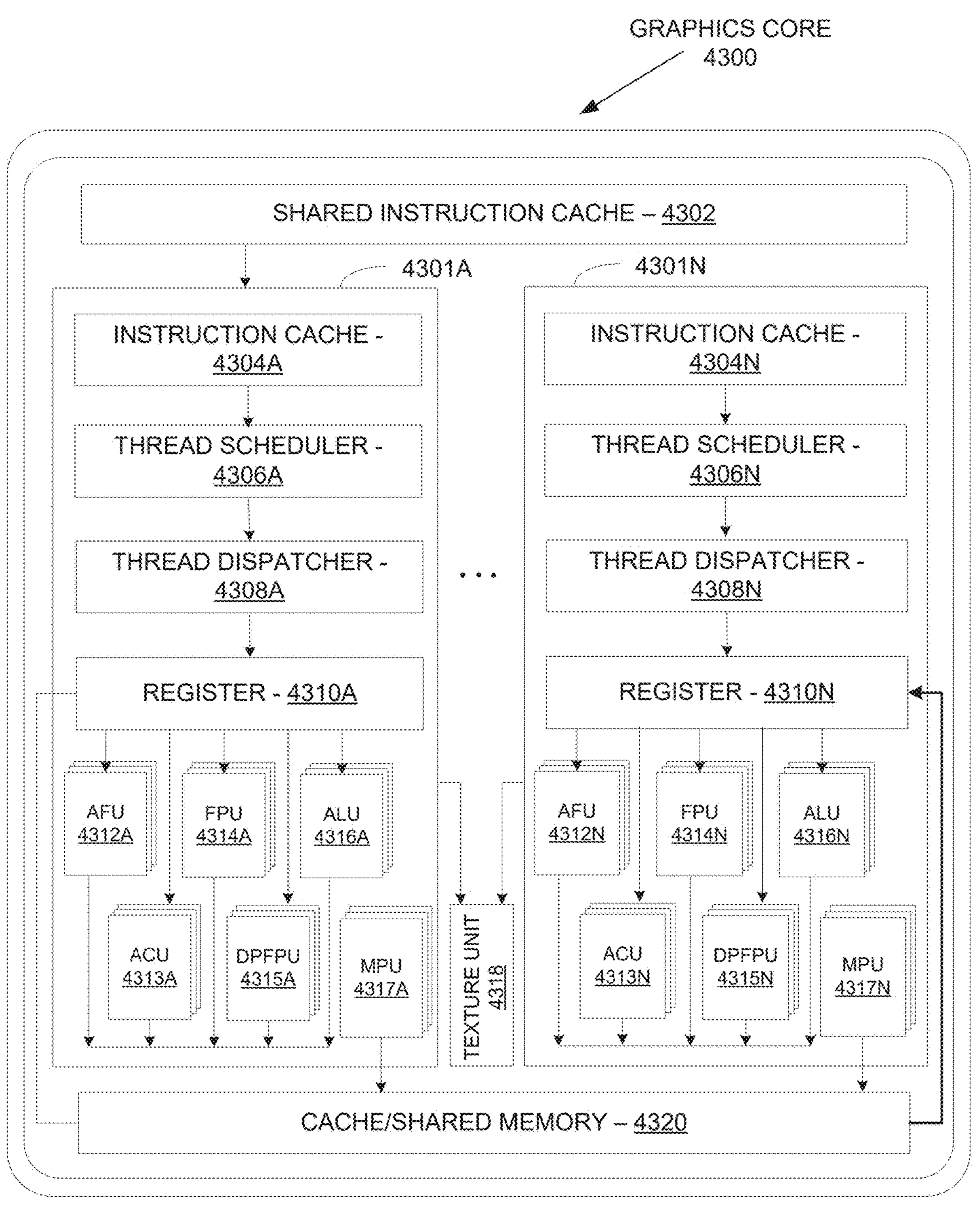
FIG. 43A illustrates a graphics core, in accordance with at least one embodiment.

FIG. 43A illustrates a graphics core 4300, in accordance with at least one embodiment. In at least one embodiment, graphics core 4300 may be included within graphics processor 3710 of FIG. 37. In at least one embodiment, graphics core 4300 may be a unified shader core 4255A-4255N as in FIG. 42B. In at least one embodiment, graphics core 4300 includes a shared instruction cache 4302, a texture unit 4318, and a cache/shared memory 4320 that are common to execution resources within graphics core 4300. In at least one embodiment, graphics core 4300 can include multiple slices 4301A-4301N or partition for each core, and a graphics processor can include multiple instances of graphics core 4300. Slices 4301A-4301N can include support logic including a local instruction cache 4304A-4304N, a thread scheduler 4306A-4306N, a thread dispatcher 4308A-4308N, and a set of registers 4310A-4310N. In at least one embodiment, slices 4301A-4301N can include a set of additional function units ("AFUs") 4312A-4312N, floating-point units ("FPUs") 4314A-4314N, integer arithmetic logic units ("ALUs") 4316-4316N, address computational units ("ACUs") 4313A-4313N, double-precision floating-point units ("DPFPUs") 4315A-4315N, and matrix processing units ("MPUs") 4317A-4317N.

In at least one embodiment, FPUs 4314A-4314N can perform single-precision (32-bit) and half-precision (16-bit) floating point operations, while DPFPUs 4315A-4315N perform double precision (64-bit) floating point operations. In at least one embodiment, ALUs 4316A-4316N can perform variable precision integer operations at 8-bit, 16-bit, and 32-bit precision, and can be configured for mixed precision operations. In at least one embodiment, MPUs 4317A-4317N can also be configured for mixed precision matrix operations, including half-precision floating point and 8-bit integer operations. In at least one embodiment, MPUs 4317-4317N can perform a variety of matrix operations to accelerate CUDA programs, including enabling support for accelerated general matrix to matrix multiplication ("GEMM"). In at least one embodiment, AFUs 4312A-4312N can perform additional logic operations not supported by floating-point or integer units, including trigonometric operations (e.g., Sine, Cosine, etc.).

Figure 43B:
FIG. 43B illustrates a GPGPU, in accordance with at least one embodiment.

FIG. 43B illustrates a general-purpose graphics processing unit ("GPGPU") 4330, in accordance with at least one embodiment. In at least one embodiment, GPGPU 4330 is highly-parallel and suitable for deployment on a multi-chip module. In at least one embodiment, GPGPU 4330 can be configured to enable highly-parallel compute operations to be performed by an array of GPUs. In at least one embodiment, GPGPU 4330 can be linked directly to other instances of GPGPU 4330 to create a multi-GPU cluster to improve execution time for CUDA programs. In at least one embodiment, GPGPU 4330 includes a host interface 4332 to enable a connection with a host processor. In at least one embodiment, host interface 4332 is a PCIe interface. In at least one embodiment, host interface 4332 can be a vendor specific communications interface or communications fabric. In at least one embodiment, GPGPU 4330 receives commands from a host processor and uses a global scheduler 4334 to distribute execution threads associated with those commands to a set of compute clusters 4336A-4336H. In at least one embodiment, compute clusters 4336A-4336H share a cache memory 4338. In at least one embodiment, cache memory 4338 can serve as a higher-level cache for cache memories within compute clusters 4336A-4336H.

In at least one embodiment, GPGPU 4330 includes memory 4344A-4344B coupled with compute clusters 4336A-4336H via a set of memory controllers 4342A-4342B. In at least one embodiment, memory 4344A-4344B can include various types of memory devices including DRAM or graphics random access memory, such as synchronous graphics random access memory ("SGRAM"), including graphics double data rate ("GDDR") memory.

In at least one embodiment, compute clusters 4336A-4336H each include a set of graphics cores, such as graphics core 4300 of FIG. 43A, which can include multiple types of integer and floating point logic units that can perform computational operations at a range of precisions including suited for computations associated with CUDA programs. For example, in at least one embodiment, at least a subset of floating point units in each of compute clusters 4336A-4336H can be configured to perform 16-bit or 32-bit floating point operations, while a different subset of floating point units can be configured to perform 64-bit floating point operations.

In at least one embodiment, multiple instances of GPGPU 4330 can be configured to operate as a compute cluster. In at least one embodiment, compute clusters 4336A-4336H may implement any technically feasible communication techniques for synchronization and data exchange. In at least one embodiment, multiple instances of GPGPU 4330 communicate over host interface 4332. In at least one embodiment, GPGPU 4330 includes an I/O hub 4339 that couples GPGPU 4330 with a GPU link 4340 that enables a direct connection to other instances of GPGPU 4330. In at least one embodiment, GPU link 4340 is coupled to a dedicated GPU-to-GPU bridge that enables communication and synchronization between multiple instances of GPGPU 4330. In at least one embodiment GPU link 4340 couples with a high speed interconnect to transmit and receive data to other GPGPUs 4330 or parallel processors. In at least one embodiment, multiple instances of GPGPU 4330 are located in separate data processing systems and communicate via a network device that is accessible via host interface 4332. In at least one embodiment GPU link 4340 can be configured to enable a connection to a host processor in addition to or as an alternative to host interface 4332. In at least one embodiment, GPGPU 4330 can be configured to execute a CUDA program.

In at least one embodiment, at least one component shown or described with respect to FIG. 43 is utilized to implement techniques and/or functions described in connection with FIGS. 1-13. In at least one embodiment, at least one component of FIG. 43 is used to cause scaling of one or more clocks of one or more cores, based at least in part, on a proximity of the one or more cores to each other. In at least one embodiment, at least one component of FIG. 43 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 44A:
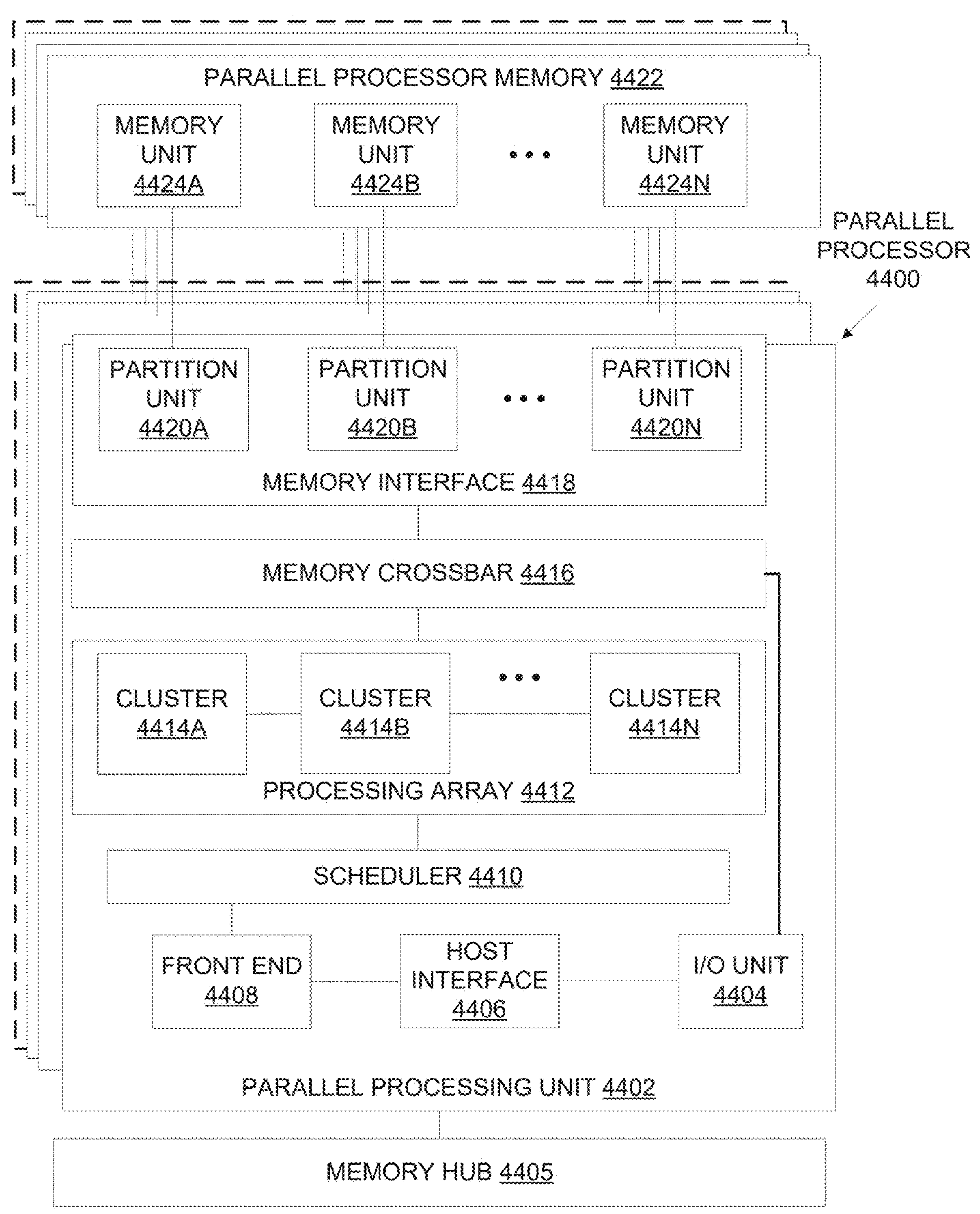
FIG. 44A illustrates a parallel processor, in accordance with at least one embodiment.

FIG. 44A illustrates a parallel processor 4400, in accordance with at least one embodiment. In at least one embodiment, various components of parallel processor 4400 may be implemented using one or more integrated circuit devices, such as programmable processors, application specific integrated circuits ("ASICs"), or FPGAs.

In at least one embodiment, parallel processor 4400 includes a parallel processing unit 4402. In at least one embodiment, parallel processing unit 4402 includes an I/O unit 4404 that enables communication with other devices, including other instances of parallel processing unit 4402. In at least one embodiment, I/O unit 4404 may be directly connected to other devices. In at least one embodiment, I/O unit 4404 connects with other devices via use of a hub or switch interface, such as memory hub 1905. In at least one embodiment, connections between memory hub 1905 and I/O unit 4404 form a communication link. In at least one embodiment, I/O unit 4404 connects with a host interface 4406 and a memory crossbar 4416, where host interface 4406 receives commands directed to performing processing operations and memory crossbar 4416 receives commands directed to performing memory operations.

In at least one embodiment, when host interface 4406 receives a command buffer via I/O unit 4404, host interface 4406 can direct work operations to perform those commands to a front end 4408. In at least one embodiment, front end 4408 couples with a scheduler 4410, which is configured to distribute commands or other work items to a processing array 4412. In at least one embodiment, scheduler 4410 ensures that processing array 4412 is properly configured and in a valid state before tasks are distributed to processing array 4412. In at least one embodiment, scheduler 4410 is implemented via firmware logic executing on a microcontroller. In at least one embodiment, microcontroller implemented scheduler 4410 is configurable to perform complex scheduling and work distribution operations at coarse and fine granularity, enabling rapid preemption and context switching of threads executing on processing array 4412. In at least one embodiment, host software can prove workloads for scheduling on processing array 4412 via one of multiple graphics processing doorbells. In at least one embodiment, workloads can then be automatically distributed across processing array 4412 by scheduler 4410 logic within a microcontroller including scheduler 4410.

In at least one embodiment, processing array 4412 can include up to "N" clusters (e.g., cluster 4414A, cluster 4414B, through cluster 4414N). In at least one embodiment, each cluster 4414A-4414N of processing array 4412 can execute a large number of concurrent threads. In at least one embodiment, scheduler 4410 can allocate work to clusters 4414A-4414N of processing array 4412 using various scheduling and/or work distribution algorithms, which may vary depending on a workload arising for each type of program or computation. In at least one embodiment, scheduling can be handled dynamically by scheduler 4410, or can be assisted in part by compiler logic during compilation of program logic configured for execution by processing array 4412. In at least one embodiment, different clusters 4414A-4414N of processing array 4412 can be allocated for processing different types of programs or for performing different types of computations.

In at least one embodiment, processing array 4412 can be configured to perform various types of parallel processing operations. In at least one embodiment, processing array 4412 is configured to perform general-purpose parallel compute operations. For example, in at least one embodiment, processing array 4412 can include logic to execute processing tasks including filtering of video and/or audio data, performing modeling operations, including physics operations, and performing data transformations.

In at least one embodiment, processing array 4412 is configured to perform parallel graphics processing operations. In at least one embodiment, processing array 4412 can include additional logic to support execution of such graphics processing operations, including, but not limited to texture sampling logic to perform texture operations, as well as tessellation logic and other vertex processing logic. In at least one embodiment, processing array 4412 can be configured to execute graphics processing related shader programs such as, but not limited to vertex shaders, tessellation shaders, geometry shaders, and pixel shaders. In at least one embodiment, parallel processing unit 4402 can transfer data from system memory via I/O unit 4404 for processing. In at least one embodiment, during processing, transferred data can be stored to on-chip memory (e.g., a parallel processor memory 4422) during processing, then written back to system memory.

In at least one embodiment, when parallel processing unit 4402 is used to perform graphics processing, scheduler 4410 can be configured to divide a processing workload into approximately equal sized tasks, to better enable distribution of graphics processing operations to multiple clusters 4414A-4414N of processing array 4412. In at least one embodiment, portions of processing array 4412 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4414A-4414N may be stored in buffers to allow intermediate data to be transmitted between clusters 4414A-4414N for further processing.

In at least one embodiment, processing array 4412 can receive processing tasks to be executed via scheduler 4410, which receives commands defining processing tasks from front end 4408. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4410 may be configured to fetch indices corresponding to tasks or may receive indices from front end 4408. In at least one embodiment, front end 4408 can be configured to ensure processing array 4412 is configured to a valid state before a workload specified by incoming command buffers (e.g., batch-buffers, push buffers, etc.) is initiated.

In at least one embodiment, each of one or more instances of parallel processing unit 4402 can couple with parallel processor memory 4422. In at least one embodiment, parallel processor memory 4422 can be accessed via memory crossbar 4416, which can receive memory requests from processing array 4412 as well as I/O unit 4404. In at least one embodiment, memory crossbar 4416 can access parallel processor memory 4422 via a memory interface 4418. In at least one embodiment, memory interface 4418 can include multiple partition units (e.g., a partition unit 4420A, partition unit 4420B, through partition unit 4420N) that can each couple to a portion (e.g., memory unit) of parallel processor memory 4422. In at least one embodiment, a number of partition units 4420A-4420N is configured to be equal to a number of memory units, such that a first partition unit 4420A has a corresponding first memory unit 4424A, a second partition unit 4420B has a corresponding memory unit 4424B, and an Nth partition unit 4420N has a corresponding Nth memory unit 4424N. In at least one embodiment, a number of partition units 4420A-4420N may not be equal to a number of memory devices.

In at least one embodiment, memory units 4424A-4424N can include various types of memory devices, including DRAM or graphics random access memory, such as SGRAM, including GDDR memory. In at least one embodiment, memory units 4424A-4424N may also include 3D stacked memory, including but not limited to high bandwidth memory ("HBM"). In at least one embodiment, render targets, such as frame buffers or texture maps may be stored across memory units 4424A-4424N, allowing partition units 4420A-4420N to write portions of each render target in parallel to efficiently use available bandwidth of parallel processor memory 4422. In at least one embodiment, a local instance of parallel processor memory 4422 may be excluded in favor of a unified memory design that utilizes system memory in conjunction with local cache memory.

In at least one embodiment, any one of clusters 4414A-4414N of processing array 4412 can process data that will be written to any of memory units 4424A-4424N within parallel processor memory 4422. In at least one embodiment, memory crossbar 4416 can be configured to transfer an output of each cluster 4414A-4414N to any partition unit 4420A-4420N or to another cluster 4414A-4414N, which can perform additional processing operations on an output. In at least one embodiment, each cluster 4414A-4414N can communicate with memory interface 4418 through memory crossbar 4416 to read from or write to various external memory devices. In at least one embodiment, memory crossbar 4416 has a connection to memory interface 4418 to communicate with I/O unit 4404, as well as a connection to a local instance of parallel processor memory 4422, enabling processing units within different clusters 4414A-4414N to communicate with system memory or other memory that is not local to parallel processing unit 4402. In at least one embodiment, memory crossbar 4416 can use virtual channels to separate traffic streams between clusters 4414A-4414N and partition units 4420A-4420N.

In at least one embodiment, multiple instances of parallel processing unit 4402 can be provided on a single add-in card, or multiple add-in cards can be interconnected. In at least one embodiment, different instances of parallel processing unit 4402 can be configured to inter-operate even if different instances have different numbers of processing cores, different amounts of local parallel processor memory, and/or other configuration differences. For example, in at least one embodiment, some instances of parallel processing unit 4402 can include higher precision floating point units relative to other instances. In at least one embodiment, systems incorporating one or more instances of parallel processing unit 4402 or parallel processor 4400 can be implemented in a variety of configurations and form factors, including but not limited to desktop, laptop, or handheld personal computers, servers, workstations, game consoles, and/or embedded systems.

Figure 44B:
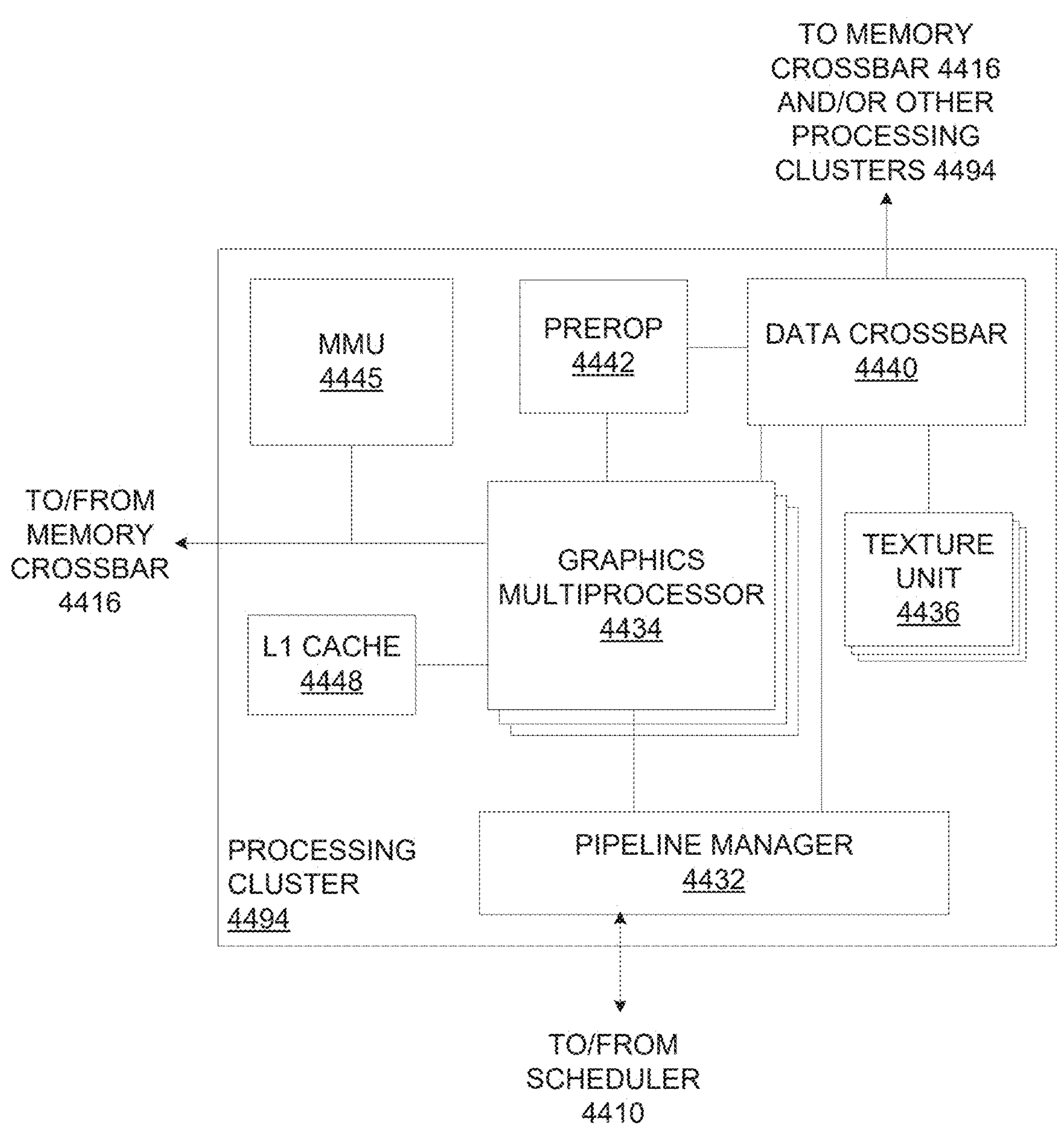
FIG. 44B illustrates a processing cluster, in accordance with at least one embodiment.

FIG. 44B illustrates a processing cluster 4494, in accordance with at least one embodiment. In at least one embodiment, processing cluster 4494 is included within a parallel processing unit. In at least one embodiment, processing cluster 4494 is one of processing clusters 4414A-4414N of FIG. 44. In at least one embodiment, processing cluster 4494 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 4494.

In at least one embodiment, operation of processing cluster 4494 can be controlled via a pipeline manager 4432 that distributes processing tasks to SIMT parallel processors. In at least one embodiment, pipeline manager 4432 receives instructions from scheduler 4410 of FIG. 44 and manages execution of those instructions via a graphics multiprocessor 4434 and/or a texture unit 4436. In at least one embodiment, graphics multiprocessor 4434 is an exemplary instance of a SIMT parallel processor. However, in at least one embodiment, various types of SIMT parallel processors of differing architectures may be included within processing cluster 4494. In at least one embodiment, one or more instances of graphics multiprocessor 4434 can be included within processing cluster 4494. In at least one embodiment, graphics multiprocessor 4434 can process data and a data crossbar 4440 can be used to distribute processed data to one of multiple possible destinations, including other shader units. In at least one embodiment, pipeline manager 4432 can facilitate distribution of processed data by specifying destinations for processed data to be distributed via data crossbar 4440.

In at least one embodiment, each graphics multiprocessor 4434 within processing cluster 4494 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4494 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 4434. In at least one embodiment, a thread group may include fewer threads than a number of processing engines within graphics multiprocessor 4434. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 4434. In at least one embodiment, when a thread group includes more threads than a number of processing engines within graphics multiprocessor 4434, processing can be performed over consecutive clock cycles. In at least one embodiment, multiple thread groups can be executed concurrently on graphics multiprocessor 4434.

In at least one embodiment, graphics multiprocessor 4434 includes an internal cache memory to perform load and store operations. In at least one embodiment, graphics multiprocessor 4434 can forego an internal cache and use a cache memory (e.g., L1 cache 4448) within processing cluster 4494. In at least one embodiment, each graphics multiprocessor 4434 also has access to Level 2 ("L2") caches within partition units (e.g., partition units 4420A-4420N of FIG. 44A) that are shared among all processing clusters 4494 and may be used to transfer data between threads. In at least one embodiment, graphics multiprocessor 4434 may also access off-chip global memory, which can include one or more of local parallel processor memory and/or system memory. In at least one embodiment, any memory external to parallel processing unit 4402 may be used as global memory. In at least one embodiment, processing cluster 4494 includes multiple instances of graphics multiprocessor 4434 that can share common instructions and data, which may be stored in L1 cache 4448.

In at least one embodiment, each processing cluster 4494 may include an MMU 4445 that is configured to map virtual addresses into physical addresses. In at least one embodiment, one or more instances of MMU 4445 may reside within memory interface 4418 of FIG. 44. In at least one embodiment, MMU 4445 includes a set of page table entries ("PTEs") used to map a virtual address to a physical address of a tile and optionally a cache line index. In at least one embodiment, MMU 4445 may include address translation lookaside buffers ("TLBs") or caches that may reside within graphics multiprocessor 4434 or L1 cache 4448 or processing cluster 4494. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 4494 may be configured such that each graphics multiprocessor 4434 is coupled to a texture unit 4436 for performing texture mapping operations, e.g., determining texture sample positions, reading texture data, and filtering texture data. In at least one embodiment, texture data is read from an internal texture L1 cache (not shown) or from an L1 cache within graphics multiprocessor 4434 and is fetched from an L2 cache, local parallel processor memory, or system memory, as needed. In at least one embodiment, each graphics multiprocessor 4434 outputs a processed task to data crossbar 4440 to provide a processed task to another processing cluster 4494 for further processing or to store a processed task in an L2 cache, a local parallel processor memory, or a system memory via memory crossbar 4416. In at least one embodiment, a pre-raster operations unit ("preROP") 4442 is configured to receive data from graphics multiprocessor 4434, direct data to ROP units, which may be located with partition units as described herein (e.g., partition units 4420A-4420N of FIG. 44). In at least one embodiment, PreROP 4442 can perform optimizations for color blending, organize pixel color data, and perform address translations.

Figure 44C:
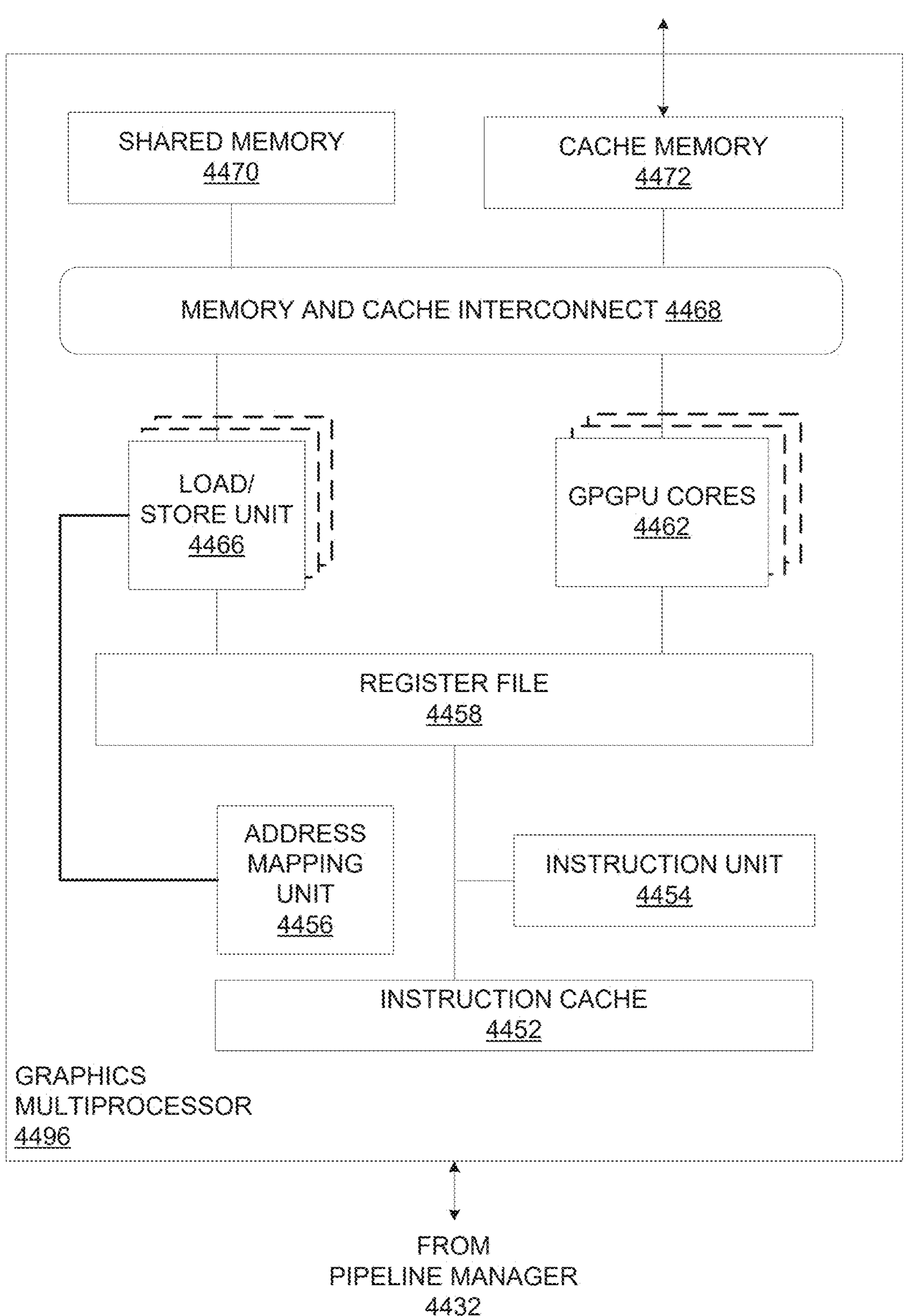
FIG. 44C illustrates a graphics multiprocessor, in accordance with at least one embodiment.

FIG. 44C illustrates a graphics multiprocessor 4496, in accordance with at least one embodiment. In at least one embodiment, graphics multiprocessor 4496 is graphics multiprocessor 4434 of FIG. 44B. In at least one embodiment, graphics multiprocessor 4496 couples with pipeline manager 4432 of processing cluster 4494. In at least one embodiment, graphics multiprocessor 4496 has an execution pipeline including but not limited to an instruction cache 4452, an instruction unit 4454, an address mapping unit 4456, a register file 4458, one or more GPGPU cores 4462, and one or more LSUs 4466. GPGPU cores 4462 and LSUs 4466 are coupled with cache memory 4472 and shared memory 4470 via a memory and cache interconnect 4468.

In at least one embodiment, instruction cache 4452 receives a stream of instructions to execute from pipeline manager 4432. In at least one embodiment, instructions are cached in instruction cache 4452 and dispatched for execution by instruction unit 4454. In at least one embodiment, instruction unit 4454 can dispatch instructions as thread groups (e.g., warps), with each thread of a thread group assigned to a different execution unit within GPGPU core 4462. In at least one embodiment, an instruction can access any of a local, shared, or global address space by specifying an address within a unified address space. In at least one embodiment, address mapping unit 4456 can be used to translate addresses in a unified address space into a distinct memory address that can be accessed by LSUs 4466.

In at least one embodiment, register file 4458 provides a set of registers for functional units of graphics multiprocessor 4496. In at least one embodiment, register file 4458 provides temporary storage for operands connected to data paths of functional units (e.g., GPGPU cores 4462, LSUs 4466) of graphics multiprocessor 4496. In at least one embodiment, register file 4458 is divided between each of functional units such that each functional unit is allocated a dedicated portion of register file 4458. In at least one embodiment, register file 4458 is divided between different thread groups being executed by graphics multiprocessor 4496.

In at least one embodiment, GPGPU cores 4462 can each include FPUs and/or integer ALUs that are used to execute instructions of graphics multiprocessor 4496. GPGPU cores 4462 can be similar in architecture or can differ in architecture. In at least one embodiment, a first portion of GPGPU cores 4462 include a single precision FPU and an integer ALU while a second portion of GPGPU cores 4462 include a double precision FPU. In at least one embodiment, FPUs can implement IEEE 754-2008 standard for floating point arithmetic or enable variable precision floating point arithmetic. In at least one embodiment, graphics multiprocessor 4496 can additionally include one or more fixed function or special function units to perform specific functions such as copy rectangle or pixel blending operations. In at least one embodiment one or more of GPGPU cores 4462 can also include fixed or special function logic.

In at least one embodiment, GPGPU cores 4462 include SIMD logic capable of performing a single instruction on multiple sets of data. In at least one embodiment GPGPU cores 4462 can physically execute SIMD4, SIMD8, and SIMD16 instructions and logically execute SIMD1, SIMD2, and SIMD32 instructions. In at least one embodiment, SIMD instructions for GPGPU cores 4462 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 4468 is an interconnect network that connects each functional unit of graphics multiprocessor 4496 to register file 4458 and to shared memory 4470. In at least one embodiment, memory and cache interconnect 4468 is a crossbar interconnect that allows LSU 4466 to implement load and store operations between shared memory 4470 and register file 4458. In at least one embodiment, register file 4458 can operate at a same frequency as GPGPU cores 4462, thus data transfer between GPGPU cores 4462 and register file 4458 is very low latency. In at least one embodiment, shared memory 4470 can be used to enable communication between threads that execute on functional units within graphics multiprocessor 4496. In at least one embodiment, cache memory 4472 can be used as a data cache for example, to cache texture data communicated between functional units and texture unit 4436. In at least one embodiment, shared memory 4470 can also be used as a program managed cached. In at least one embodiment, threads executing on GPGPU cores 4462 can programmatically store data within shared memory in addition to automatically cached data that is stored within cache memory 4472.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on a same package or chip as cores and communicatively coupled to cores over a processor bus/interconnect that is internal to a package or a chip. In at least one embodiment, regardless of a manner in which a GPU is connected, processor cores may allocate work to a GPU in a form of sequences of commands/instructions contained in a WD. In at least one embodiment, a GPU then uses dedicated circuitry/logic for efficiently processing these commands/instructions.

In at least one embodiment, at least one component shown or described with respect to FIG. 44 is utilized to implement techniques and/or functions described in connection with FIGS. 1-13. In at least one embodiment, at least one component of FIG. 44 is used to cause scaling of one or more clocks of one or more cores, based at least in part, on a proximity of the one or more cores to each other. In at least one embodiment, at least one component of FIG. 44 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

General Computing

The following figures set forth, without limitation, exemplary software constructs within general computing that can be used to implement at least one embodiment.

Figure 45:
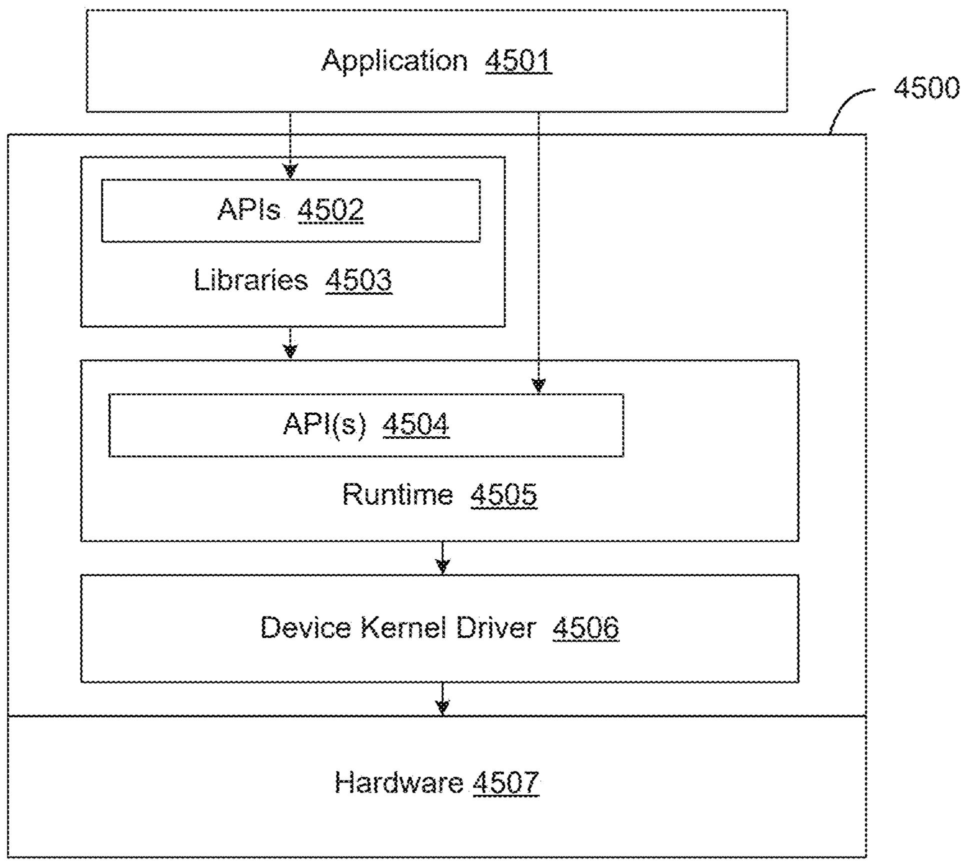
FIG. 45 illustrates a software stack of a programming platform, in accordance with at least one embodiment.

FIG. 45 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4500 of a programming platform provides an execution environment for an application 4501. In at least one embodiment, application 4501 may include any computer software capable of being launched on software stack 4500. In at least one embodiment, application 4501 may include, but is not limited to, an artificial intelligence ("AI")/machine learning ("ML") application, a high performance computing ("HPC") application, a virtual desktop infrastructure ("VDI"), or a data center workload.

In at least one embodiment, application 4501 and software stack 4500 run on hardware 4507. Hardware 4507 may include one or more GPUs, CPUs, FPGAs, AI engines, and/or other types of compute devices that support a programming platform, in at least one embodiment. In at least one embodiment, such as with CUDA, software stack 4500 may be vendor specific and compatible with only devices from particular vendor(s). In at least one embodiment, such as in with OpenCL, software stack 4500 may be used with devices from different vendors. In at least one embodiment, hardware 4507 includes a host connected to one more devices that can be accessed to perform computational tasks via application programming interface ("API") calls. A device within hardware 4507 may include, but is not limited to, a GPU, FPGA, AI engine, or other compute device (but may also include a CPU) and its memory, as opposed to a host within hardware 4507 that may include, but is not limited to, a CPU (but may also include a compute device) and its memory, in at least one embodiment.

In at least one embodiment, software stack 4500 of a programming platform includes, without limitation, a number of libraries 4503, a runtime 4505, and a device kernel driver 4506. Each of libraries 4503 may include data and programming code that can be used by computer programs and leveraged during software development, in at least one embodiment. In at least one embodiment, libraries 4503 may include, but are not limited to, pre-written code and subroutines, classes, values, type specifications, configuration data, documentation, help data, and/or message templates. In at least one embodiment, libraries 4503 include functions that are optimized for execution on one or more types of devices. In at least one embodiment, libraries 4503 may include, but are not limited to, functions for performing mathematical, deep learning, and/or other types of operations on devices. In at least one embodiment, libraries 4603 are associated with corresponding APIs 4602, which may include one or more APIs, that expose functions implemented in libraries 4603.

In at least one embodiment, application 4501 is written as source code that is compiled into executable code, as discussed in greater detail below in conjunction with FIG. 50. Executable code of application 4501 may run, at least in part, on an execution environment provided by software stack 4500, in at least one embodiment. In at least one embodiment, during execution of application 4501, code may be reached that needs to run on a device, as opposed to a host. In such a case, runtime 4505 may be called to load and launch requisite code on a device, in at least one embodiment. In at least one embodiment, runtime 4505 may include any technically feasible runtime system that is able to support execution of application S01.

In at least one embodiment, runtime 4505 is implemented as one or more runtime libraries associated with corresponding APIs, which are shown as API(s) 4504. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4504 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4506 is configured to facilitate communication with an underlying device. In at least one embodiment, device kernel driver 4506 may provide low-level functionalities upon which APIs, such as API(s) 4504, and/or other software relies. In at least one embodiment, device kernel driver 4506 may be configured to compile intermediate representation ("IR") code into binary code at runtime. For CUDA, device kernel driver 4506 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4506 to compile IR code at runtime.

In at least one embodiment, at least one component shown or described with respect to FIG. 45 is utilized to implement techniques and/or functions described in connection with FIGS. 1-13. In at least one embodiment, at least one component of FIG. 45 is used to cause scaling of one or more clocks of one or more cores, based at least in part, on a proximity of the one or more cores to each other. In at least one embodiment, at least one component of FIG. 45 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 46:
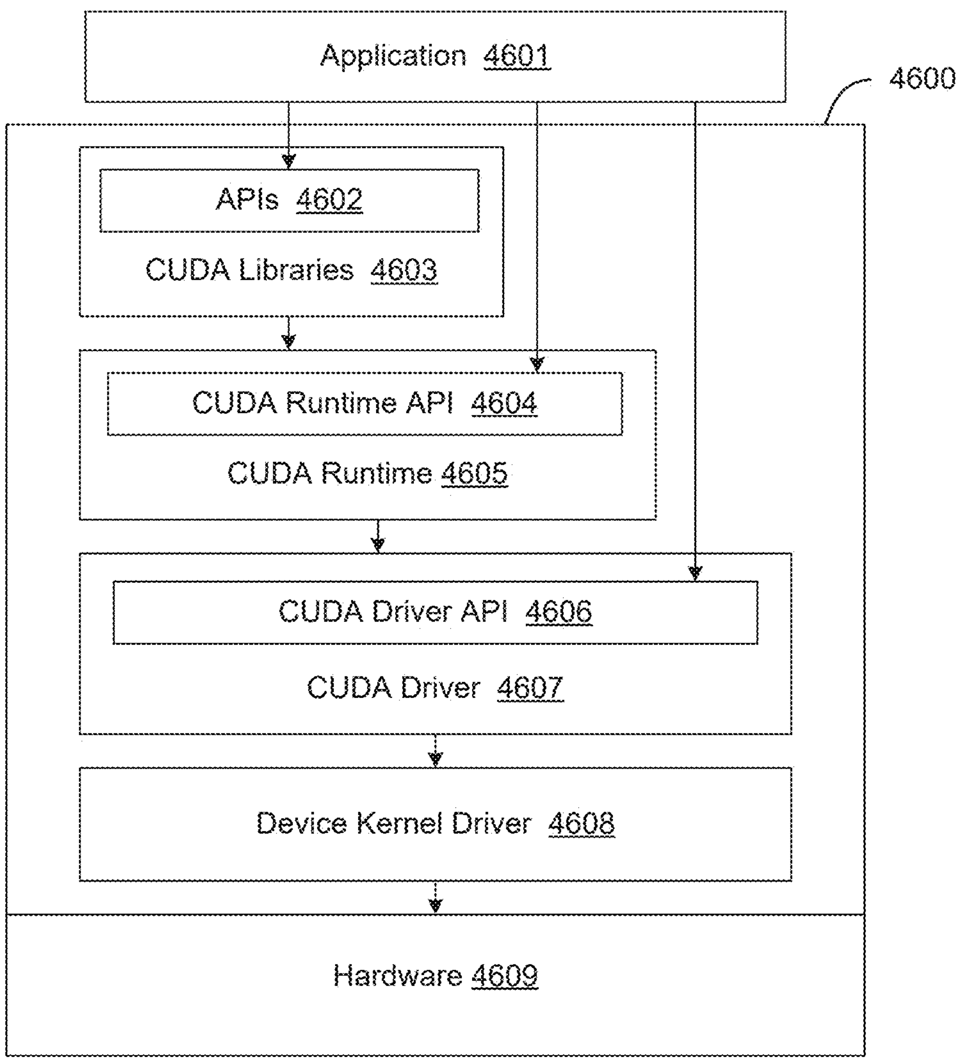
FIG. 46 illustrates a CUDA implementation of a software stack of FIG. 45, in accordance with at least one embodiment.

FIG. 46 illustrates a CUDA implementation of software stack 4500 of FIG. 45, in accordance with at least one embodiment. In at least one embodiment, a CUDA software stack 4600, on which an application 4601 may be launched, includes CUDA libraries 4603, a CUDA runtime 4605, a CUDA driver 4607, and a device kernel driver 4608. In at least one embodiment, CUDA software stack 4600 executes on hardware 4609, which may include a GPU that supports CUDA and is developed by NVIDIA Corporation of Santa Clara, CA.

In at least one embodiment, application 4601, CUDA runtime 4605, and device kernel driver 4608 may perform similar functionalities as application 4501, runtime 4505, and device kernel driver 4506, respectively, which are described above in conjunction with FIG. 45. In at least one embodiment, CUDA driver 4607 includes a library (libcuda.so) that implements a CUDA driver API 4606. Similar to a CUDA runtime API 4604 implemented by a CUDA runtime library (cudart), CUDA driver API 4606 may, without limitation, expose functions for memory management, execution control, device management, error handling, synchronization, and/or graphics interoperability, among other things, in at least one embodiment. In at least one embodiment, CUDA driver API 4606 differs from CUDA runtime API 4604 in that CUDA runtime API 4604 simplifies device code management by providing implicit initialization, context (analogous to a process) management, and module (analogous to dynamically loaded libraries) management. In contrast to high-level CUDA runtime API 4604, CUDA driver API 4606 is a low-level API providing more fine-grained control of a device, particularly with respect to contexts and module loading, in at least one embodiment. In at least one embodiment, CUDA driver API 4606 may expose functions for context management that are not exposed by CUDA runtime API 4604. In at least one embodiment, CUDA driver API 4606 is also language-independent and supports, e.g., OpenCL in addition to CUDA runtime API 4604. Further, in at least one embodiment, development libraries, including CUDA runtime 4605, may be considered as separate from driver components, including user-mode CUDA driver 4607 and kernel-mode device driver 4608 (also sometimes referred to as a "display" driver).

In at least one embodiment, CUDA libraries 4603 may include, but are not limited to, mathematical libraries, deep learning libraries, parallel algorithm libraries, and/or signal/image/video processing libraries, which parallel computing applications such as application 4601 may utilize. In at least one embodiment, CUDA libraries 4603 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4603 may include deep learning libraries such as a cuDNN library of primitives for deep neural networks and a TensorRT platform for high-performance deep learning inference, among others.

In at least one embodiment, at least one component shown or described with respect to FIG. 46 is utilized to implement techniques and/or functions described in connection with FIGS. 1-13. In at least one embodiment, at least one component of FIG. 46 is used to cause scaling of one or more clocks of one or more cores, based at least in part, on a proximity of the one or more cores to each other. In at least one embodiment, at least one component of FIG. 46 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 47:
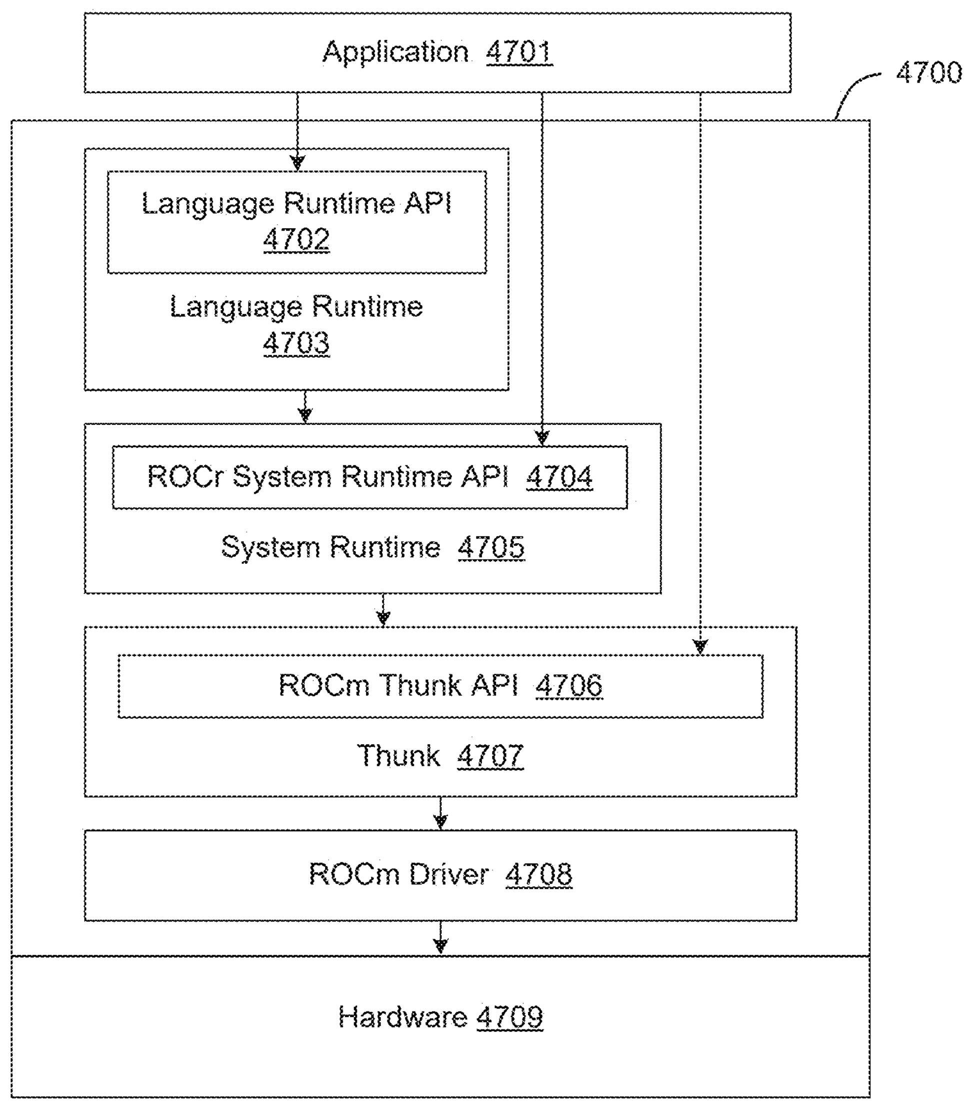
FIG. 47 illustrates a ROCm implementation of a software stack of FIG. 45, in accordance with at least one embodiment.

FIG. 47 illustrates a ROCm implementation of software stack 4500 of FIG. 45, in accordance with at least one embodiment. In at least one embodiment, a ROCm software stack 4700, on which an application 4701 may be launched, includes a language runtime 4703, a system runtime 4705, a thunk 4707, a ROCm kernel driver 4708, and a device kernel driver 4709. In at least one embodiment, ROCm software stack 4700 executes on hardware 4710, which may include a GPU that supports ROCm and is developed by AMD Corporation of Santa Clara, CA.

In at least one embodiment, application 4701 may perform similar functionalities as application 4501 discussed above in conjunction with FIG. 45. In addition, language runtime 4703 and system runtime 4705 may perform similar functionalities as runtime 4505 discussed above in conjunction with FIG. 45, in at least one embodiment. In at least one embodiment, language runtime 4703 and system runtime 4705 differ in that system runtime 4705 is a language-independent runtime that implements a ROCr system runtime API 4704 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4705, language runtime 4703 is an implementation of a language-specific runtime API 4702 layered on top of ROCr system runtime API 4704, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4604 discussed above in conjunction with FIG. 46, such as functions for memory management, execution control, device management, error handling, and synchronization, among other things.

In at least one embodiment, thunk (ROCt) 4707 is an interface that can be used to interact with underlying ROCm driver 4708. In at least one embodiment, ROCm driver 4708 is a ROCK driver, which is a combination of an AMDGPU driver and a HAS kernel driver (amdkfd). In at least one embodiment, AMDGPU driver is a device kernel driver for GPUs developed by AMD that performs similar functionalities as device kernel driver 4506 discussed above in conjunction with FIG. 45. In at least one embodiment, HAS kernel driver is a driver permitting different types of processors to share system resources more effectively via hardware features.

In at least one embodiment, various libraries (not shown) may be included in ROCm software stack 4700 above language runtime 4703 and provide functionality similarity to CUDA libraries 4603, discussed above in conjunction with FIG. 46. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, at least one component shown or described with respect to FIG. 47 is utilized to implement techniques and/or functions described in connection with FIGS. 1-13. In at least one embodiment, at least one component of FIG. 47 is used to cause scaling of one or more clocks of one or more cores, based at least in part, on a proximity of the one or more cores to each other. In at least one embodiment, at least one component of FIG. 47 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 48:
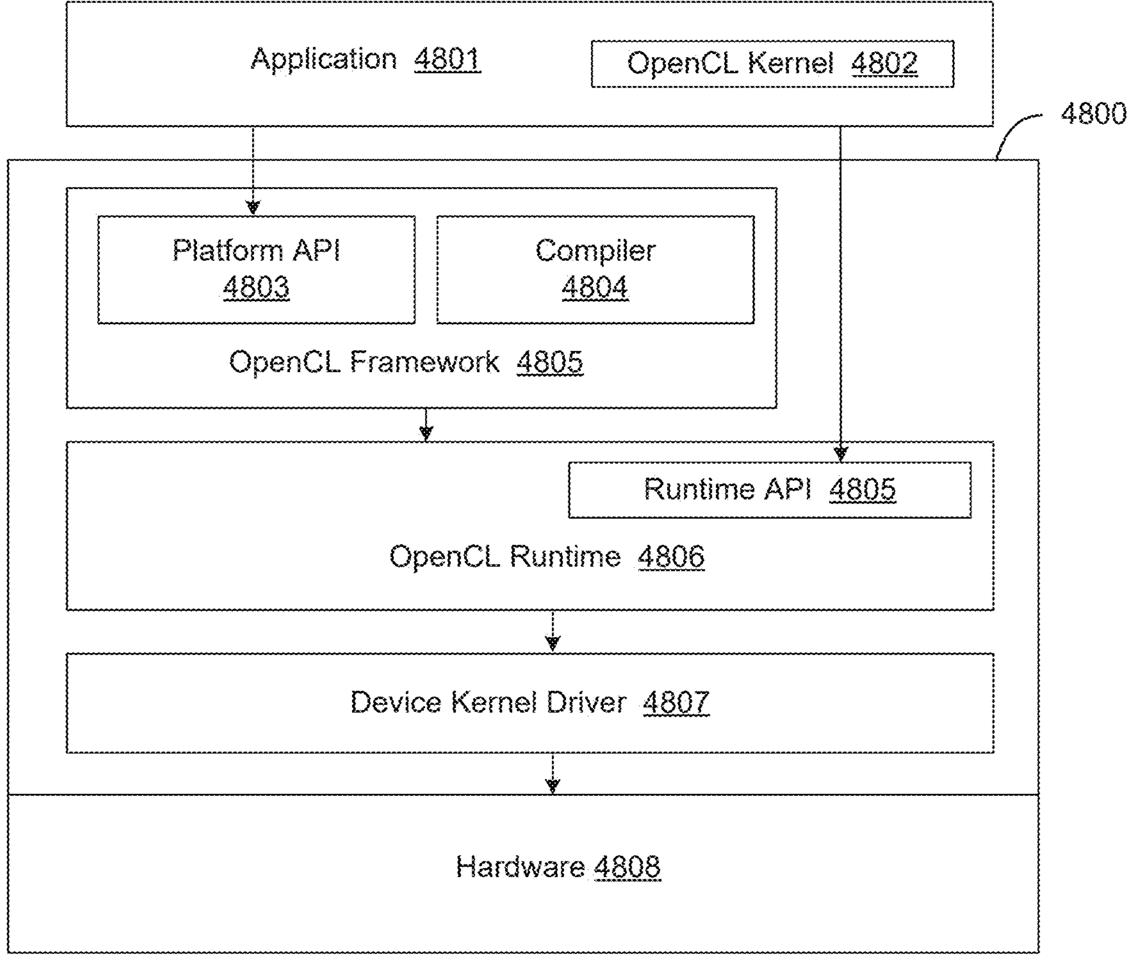
FIG. 48 illustrates an OpenCL implementation of a software stack of FIG. 45, in accordance with at least one embodiment.

FIG. 48 illustrates an OpenCL implementation of software stack 4500 of FIG. 45, in accordance with at least one embodiment. In at least one embodiment, an OpenCL software stack 4800, on which an application 4801 may be launched, includes an OpenCL framework 4805, an OpenCL runtime 4806, and a driver 4807. In at least one embodiment, OpenCL software stack 4800 executes on hardware 4609 that is not vendor-specific. As OpenCL is supported by devices developed by different vendors, specific OpenCL drivers may be required to interoperate with hardware from such vendors, in at least one embodiment.

In at least one embodiment, application 4801, OpenCL runtime 4806, device kernel driver 4807, and hardware 4808 may perform similar functionalities as application 4501, runtime 4505, device kernel driver 4506, and hardware 4507, respectively, that are discussed above in conjunction with FIG. 45. In at least one embodiment, application 4801 further includes an OpenCL kernel 4802 with code that is to be executed on a device.

In at least one embodiment, OpenCL defines a "platform" that allows a host to control devices connected to a host. In at least one embodiment, an OpenCL framework provides a platform layer API and a runtime API, shown as platform API 4803 and runtime API 4805. In at least one embodiment, runtime API 4805 uses contexts to manage execution of kernels on devices. In at least one embodiment, each identified device may be associated with a respective context, which runtime API 4805 may use to manage command queues, program objects, and kernel objects, share memory objects, among other things, for that device. In at least one embodiment, platform API 4803 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4804 is also included in OpenCL frame-work 4805. Source code may be compiled offline prior to executing an application or online during execution of an application, in at least one embodiment. In contrast to CUDA and ROCm, OpenCL applications in at least one embodiment may be compiled online by compiler 4804, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

In at least one embodiment, at least one component shown or described with respect to FIG. 48 is utilized to implement techniques and/or functions described in connection with FIGS. 1-13. In at least one embodiment, at least one component of FIG. 48 is used to cause scaling of one or more clocks of one or more cores, based at least in part, on a proximity of the one or more cores to each other. In at least one embodiment, at least one component of FIG. 48 performs at least one aspect described with respect to data center 120, controller 105, at least two or more of processor 110(*a*) through processor 110(*n*), and one or more thermal sensor 115(*a*) through thermal sensor 115(*n*) of FIG. 1, firmware 220, Configuration file 225, ACPI 230, Policy 235 one or more processors 1-*n* of FIG. 2, and/or including one or more of: method 900 of FIG. 9, method 1000 of FIG. 10, and method 1100 of FIG. 11.

Figure 49:
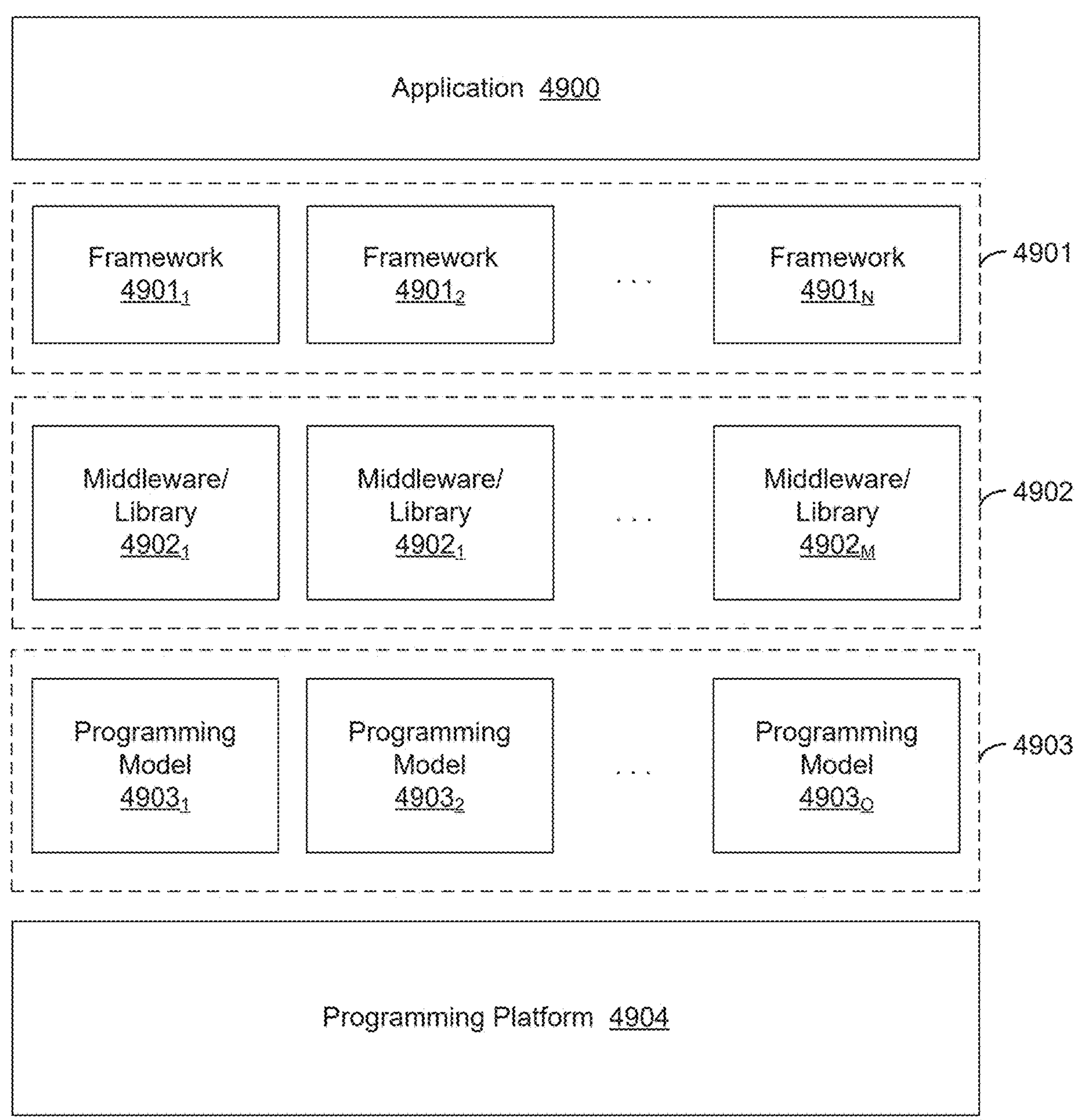
FIG. 49 illustrates software that is supported by a programming platform, in accordance with at least one embodiment.

FIG. 49 illustrates software that is supported by a programming platform, in accordance with at least one embodiment. In at least one embodiment, a programming platform 4904 is configured to support various programming models 4903, middlewares and/or libraries 4902, and frameworks 4901 that an application 4900 may rely upon. In at least one embodiment, application 4900 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 4904 may be one of a CUDA, ROCm, or OpenCL platform described above in conjunction with FIG. 46, FIG. 47, and FIG. 48, respectively. In at least one embodiment, programming platform 4904 supports multiple programming models 4903, which are abstractions of an underlying computing system permitting expressions of algorithms and data structures. Programming models 4903 may expose features of underlying hardware in order to improve performance, in at least one embodiment. In at least one embodiment, programming models 4903 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4902 provide implementations of abstractions of programming models 4904. In at least one embodiment, such libraries include data and programming code that may be used by computer programs and leveraged during software development. In at least one embodiment, such middlewares include software that provides services to applications beyond those available from programming platform 4904. In at least one embodiment, libraries and/or middlewares 4902 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4902 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 4901 depend on libraries and/or middlewares 4902. In at least one embodiment, each of application frameworks 4901 is a software framework used to implement a standard structure of application software. An AI/ML application may be implemented using a framework such as Caffe, Caffe2, TensorFlow, Keras, PyTorch, or MxNet deep learning frameworks, in at least one embodiment.

Figure 50:
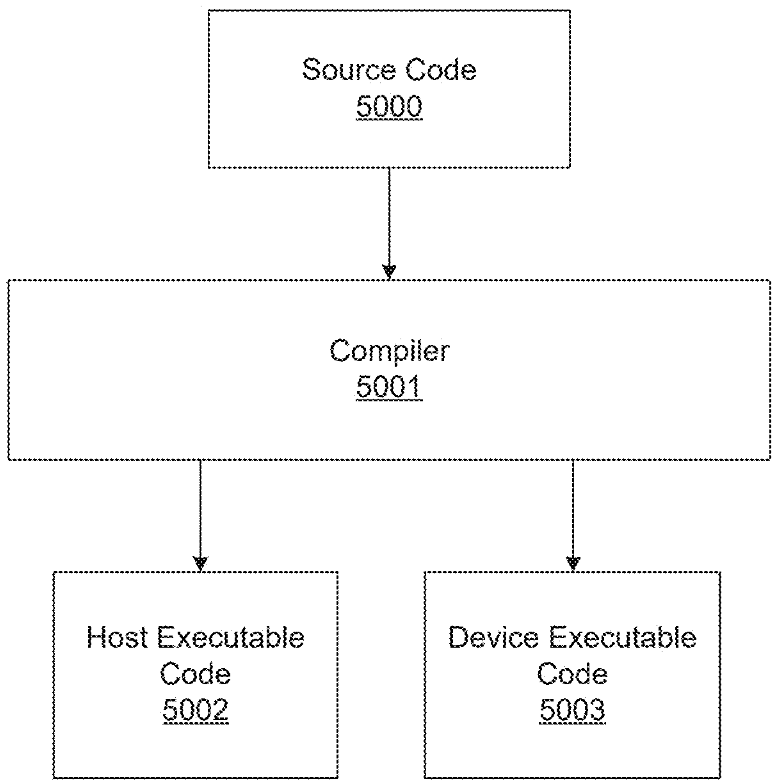
FIG. 50 illustrates compiling code to execute on programming platforms of FIGS. 45-48, in accordance with at least one embodiment.

FIG. 50 illustrates compiling code to execute on one of programming platforms of FIGS. 45-48, in accordance with at least one embodiment. In at least one embodiment, a compiler 5001 receives source code 5000 that includes both host code as well as device code. In at least one embodiment, complier 5001 is configured to convert source code 5000 into host executable code 5002 for execution on a host and device executable code 5003 for execution on a device. In at least one embodiment, source code 5000 may either be compiled offline prior to execution of an application, or online during execution of an application.

In at least one embodiment, at least one component shown or described with respect to FIG. 49 is utilized to implement techniques and/or functions described in connection with FIGS. 1-13. In at least one embodiment, at least one component of FIG. 49 is used to cause scaling of one or more clocks of one or more cores, based at least in part, on a proximity of the one or more cores to each other. In at least one embodiment, at least one component of FIG. 49 performs at least one aspect described with respect to data center 120, controller 105, at least two or more of processor 110($a$) through processor 110($n$), and one or more thermal sensor 115($a$) through thermal sensor 115($n$) of FIG. 1, firmware 220, Configuration file 225, ACPI 230, Policy 235 one or more processors 1-$n$ of FIG. 2, and/or including one or more of: method 900 of FIG. 9, method 1000 of FIG. 10, and method 1100 of FIG. 11.

In at least one embodiment, source code 5000 may include code in any programming language supported by compiler 5001, such as C++, C, Fortran, etc. In at least one embodiment, source code 5000 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 5000 may include multiple source code files, rather than a single-source file, into which host code and device code are separated.

In at least one embodiment, compiler 5001 is configured to compile source code 5000 into host executable code 5002 for execution on a host and device executable code 5003 for execution on a device. In at least one embodiment, compiler 5001 performs operations including parsing source code 5000 into an abstract system tree (AST), performing optimizations, and generating executable code. In at least one embodiment in which source code 5000 includes a single-source file, compiler 5001 may separate device code from host code in such a single-source file, compile device code and host code into device executable code 5003 and host executable code 5002, respectively, and link device executable code 5003 and host executable code 5002 together in a single file, as discussed in greater detail below with respect to FIG. 39.

In at least one embodiment, host executable code 5002 and device executable code 5003 may be in any suitable format, such as binary code and/or IR code. In a case of CUDA, host executable code 5002 may include native object code and device executable code 5003 may include code in PTX intermediate representation, in at least one embodiment. In a case of ROCm, both host executable code 5002 and device executable code 5003 may include target binary code, in at least one embodiment.

In at least one embodiment, at least one component shown or described with respect to FIG. 50 is utilized to implement techniques and/or functions described in connection with FIGS. 1-13. In at least one embodiment, at least one component of FIG. 50 is used to cause scaling of one or more clocks of one or more cores, based at least in part, on a proximity of the one or more cores to each other. In at least one embodiment, at least one component of FIG. 50 performs at least one aspect described with respect to data center 120, controller 105, at least two or more of processor 110($a$) through processor 110($n$), and one or more thermal sensor 115($a$) through thermal sensor 115($n$) of FIG. 1, firmware 220, Configuration file 225, ACPI 230, Policy 235 one or more processors 1-$n$ of FIG. 2, and/or including one or more of: method 900 of FIG. 9, method 1000 of FIG. 10, and method 1100 of FIG. 11.

At least one embodiment of the disclosure can be described in view of the following clauses:

1. A processor comprising: one or more circuits to scale one or more clocks of one or more cores based, at least in part, on a proximity of the one or more cores to each other.
2. The processor of clause 1, wherein the one or more circuits are to scale the one or more clocks based, at least in part, on one or more patterns of core utilization that are indicative of one or more thermal conditions.
3. The processor of clause 1 or clause 2, wherein the one or more circuits are to avoid one or more patterns of core utilization that would result in one or more adverse thermal conditions.
4. The processor of any of clauses 1-3, wherein the one or more circuits are to select one or more cores of the processor to perform one or more threads based, at least in part, on avoidance of one or more patterns of core utilization that are indicative of one or more adverse thermal conditions.
5. The processor of any of clauses 1-4, wherein the one more circuits are to scale the one or more clocks based on information indicative of one or more patterns of core utilization stored in one or more configuration files.
6. The processor of any of clauses 1-5, wherein the one or more circuits are to compare utilization of cores of the processor to one or more patterns of core utilization.
7. The processor of any of clauses 1-6, wherein proximity of the one or more cores corresponds to one or more locations of the one or more cores on a chip of the processor.
8. A system comprising one or more processors to scale one or more clocks of one or more cores based, at least in part, on a proximity of the one or more cores to each other.
9. The system of clause 8 wherein the one or more processors are to scale the one or more clocks based, at least in part, on one or more patterns of core utilization that are indicative of one or more thermal conditions.
10. The system of clause 8 or clause 9 wherein the one or more processors are to avoid one or more patterns of core utilization that would result in one or more adverse thermal conditions.
11. The system of any of clauses 8-10 wherein the one or more processors are to select one or more cores of the processor to perform one or more threads based, at least in part, on avoidance of one or more patterns of core utilization that are indicative of one or more adverse thermal conditions.
12. The system of any of clauses 8-11 wherein the one or more processors are to scale the one or more clocks based on information indicative of one or more patterns of core utilization stored in one or more configuration files.
13. The system of any of clauses 8-12 wherein the one or more processors are to compare utilization of cores of the processor to one or more patterns of core utilization.
14. The system of any of clauses 8-13 wherein proximity of the one or more cores corresponds to one or more locations of the one or more cores on a chip of the processor.
15. A method for scaling one or more clocks of one or more cores based, at least in part, on a proximity of the one or more cores to each other.
16. The method of clause 15 wherein the scaling of the one or more clocks is based, at least in part, on one or more patterns of core utilization that are indicative of one or more thermal conditions.
17. The method of clause 15 or clause 16 wherein the scaling of one or more clocks are to avoid one or more patterns of core utilization that would result in one or more adverse thermal conditions.
18. The method any of clauses 15-17 wherein the scaling of one or more clocks are to select one or more cores of the processor to perform one or more threads based, at least in part, on avoidance of one or more patterns of core utilization that are indicative of one or more adverse thermal conditions.
19. The method of any of clauses 15-18 wherein the scaling of one or more clocks is based on information indicative of one or more patterns of core utilization stored in one or more configuration files.
20. The method of any of clauses 15-19 wherein the scaling of one or more clocks is to compare utilization of cores of the processor to one or more patterns of core utilization.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., “a plurality of items” indicates multiple items). In at least one embodiment, a number of items in a plurality is at least two, but can be more when so indicated either explicitly or by context. Further, unless stated otherwise or otherwise clear from context, phrase “based on” means “based at least in part on” and not “based solely on.”

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit (“CPU”) executes some of instructions while a graphics processing unit (“GPU”) executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., “such as”) provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms “coupled” and “connected,” along with their derivatives, may be used. It should be understood that these terms may be not intended as synonyms for each other. Rather, in particular examples, “connected” or “coupled” may be used to indicate that two or more elements are in direct or indirect physical or electrical contact with each other. “Coupled” may also mean that two or more elements are not in direct contact with each other, but yet still co-operate or interact with each other.

Unless specifically stated otherwise, it may be appreciated that throughout specification terms such as “processing,” “computing,” “calculating,” “determining,” or like, refer to action and/or processes of a computer or computing system, or similar electronic computing device, that manipulate and/or transform data represented as physical, such as electronic, quantities within computing system’s registers and/or memories into other data similarly represented as physical quantities within computing system’s memories, registers or other such information storage, transmission or display devices.

In a similar manner, term “processor” may refer to any device or portion of a device that processes electronic data from registers and/or memory and transform that electronic data into other electronic data that may be stored in registers and/or memory. As non-limiting examples, “processor” may be a CPU or a GPU. A “computing platform” may comprise one or more processors. As used herein, “software” processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms “system” and “method” are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors comprising:

circuitry to:

perform a comparison of: (1) a combination of two or more cores operating in proximity to each other that are to result in a thermal output for the combination and (2) one or more stored patterns of core utilization that indicate a relationship between the combination and temperature corresponding to the thermal output; and scale one or more clocks of the two or more cores based, at least in part, on the comparison.

2. The one or more processors of claim 1, wherein the circuitry is to scale the one or more clocks based, at least in part, on the one or more stored patterns of core utilization that are indicative of one or more thermal conditions.

3. The one or more processors of claim 1, wherein the circuitry is to avoid the one or more stored patterns of core utilization that would result in one or more adverse thermal conditions.

4. The one or more processors of claim 1, wherein the circuitry is to select at least one of the two or more cores to perform one or more threads based, at least in part, on avoidance of the one or more stored patterns of core utilization that are indicative of one or more adverse thermal conditions.

5. The one or more processors of claim 1, wherein the circuitry is to scale the one or more clocks based on information indicative of the one or more stored patterns of core utilization stored in one or more configuration files.

6. The one or more processors of claim 1, wherein the circuitry is to compare utilization of at least one of the two or more cores to the one or more stored patterns of core utilization.

7. The one or more processors of claim 1, wherein the proximity of the two or more cores corresponds to two or more locations of the two or more cores on a chip.

8. The one or more processors of claim 1, wherein the circuitry is further to reduce a first set of clocks for a first set of cores corresponding to the one or more stored patterns of core utilization related to increased temperature and maintain a second set of clocks for a second set of cores that are not associated with the one or more stored patterns of core utilization.

9. A system comprising:

one or more processors to:

perform a comparison of: (1) a combination of two or more cores operating in proximity to each other that are to result in a thermal output for the combination and (2) one or more stored patterns of core utilization that indicate a relationship between the combination and temperature corresponding to the thermal output; and scale one or more clocks of the two or more cores based, at least in part, on the comparison.

10. The system of claim 9, wherein the one or more processors are to scale the one or more clocks based, at least in part, on the one or more stored patterns of core utilization that are indicative of one or more thermal conditions.

11. The system of claim 9, wherein the one or more processors are to avoid the one or more stored patterns of core utilization that would result in one or more adverse thermal conditions.

12. The system of claim 9, wherein the one or more processors are to select at least one of the two or more cores to perform one or more threads based, at least in part, on avoidance of the one or more stored patterns of core utilization that are indicative of one or more adverse thermal conditions.

13. The system of claim 9, wherein the one or more processors are to scale the one or more clocks based on information indicative of the one or more stored patterns of core utilization stored in one or more configuration files.

14. The system of claim 9, wherein the one or more processors are to compare utilization of at least one core of the two or more cores to the one or more stored patterns of core utilization.

15. The system of claim 9, wherein the proximity of the two or more cores corresponds to two or more locations of the two or more cores on a chip.

16. A method comprising:

performing a comparison of: (1) a combination of two or more cores operating in proximity to each other that are to result in a thermal output for the combination and (2) one or more stored patterns of core utilization that indicate a relationship between the combination and temperature corresponding to the thermal output; and scaling one or more clocks of the two or more cores based, at least in part, on the comparison.

17. The method of claim 16, wherein the scaling of the one or more clocks is based, at least in part, on the one or more stored patterns of core utilization that are indicative of one or more thermal conditions.

18. The method of claim 16, wherein the scaling of the one or more clocks avoids the one or more stored patterns of core utilization that would result in one or more adverse thermal conditions.

19. The method of claim 16, further comprising: selecting at least one core of the two or more cores to perform one or more threads based, at least in part, on avoidance of the one or more stored patterns of core utilization that are indicative of one or more adverse thermal conditions.

20. The method of claim 16, wherein the scaling of the one or more clocks is based on information indicative of the one or more stored patterns of core utilization stored in one or more configuration files.

21. The method of claim 16, further comprising: comparing utilization of at least one of the two or more cores to the one or more stored patterns of core utilization.

* * * * *